(12) United States Patent
Takamoto

(10) Patent No.: US 10,187,534 B2
(45) Date of Patent: Jan. 22, 2019

(54) INFORMATION PROCESSING DEVICE, PLURAL PRINTERS, PLURAL MONITORING DEVICES AND CONTROL METHOD OF A PRINTER TO ACQUIRE STATUS OF A SELECTED PRINTER THROUGH A SELECTED MONITORING DEVICE

(71) Applicant: Seiko Epson Corporation, Tokyo (JP)

(72) Inventor: Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/398,434

(22) Filed: Jan. 4, 2017

(65) Prior Publication Data

US 2017/0201635 A1    Jul. 13, 2017

(30) Foreign Application Priority Data

Jan. 7, 2016 (JP) .................. 2016-001794
Jan. 22, 2016 (JP) .................. 2016-010963
Jan. 22, 2016 (JP) .................. 2016-010964

(51) Int. Cl.
*H04N 1/00* (2006.01)
*H04L 12/26* (2006.01)
(Continued)

(52) U.S. Cl.
CPC ......... *H04N 1/00323* (2013.01); *G06F 3/121* (2013.01); *G06F 3/1229* (2013.01); *G06F 3/1285* (2013.01); *G06F 11/3065* (2013.01); *H04L 43/0876* (2013.01); *H04L 67/1002* (2013.01); *H04N 1/00015* (2013.01); *H04N 1/00042* (2013.01); *H04N 1/00061* (2013.01); *H04N 1/00079* (2013.01);
(Continued)

(58) Field of Classification Search
None
See application file for complete search history.

(56) References Cited

U.S. PATENT DOCUMENTS

2005/0281566 A1  12/2005  Kaneko
2006/0218272 A1   9/2006  Murakami

FOREIGN PATENT DOCUMENTS

JP    2005-178212 A    7/2005
JP    2006-040258 A    2/2006
(Continued)

*Primary Examiner* — Benny Q Tieu
*Assistant Examiner* — Haris Sabah
(74) *Attorney, Agent, or Firm* — Foley & Lardner LLP

(57) ABSTRACT

Redundant monitoring of the same printer by multiple monitoring devices when multiple monitoring devices monitor multiple printers is prevented in a network system 1 including a printer, multiple monitoring devices able to monitor printer states, and an information processing device. A monitoring device requests, at a specific interval, from one or more printers targeted for monitoring, a response of printer state information related to a state of the printer; receives printer state information in response to the request; and sends the received printer state information to the information processing device. The information processing device manages the state of the printer based on the received printer state information. When requested for a response of printer state information by a different monitoring device, the printer stops requesting a response of printer state information by monitoring devices other than a specific monitoring device.

21 Claims, 27 Drawing Sheets

(51) Int. Cl.
*H04L 29/08* (2006.01)
*H04N 1/32* (2006.01)
*G06F 3/12* (2006.01)
*G06F 11/30* (2006.01)

(52) U.S. Cl.
CPC ..... *H04N 1/00344* (2013.01); *H04N 1/00891* (2013.01); *H04N 1/32539* (2013.01); *H04N 2201/0039* (2013.01)

(56) References Cited

FOREIGN PATENT DOCUMENTS

| | | | |
|---|---|---|---|
| JP | 2006-263963 | A | 10/2006 |
| JP | 2007-293470 | A | 11/2007 |
| JP | 2010-094925 | A | 4/2010 |
| JP | 2010-166310 | A | 7/2010 |
| JP | 2011-245791 | A | 12/2011 |

211

| PRINTER IDENTIFIER | PRINTER ERROR | CPU ERROR | PRINTHEAD ERROR | CUTTER ERROR |
|---|---|---|---|---|
| A0001 | YES | NO | NO | NO |
| A0002 | NO | YES | YES | NO |
| A0003 | NO | NO | NO | YES |
| A0004 | YES | NO | NO | NO |
| ... | | | | |

FIG. 9

INFORMATION PROCESSING DEVICE, PLURAL PRINTERS, PLURAL MONITORING DEVICES AND CONTROL METHOD OF A PRINTER TO ACQUIRE STATUS OF A SELECTED PRINTER THROUGH A SELECTED MONITORING DEVICE

BACKGROUND

1. Technical Field

The present invention relates to a network system, printing device, information processing device, control method of a printing device, and control method of an information processing device.

2. Related Art

A network system including printers (monitored devices), and monitoring devices (agent (computer) terminals) that monitor printer states, is described in JP-A-2007-293470. In the network system in JP-A-2007-293470, the monitoring device sends information related to a state of a printer to an information processing device (server), and the information processing device manages the received information related to the state of the printer, and the state of the printer based on the received information.

Technology related to reducing the power consumption of printers in a network system is described in JP-A-2011-245791.

In a system in which a monitoring device monitors printer states as described in the network system in JP-A-2007-293470, the monitoring device may also be able to monitor the states of multiple printers. When there are multiple monitoring devices that monitor the states of multiple printers in this network system, configuring the system to prevent any single printer from being redundantly monitored by more than one monitoring device is necessary, but this is difficult.

Such network systems may also execute a process for handling a monitoring device (agent terminal) with the ability to monitor the states of multiple printers.

When a printer returns information related to the state of the print unit in response to a response request from a monitoring device, there is also a need to efficiently reduce the power consumption of the printer appropriately to the printer executing such a process.

SUMMARY

An objective of the invention is to provide a network system having printers and monitoring devices that monitor printer states and send information related to those states to an information processing device, wherein when multiple monitoring devices monitor multiple printers in the network system, configuring the system to prevent redundant monitoring of any single printer is simple.

Another objective of the invention is to provide a network system having printers and monitoring devices that monitor printer states and send information related to those states to an information processing device, wherein the information processing device can execute a process for handling a monitoring device having a function a function for monitoring the states of multiple printers.

A further objective of the invention is to efficiently reduce power consumption in a printer that returns information related to the state of the print unit in response to a response request from a monitoring device.

A network system includes a printer, multiple monitoring devices able to monitor printer states, and an information processing device able to communicate with the monitoring devices. A monitoring device has a function of communicating with multiple printers and monitoring the state of the multiple printers; requests, at a specific interval, from one or more printers targeted for monitoring, a response of printer state information related to a state of the printer; receives printer state information in response to the request; and sends the received printer state information to the information processing device. The information processing device manages the state of the printer based on the printer state information received from the monitoring device. When requested for a response of printer state information by a different monitoring device, the printer stops requesting a response of printer state information by monitoring devices other than a specific monitoring device.

When multiple different monitoring devices request a printer for a response of printer state information, a function of the printer automatically stops requesting a response of printer state information by monitoring devices other than a specific monitoring device. Manually configuring the monitoring devices to prevent redundant monitoring of the same printer is therefore not necessary, and can be done automatically.

Preferably in an aspect of the invention, the printer determines, from among the different monitoring devices, in a specific order of priority, a monitoring device to stop requesting the printer state information.

This configuration, using an order of priority, can appropriately determine the monitoring device to be made to stop requesting a response of printer state information.

Preferably in a network system according to another aspect of the invention, the monitoring device has a function of communicating with the printer and monitoring the printer state through a network, or a function of communicating directly with the printer and monitoring the printer state without going through a network; and the printer prioritizes, among the multiple different monitoring devices, as a monitoring device to stop requesting a response of printer state information, a monitoring device that requests a response of printer state information by communicating directly without going through the network, over a monitoring device that requests a response of printer state information by communicating through the network.

This configuration enables efficiently monitoring printers through a network.

Preferably in a network system according to another aspect of the invention, the printer prioritizes, as a monitoring device to stop requesting a response of printer state information, the different monitoring devices in an order of priority in which priority is determined by the communication protocol used for communication.

This configuration enables the printer, using an order of priority in which priority is determined based on the communication protocol used for communication, to appropriately determine the monitoring device to be made to stop requesting a response of printer state information.

Preferably in a network system according to another aspect of the invention, the printer prioritizes, as the monitoring device to stop requesting a response of printer state information, the different monitoring devices in an order of priority in which priority is determined based on the type of communication interface used for communication.

This configuration enables the printer, using an order of priority in which priority is determined based on the type of communication interface used for communication, to appropriately determine the monitoring device to be made to stop requesting a response of printer state information.

Preferably in a network system according to another aspect of the invention, the printer prioritizes, as a monitoring device to stop requesting a response of printer state information, a monitoring device that communicates through a wireless communication interface over a monitoring device that communicates through a wired communication interface.

This configuration enables the printer to prioritize setting, as the transmission-stopped device, monitoring devices that communicate using the interface with less stability.

Preferably in a network system according to another aspect of the invention, the printer prioritizes, as a monitoring device to stop requesting a response of printer state information, the different monitoring devices in descending numerical order based on the number of printers for which the monitoring device monitors a printer state.

This configuration can level the number of printers monitored by the different monitoring devices. Concentrating the processing load on a specific monitoring device can also be prevented. The amount of data related to the printer state information different monitoring devices send to the information processing device can also be leveled.

In a network system according to another aspect of the invention, the printer sends the printer state information to the information processing device when a request for a response of the printer state information is not received from any monitoring device.

When the printer does not receive a response request for printer state information from any monitoring device, the printer can send printer state information to the information processing device, and the information processing device can continue managing the printer state.

To achieve the foregoing objective, another aspect of the invention is a printer able to communicate with multiple monitoring devices, the printer including: a print unit that prints on recording media; and a controller configured to, when a request of a response of printer state information related to a state of the print unit is received from a different monitoring device, stops a monitoring device other than a specific monitoring device from requesting a response of the printer state information.

This enables a simple configuration preventing multiple monitoring devices from redundantly monitoring the same printer.

Another aspect of the invention is a control method of a printer able to communicate with multiple monitoring devices, the control method, when a request of a response of printer state information related to a state of the print unit is received from a different monitoring device, stopping a monitoring device other than a specific monitoring device from requesting a response of the printer state information.

This enables a simple configuration preventing multiple monitoring devices from redundantly monitoring the same printer.

To achieve the foregoing objective, another aspect of the invention is a network system including printers; a monitoring device able to monitor a state of the printer; and an information processing device able to communicate with the monitoring device. The monitoring device has a function of monitoring a state of the multiple printers, and sending to the information processing device, for one or more of the monitored printers, printer state information related to the state of the printer. The information processing device manages the received printer state information; and when printer state information for the same printer is received from multiple different monitoring devices, stops monitoring the state of the printer and sending the printer state information by a monitoring device other than a specific monitoring device.

This configuration can prevent printer state information for the same printer from being redundantly sent to the information processing device. More specifically, in a network system in which monitoring devices monitor the states of printers, and send information related to the monitored states to an information processing device, a process appropriately handling the ability of a monitoring device to monitor the states of multiple printers can be executed.

Preferably, the information processing device prioritizes the multiple different monitoring devices, in a specific order of priority, as a monitoring device to stop monitoring the state of the printer and sending the printer state information.

Using an order of priority, this configuration can appropriately determine the monitoring device to stop from monitoring the printer state and sending printer state information.

Preferably, the information processing device prioritizes the multiple different monitoring devices in descending numerical order based on the number of printers for which the monitoring device monitors a printer state as a monitoring device to stop monitoring the state of the printer and sending the printer state information.

This configuration can level the number of printers monitored by the different monitoring devices. Concentrating the processing load on a specific monitoring device can also be prevented. The amount of data different monitoring devices send to the information processing device can also be leveled.

Preferably in a network system according to another aspect of the invention, the monitoring device has a function of communicating with the printer and monitoring a state of the printer through a network; and the information processing device prioritizes the multiple different monitoring devices as a monitoring device to stop monitoring the state of the printer and sending the printer state information in an order of priority maximizing reducing the communication load on the network as a result of the monitoring device stopping printer state monitoring and sending printer state information.

This configuration effectively reduces the communication load on the network, and can suppress network congestion and the occurrence of communication delays through the network.

Preferably in a network system according to another aspect of the invention, the information processing device prioritizes the multiple different monitoring devices as a monitoring device to stop monitoring the state of the printer and sending the printer state information in an order of priority maximizing reducing the processing load of the monitoring device as a result of the monitoring device stopping printer state monitoring and sending printer state information.

This configuration can effectively greatly reduce the processor load on the monitoring device.

Preferably in a network system according to another aspect of the invention, the information processing device, by sending to the monitoring device a stop instruction instructing stopping printer state monitoring and sending printer state information, stops printer state monitoring and sending printer state information by the monitoring device.

This configuration enables the information processing device to send a stop instruction, and stop a specific monitoring device from monitoring the state of the printer and sending printer state information.

Preferably in a network system according to another aspect of the invention, the monitoring device sends the printer state information at a specific interval to the information processing device; and the information processing device, when printer state information for the same printer is received from multiple different monitoring devices during a specific period appropriate to the specific interval, stops monitoring the state of the printer and sending the printer state information by a monitoring device other than a specific monitoring device.

Based on the monitoring device sending, at a specific interval, printer state information to the information processing device, the information processing device can accurately determine if multiple different monitoring devices are sending printer state information for the same printer.

Preferably in a network system according to another aspect of the invention, the monitoring device, when a printer targeted for state monitoring by the monitoring device is not connected, sends not-connected information, which reports the printer targeted for state monitoring by the monitoring device is not connected, to the information processing device; and when the information processing device receives printer state information for one printer from one monitoring device, and received not-connected information for the same one printer from another monitoring device, the information processing device stops monitoring the state of and sending printer state information for the one printer by the other than monitoring device.

If a monitoring device is monitoring the state of a printer that is not connected, this configuration can stop state monitoring by that monitoring device.

Preferably in a network system according to another aspect of the invention, the information processing device, when the printer state information is not received from the specific monitoring device after stopping monitoring the state of the printer and sending the printer state information by a monitoring device other than a specific monitoring device, cancels stopping monitoring the state of the printer and sending the printer state information by one of the monitoring devices other than the specific monitoring device.

If the monitoring device selected as the device to not stop sending printer state information is unable to send printer state information for the target printer because of a malfunction, the device was replaced, or other reason, this configuration enables a different monitoring device to send printer state information for the target printer.

To achieve the foregoing objective, another aspect of the invention is an information processing device able to communicate with a monitoring device having a function of monitoring a state of multiple printers, and sending, for one or more of the monitored printers, printer state information related to the state of the printer, the information processing device: managing the printer state received from the monitoring device; and when printer state information for the same printer is received from multiple different monitoring devices, stops a monitoring device other than a specific monitoring device from monitoring the state of the printer and sending the printer state information.

This configuration can prevent printer state information for the same printer from being redundantly sent to the information processing device. More specifically, an information processing device in a network system in which monitoring devices monitor the states of printers, and send information related to the monitored states to an information processing device, can execute a process appropriately handling the ability of a monitoring device to monitor the states of multiple printers.

To achieve the foregoing objective, another aspect of the invention is a control method of an information processing device able to communicate with a monitoring device having a function of monitoring a state of multiple printers, and sending, for one or more of the monitored printers, printer state information related to the state of the printer, the control method including: managing the printer state received from the monitoring device; and when printer state information for the same printer is received from multiple different monitoring devices, stopping a monitoring device other than a specific monitoring device from monitoring the state of the printer and sending the printer state information.

This configuration can prevent printer state information for the same printer from being redundantly sent to the information processing device. More specifically, an information processing device in a network system in which monitoring devices monitor the states of printers, and send information related to the monitored states to an information processing device, can execute a process appropriately handling the ability of a monitoring device to monitor the states of multiple printers.

To achieve the foregoing objective, another aspect of the invention is a network system including a printer having a print unit and printing by the print unit on recording media, and a monitoring device able to communicate with the printer. The printer, when in a normal state, which is not a sleep state in which operation of the print unit is restricted, and response request data requesting a response of information related to a state of the print unit is received from the monitoring device, sends printer state information data including information related to a state of the print unit to the monitoring device; and does not send the printer state information data when the response request data is received when in the sleep state. The monitoring device monitors the power state of the printer; and determines the printer is in the sleep state if the response request data is sent to the printer when the printer power is on, but printer state information data as a response to the request data is not then received.

This configuration can suppress unnecessarily shortening the duration of the sleep state, and efficiently reduce power consumption by the printer.

Preferably in an aspect of the invention, when the printer is in the sleep state and received power state response request data used to check the power state, the printer, without changing from the sleep state to the normal state, sends power state response data indicating that the power is in the on state; and the monitoring device sends the power state response request data to the printer, and monitors the power state of the printer based on the state of the response to the request data.

Thus comprised, the monitoring device can desirably monitor the power state of the printer regardless of whether or not the printer is in the sleep state.

Preferably in another aspect of the invention, the network system also has an information processing device able to communicate through a network with the monitoring device. The monitoring device, based on the printer state information data received from the printer, sends to the information processing device printer state information related to a state of the print unit; and when the monitoring device determines the printer is in the sleep state, sends to the information processing device printer state information of the same content as the printer state information last sent. The information processing device manages the printer state information received from the monitoring device.

This configuration enables the monitoring device, while the printer conserves power by not going from the sleep state to the normal state, to send printer state information of appropriate content to the information processing device.

To achieve the foregoing objective, another aspect of the invention is a monitoring device able to communicate with a printer that has a print unit and prints on recording media by the print unit. The monitoring device has a monitoring device controller configured to monitor the power state of the printer. If the printer power is on, response request data requesting a response of information related to a state of the print unit was sent to the printer, and, in response to the response request data, printer state information data including information related to a state of the print unit is not received, the monitoring device controller determines that the printer is in a sleep state in which operation of the print unit is restricted.

This configuration can suppress unnecessarily shortening the duration of the sleep state, and can efficiently reduce power consumption by the printer.

To achieve the foregoing objective, another aspect of the invention is a printer able to communicate with a monitoring device, and having a printer controller. If the printer is in a normal state, which is not a sleep state in which operation of a print unit that prints on recording media is limited, and response request data requesting a response of information related to a state of the print unit was received from the monitoring device, the printer controller sends, to the monitoring device, printer state information data including information related to a printer state; and if the response request data was not received when in the sleep state, does not send the printer state information data.

This configuration can suppress unnecessarily shortening the duration of the sleep state, and can efficiently reduce power consumption by the printer.

To achieve the foregoing objective, another aspect of the invention is a control method of a monitoring device able to communicate with a printer that has a print unit and prints on recording media by the print unit, the control method including: monitoring the power state of the printer; and determining that the printer is in a sleep state in which operation of the print unit is restricted if the printer power is on, response request data requesting a response of information related to a state of the print unit was sent to the printer, and, in response to the response request data, printer state information data including information related to a state of the print unit is not received.

This configuration can suppress unnecessarily shortening the duration of the sleep state, and can efficiently reduce power consumption by the printer.

Objects of the present invention are also met in a network system comprising: a network; printers; multiple monitoring devices each monitoring a state of the at least one printer; and an information processing device in communication with the monitoring devices over the network; wherein the monitoring devices have a function of communicating with the printers they monitor (their monitored printers), a function of monitoring a state of their monitored printers, and a function of sending to the information processing device, for one or more of their monitored printers, printer state information related to state of their monitored printer.

Preferably, the monitoring device requests, at a time interval, from one or more of their monitored printers, a response of printer state information related to a specific printer state, receives the printer state information in response to the request, and sends the received printer state information to the information processing device; the information processing device manages the specific printer state based on printer state information received from the monitoring device; and a monitored printer, when receiving multiple requests for a response of the printer state information from a multiple different monitoring devices, stops all but one specific monitoring device from requesting a response of the printer state information.

Further preferably, the monitored printer determines, from among the multiple different monitoring devices, in a specific order of priority, the monitoring devices to designate as stopped devices, which are stopped from requesting the response of the printer state information from the monitored printer.

Additionally, the monitoring devices have a function of monitoring their monitored printers by communicating with their monitored printers through one of the network or by direct communication avoiding the network; and in the specific order of priority, monitoring devices that use direct communication avoiding the network to monitor the monitored printer are given a higher priority for being designated stopped devices over monitoring devices that use the network.

Alternatively, the order of priority is based on a communication protocol used by each respective monitoring device to communicate with the monitored printer.

Further alternatively, the order of priority is determined based on a type of communication interface used for communication between the monitored printer and a respective monitoring device.

Optionally, in the specific order of priority, monitoring devices that communicate with the monitored printer through a wireless communication interface have a higher priority for being designated stopped devices than monitoring devices that communicates with the monitored printer through a wired communication interface.

If desired, in the specific order of priority, monitoring devices are prioritized for designation as stopped devices in descending numerical order based on their respective number of monitored printers, with monitoring devise that have a higher number of monitored printers being given a higher priority.

Preferably, a printer sends its printer state information to the information processing device when no request for a response of the printer state information is received from any monitoring device.

In the above described system, the information processing device manages the received printer state information; and when the information processing device receives printer state information for the same printer from multiple different monitoring devices, the information processing device designates a specific monitoring device as a chosen device for monitoring the same printer and issues a stop command to another monitoring device to stop monitoring the state of the same printer Preferably, the information processing device prioritizes the multiple different monitoring devices that provide state information for the same printer, in a specific order of priority, as stopped monitoring devices, which are stopped from monitoring the state of the same printer and sending printer state information of the same printer.

Additionally, in a specific order of priority, the multiple different monitoring devices are prioritized in descending numerical order based on their respective number of monitored printers.

Preferably, the monitoring devices monitor their monitored printers through the network; and the information processing device prioritizes the multiple different monitoring devices so as to balance a communication load on the network by stopping some monitoring devices from monitoring the same monitored printer.

Alternatively, in a specific order of priority, monitoring devices that have a higher number of monitored printers are given a higher priority for designation as a stopped monitoring device in order to reduce their processing load.

Further preferably, the information processing device stops a monitoring device from monitoring a specific one of its monitored printers by sending to the monitoring device a stop instruction instructing a stopping of printer state monitoring of the specific monitored printer.

Furthermore, the monitoring devices send printer state information at a specific interval to the information processing device; and the information processing device, when printer state information for the same printer is received from multiple different monitoring devices during a specific period appropriate to the specific interval, the information processing device designates a specific monitoring device for monitoring the same printer and stops another monitoring the state from monitoring the same printer.

Preferably, the monitoring devices, when one of their monitored printers is not connected, sends not-connected information identifying the monitored printer that is not connected, to the information processing device; and when the information processing device receives not-connected information for the same one printer from two monitoring devices, the information processing device instructs one of the two monitoring device to stop monitoring the state of, and sending printer state information for, the same one printer.

Additionally, the information processing device, in response to not receiving printer state information from the specific monitoring device, removes the chosen device designation from the specific monitoring device, cancels the stop command issued to the another monitoring device, and designates the another monitoring device as the chosen device for monitoring the same printer.

Objects of the present invention are also met in a control method of a printer able to communicate with multiple printer-monitoring devices, having: providing printer state information in response to receiving a request for printer state information from a single one of said multiple printer-monitoring devices; in response to receiving multiple requests for printer state information from multiple printer-monitoring devices, providing printer state information to a selection one printer-monitoring device and stopping another of the multiple printer-monitoring devices from requesting printer state information.

Objects of the present invention are met in a printer supporting communication with multiple printer-monitoring devices, having: a print unit that prints on recording media; and an electronic controller executing the above control method of a printer.

Objects of the present invention are also met in a control method of an information processing device able to communicate with multiple monitoring devices, each having a function of monitoring a state of multiple printers and sending printer state information of one or more of its monitored printers to the information processing device, the control method including: managing the printer state received from the multiple monitoring devices; and in response to receiving printer state information for the same printer from plural different monitoring devices, designating a specific monitoring device for monitoring the same printer and stopping another monitoring device from monitoring the same printer.

Objects of the present invention are also met in an information processing device having: a network interface controller for communicating with multiple monitoring devices, and receiving printer state information from the multiple monitoring devices; and an electronic controller executing the above control method of an information processing device.

BRIEF DESCRIPTION OF THE DRAWINGS

FIG. 9 shows an example of the data structure of a status database.

DESCRIPTION OF EMBODIMENTS

Embodiment 1

A first embodiment of the invention is described below with reference to the accompanying figures.

Figure 1:
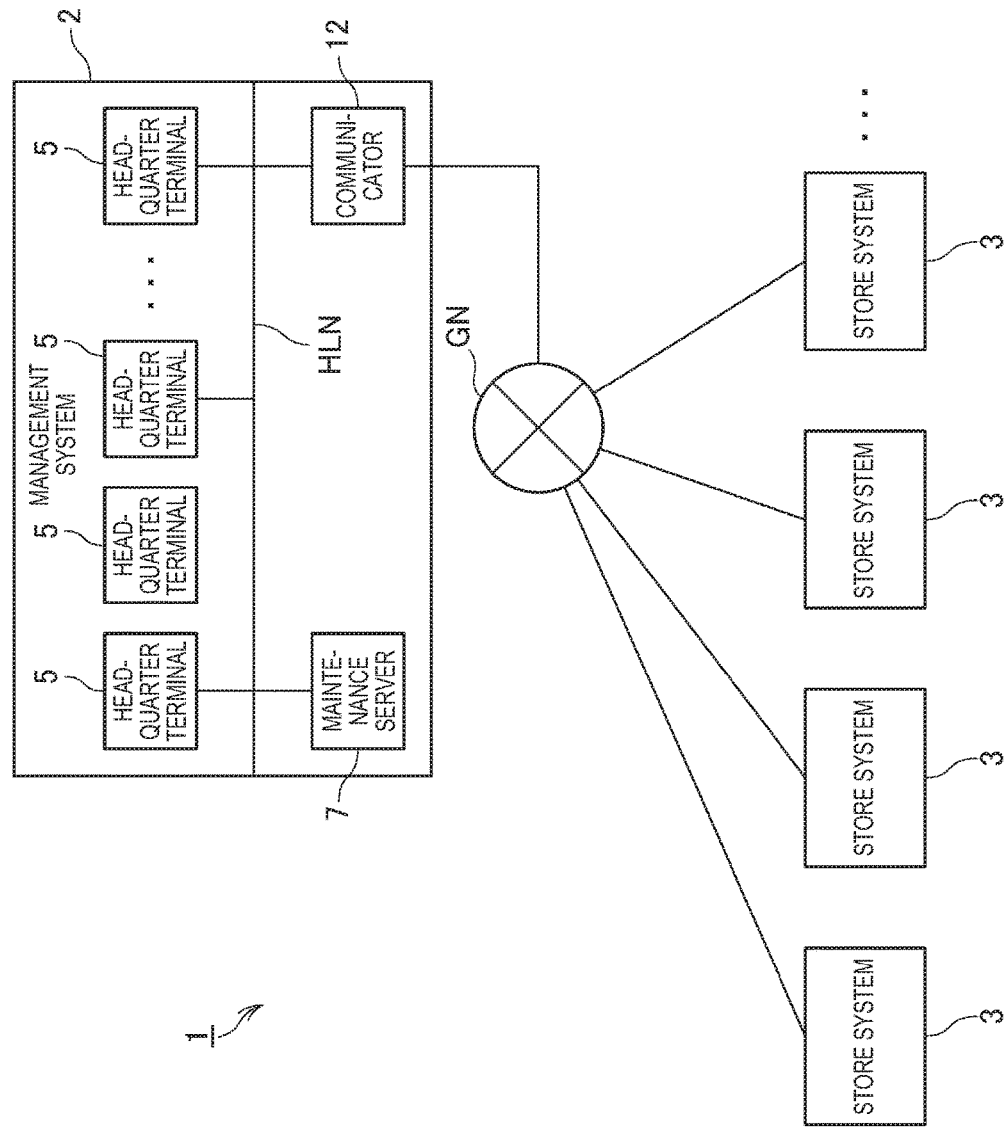
FIG. 1 illustrates the configuration of a network system according to an embodiment of the invention.

FIG. 1 illustrates the configuration of a network system 1 according to the first embodiment of the invention. The network system 1 is a system used by a company that manages stores, such as supermarkets, convenience stores, department stores, or restaurants, that provide products or services and process transactions according to the provided product or service.

As shown in FIG. 1, the network system 1 includes a management system 2 and multiple store systems 3. The management system 2 and each of the store systems 3 are communicatively connected through a global network GN comprising the Internet and other networks.

The management system 2 is a system deployed in the headquarters of a company using the network system 1. As shown in FIG. 1, the management system 2 includes a headquarter-side local area network HLN. The communication protocol used over the headquarter-side local area network HLN may be any desirable protocol, and communication through the local area network may be by wired communication or wireless communication.

One or more headquarter (computer) terminals 5, a maintenance server 7 (information processing device), and a communicator 12 are connected to the headquarter-side local area network HLN.

The headquarter terminal 5 is a computer used in the corporate headquarters by company employees or other corporate personnel.

The maintenance server 7 is a server that communicates with a agent terminal 6 (monitoring device) described further below, and executes specific processes.

The configuration, function, and processes based on the functions of the maintenance server 7 are described further below.

The communicator 12 is an interface device that connects a local area network such as the headquarter-side local area network HLN or a store-side local area network TLN described further below to the global network GN. The communicator 12 functions as a modem (or ONU (Optical Network Unit)), a router, a NAT (Network Address Translation) function, and a DHCP (Dynamic Host Configuration Protocol). The communicator may include a network interface controller (NIC).

The communicator 12 relays data that is sent and received when a device connected to a local area network and a device connected to the global network GN communicate. Note that in FIG. 1 the communicator 12 is represented by a single block, but the communicator 12 may comprise multiple devices with specific functionality.

The maintenance server 7 of the management system 2 uses functions of the communicator 12 to communicate with a printer 9 or the agent terminal 6 through the headquarter-side local area network HLN, global network GN, and the store-side local area network TLN described below.

Note that in FIG. 1 the maintenance server 7 is represented by single function blocks, but this does not mean the server is configured by a single server devices. For example, the maintenance server 7 may be configured to include multiple server devices.

Figure 2:
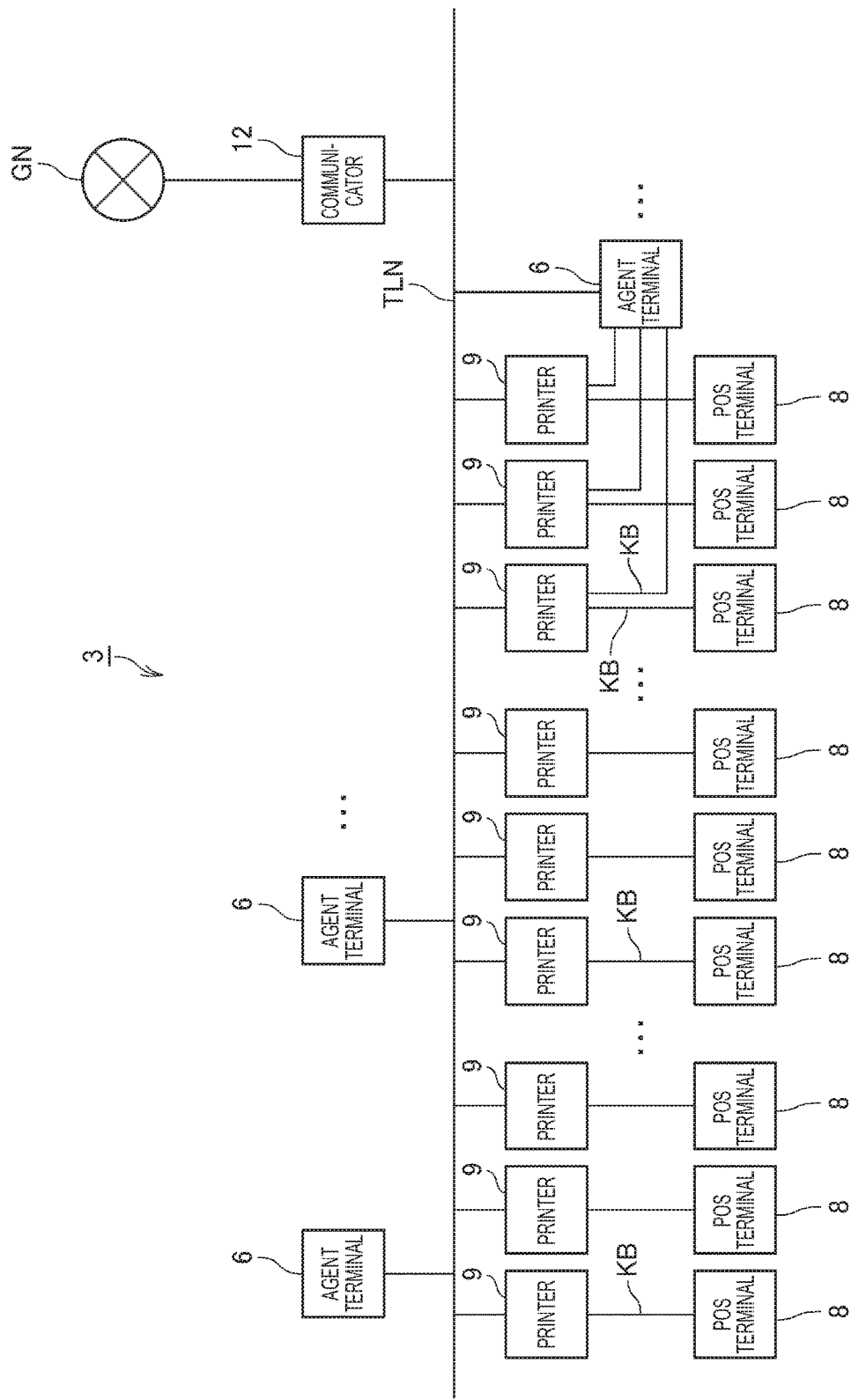
FIG. 2 illustrates the configuration of a store system.

FIG. 2 illustrates the configuration of the store system 3.

As shown in FIG. 2, the store system 3 has a store-side local area network TLN, that is, a local area network deployed in the store. The communication protocol used on the store-side local area network TLN may be any desirable protocol, and communication through the local area network may be by wired communication or wireless communication.

One or more printers 9 connect to the store-side local area network TLN.

Checkout counters where customer transactions are performed are provided in the store, and a printer 9, and a POS terminal 8 that connects and controls to the printer 9 is disposed at each checkout counter.

The printer 9 is a device with printing function.

The printer 9 is a device with a function for sending information related to the state of the printer 9 to a maintenance server 7.

The POS terminal 8 is a terminal on which a POS application and printer driver are installed. The POS terminal 8 runs a transaction process according to transactions at the checkout counter, and controls the printer 9 to produce a receipt based on the transaction process. The receipt produced by the printer 9 is then given by the checkout clerk to the customer.

The configuration, functions, and processes based on those functions of the printer 9 and POS terminal 8 are described further below.

One or more agent terminals 6 connect to the store-side local area network TLN.

An agent terminal 6 communicates with one or more printers 9 the agent terminal 6 monitors, receives from the printer 9 information related to a state of the printer 9, monitors the state of the printer 9, and using functions of the communicator 12, sends information related to the state to the maintenance server 7 through the store-side local area network TLN, global network GN, and headquarter-side local area network HLN.

The agent terminal 6 can communicate through the store-side local area network TLN with the printer 9, and receive from the printer 9 information related to a state of the printer 9. The agent terminal 6 can communicate and receive information related to a state of the printer 9 directly instead of through the store-side local area network TLN.

While detailed description is omitted, communication between the maintenance server 7, agent terminal 6, and printer 9 is made secure by using a virtual private network (VPN) or other type of encryption technology or virtual dedicated line (or physical dedicated line) technology.

Figure 3:
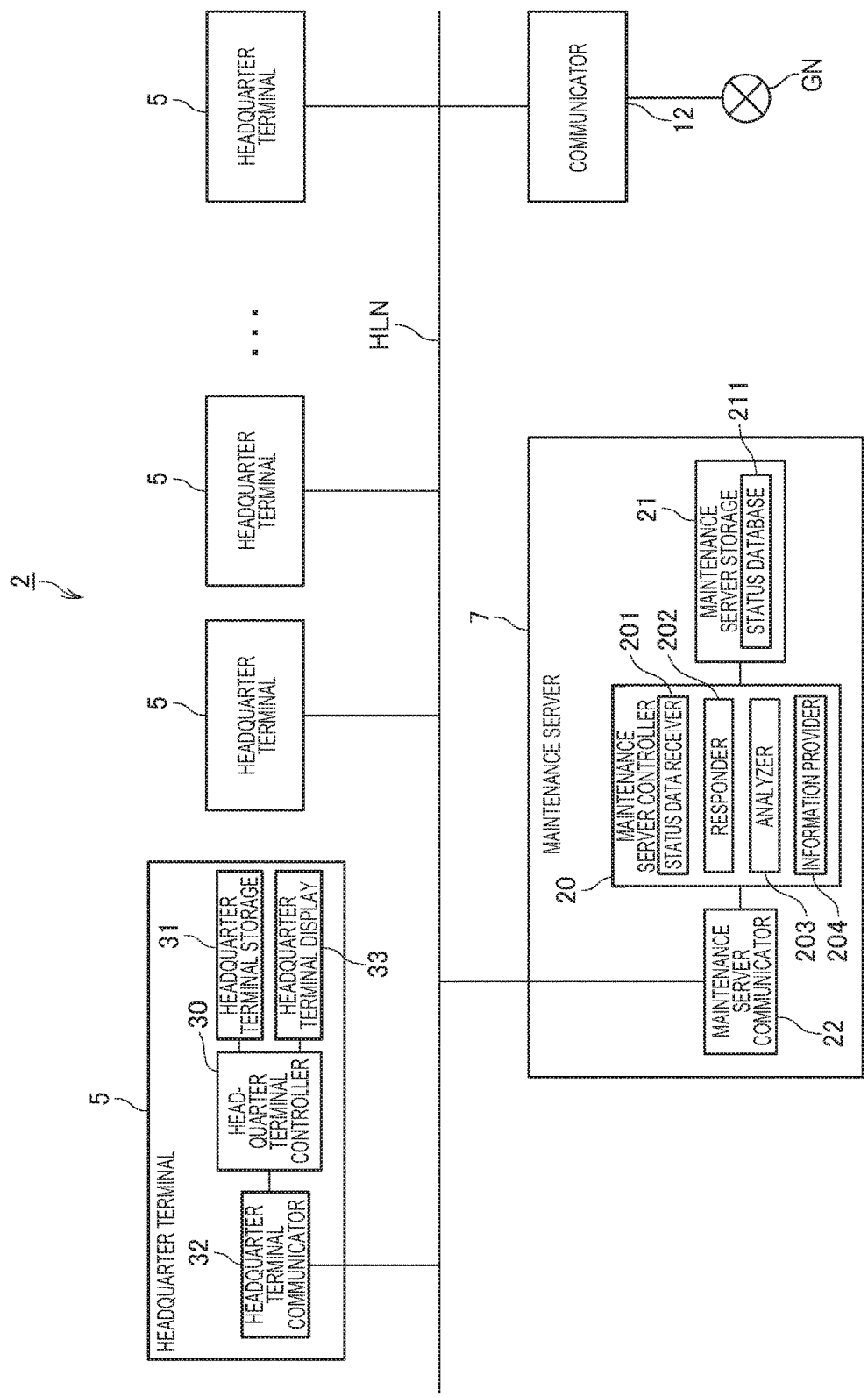
FIG. 3 is a block diagram illustrating the functional configuration of devices in the management system.

FIG. 3 is a block diagram of the functional configuration of the maintenance server 7 and headquarter terminal 5 in the management system 2.

As shown in FIG. 3, maintenance server 7 has a maintenance server controller 20, maintenance server storage 21, and maintenance server communicator 22.

The maintenance server controller 20 has a CPU, ROM, RAM, and other peripheral circuits not shown, and controls the maintenance server 7.

The maintenance server controller 20 has a status data receiver 201, responder 202, analyzer 203, and information provider 204. These function blocks execute processes by the cooperation of hardware and software, such as a CPU reading and running a program (such as an operating system and a specialized application that runs on specific server software). The functions and processes based on the functions of these function blocks are described further below.

The maintenance server storage 21 has nonvolatile storage such as a hard disk drive or an EEPROM device, and stores data (such as a status database 211).

The maintenance server communicator 22 accesses the global network GN as controlled by the maintenance server controller 20 to communicate with devices (including an agent terminal 6 and printer 9) connected to the network.

As shown in FIG. 3, headquarter terminal 5 has a headquarter terminal controller 30, headquarter terminal storage 31, headquarter terminal communicator 32, and headquarter terminal display 33. The headquarter terminal controller 30 controls the headquarter terminal 5. The headquarter terminal storage 31 stores data. The headquarter terminal communicator 32 communicates as controlled by the headquarter terminal controller 30. The headquarter terminal display 33 has an LCD panel or other display panel and displays information as controlled by the headquarter terminal controller 30.

A specific browser is installed on the headquarter terminal 5.

Figure 4:
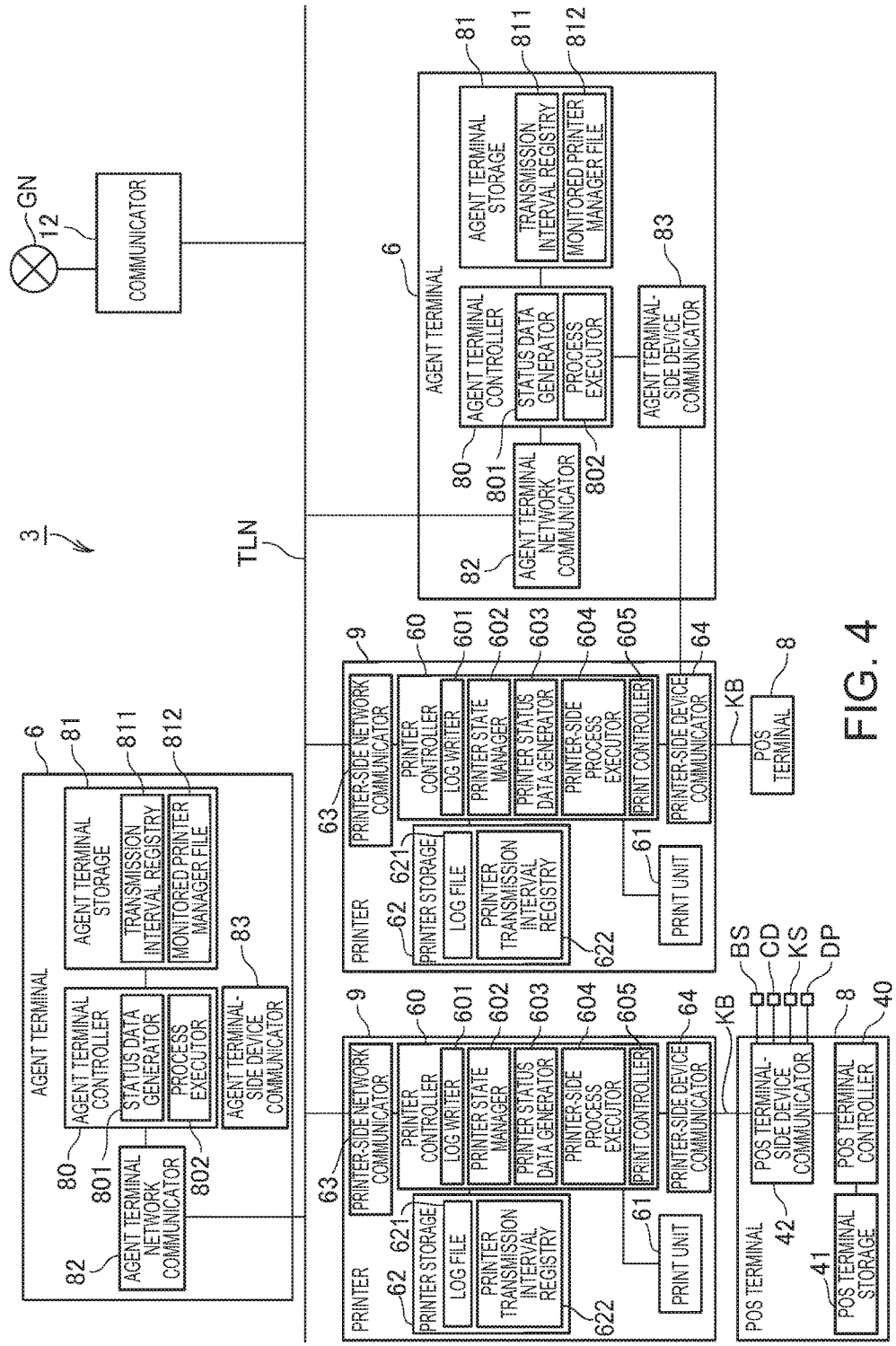
FIG. 4 is a block diagram illustrating the functional configuration of devices in a store system.

FIG. 4 is a block diagram illustrating the functional configuration of a POS terminal 8, printer 9, and agent terminal 6 in the store system 3.

The POS terminal 8 is a host computer that controls the printer 9. More specifically, the POS terminal 8 executes a transaction process based on a transaction performed at the checkout counter, controls the printer 9 based on the transaction process, and causes the printer 9 to produce a receipt.

As shown in FIG. 4, POS terminal 8 has a POS terminal controller 40, POS terminal storage 41, and POS terminal-side device communicator 42.

The POS terminal controller 40 has CPU, ROM, RAM, and other peripheral circuits not shown, and controls the POS terminal 8.

A POS application and printer driver are installed on the POS terminal 8. The POS terminal controller 40, by functions of the POS application and printer driver, generates and sends control commands to the printer 9, and controls the printer 9.

The POS terminal storage 41 has nonvolatile memory and stores data.

The POS terminal-side device communicator 42 has an interface board with a USB port, a port conforming to a non-USB serial communication standard, or port conforming to another communication protocol. The POS terminal-side device communicator 42 communicates with devices (including printer 9) connected to the ports as controlled by the POS terminal controller 40. Note that the POS terminal-side device communicator 42 may have a wireless communication capability and be configured to communicate with devices wirelessly.

In the example shown in FIG. 4, a printer 9, barcode scanner BS, customer display CD, cash drawer KS, and display DP connect as peripheral devices to the POS terminal 8.

The printer 9 and POS terminal 8 in this embodiment are connected through a USB cable KB. The POS terminal-side device communicator 42 communicates, as controlled by the POS terminal controller 40, by USB with the printer 9.

The printer 9 and POS terminal 8 in this embodiment are connected through a USB cable KB in this embodiment, but may be configured to communicate by another communication protocol. For example, the printer 9 and POS terminal 8 may connect through the store-side local area network TLN, and communicate by a LAN communication protocol. The printer 9 and POS terminal 8 may also connect wirelessly.

The barcode scanner BS reads barcodes from products and product packaging, and outputs data representing the read result to the POS terminal-side device communicator 42. The POS terminal-side device communicator 42 outputs the data input from the barcode scanner BS to the POS terminal controller 40.

The customer display CD is an LCD display or other type of display device, and displays information as controlled by the POS terminal controller 40. Information displayed on the customer display CD can be seen by the customer in the transaction at the checkout counter.

The cash drawer KS has a tray for holding money, mechanisms for locking and unlocking the tray, and a mechanism for kicking out the tray, and releases the lock and kicks out the tray as controlled by the POS terminal controller 40.

The display DP is an LCD display or other type of display device, and displays information as controlled by the POS terminal controller 40. The display DP is located where the displayed information can be seen by the checkout clerk processing the transaction at the checkout counter.

The printer 9 is a thermal line printer that stores roll paper and prints images by forming dots on the roll paper with a thermal line head.

As shown in FIG. 4, printer 9 has a printer controller 60 (controller), print unit 61, printer storage 62, printer-side network communicator 63, and printer-side device communicator 64.

The printer controller 60 comprises a CPU, ROM, RAM, and other peripheral circuits not shown and controls the printer 9.

The printer controller 60 has a log writer 601, printer state manager 602, printer status data generator 603, printer-side process executor 604, and print controller 605. These function blocks execute processes by the cooperation of hardware and software, such as a CPU reading and running a program (such as firmware). The functions and processes based on the functions of these function blocks are described further below.

The print unit 61 includes a conveyance mechanism for conveying roll paper stored inside the printer 9, a print mechanism for printing on the roll paper with a thermal head, and a cutter mechanism for cutting the roll paper with a cutter. The print unit 61 prints receipt-related images on the roll paper with thermal head while conveying the roll paper with the conveyance mechanism, and cuts the roll paper at a specific position by the cutter as controlled by the printer controller 60, producing a receipt.

The printer storage 62 has nonvolatile memory and stores data. The printer storage 62 stores at least a log file 621 and a printer transmission interval registry 622.

The printer-side network communicator 63 communicates as controlled by the printer controller 60 through the store-side local area network TLN with devices (including agent terminal 6) connected to the store-side local area network TLN.

The printer-side network communicator 63 also communicates as controlled by the printer controller 60 through the global network GN with devices (including maintenance server 7) connected to the global network GN.

Communication interfaces of the printer-side device communicator 64 include a serial interface, parallel interface, USB interface, and Bluetooth® interface.

The serial interface is configured with an interface board having a port compatible with a specific serial communication protocol, such as RS-232, or configurations for communication by other specific serial communication protocol, and enables communicating by the specific serial communication protocol as controlled by the printer controller 60 with another device connected by a cable through the corresponding port.

The parallel interface is configured with an interface board having a port compatible with a specific parallel communication protocol, such as IEEE-1284, or configurations for communication by other specific parallel communication protocol, and enables communicating by the specific parallel communication protocol as controlled by the printer controller 60 with another device connected by a cable through the corresponding port.

The USB interface is configured with an interface board having a port compatible with a specific USB communication protocol, and enables communicating by the USB communication protocol as controlled by the printer controller 60 with another device connected by a cable through the corresponding port.

The Bluetooth® interface is configured with an wireless Bluetooth® communication module, and enables communicating by Bluetooth® as controlled by the printer controller 60 with another Bluetooth® device.

Below, the agent terminal 6 and printer 9 are said to be directly connected when the agent terminal 6 communicates with the printer 9 by USB or other communication protocol instead of through the store-side local area network TLN. The agent terminal 6 and printer 9 are also said to communicate directly when the agent terminal 6 communicates with the printer 9 without going through the store-side local area network TLN.

When connected directly to the agent terminal 6, the printer-side device communicator 64 communicates with the agent terminal 6 as controlled by the printer controller 60.

An agent terminal 6 is a device with ability to communicate with one or more printers 9 to be monitored, monitor the state of the one or more printers 9, and send information related to the states to the maintenance server 7.

The agent terminal 6 can also communicate through the store-side local area network TLN with the printers 9, or communicate directly with the printers 9 without going through the store-side local area network TLN.

As shown in FIG. 4, agent terminal 6 has an agent terminal controller 80 (control device controller), agent terminal storage 81, agent terminal network communicator 82, and agent terminal-side device communicator 83.

The agent terminal controller 80 has a CPU, ROM, RAM, and other peripheral circuits not shown, and controls the agent terminal 6.

The agent terminal controller 80 has a status data generator 801 and process executor 802. These function blocks execute processes by the cooperation of hardware and software, such as a CPU reading and running a program (client software corresponding to the server software of the maintenance server 7). The functions and processes based on the functions of these function blocks are described further below.

The agent terminal storage 81 has nonvolatile memory and stores data. The agent terminal storage 81 stores at least a transmission interval registry 811 and a monitored printer manager file 812.

The agent terminal network communicator 82, as controlled by the agent terminal controller 80, communicates through the store-side local area network TLN with devices (including printers 9) connected to the store-side local area network TLN.

The agent terminal network communicator 82 also communicates, as controlled by the agent terminal controller 80, through the global network GN with devices (including maintenance server 7) connected to the global network GN.

The agent terminal-side device communicator 83 has an interface board with communication ports such as a USB port or other non-USB serial communication standard (such as RS-232C), or a port compatible with a specific parallel communication protocol (such as IEEE-1284), or other type of communication port. The agent terminal-side device communicator 83, as controlled by the agent terminal controller 80, communicates devices (including printer 9) connected to a port, and communicates using the communication protocol corresponding to that port.

As described above, the network system 1 includes a maintenance server 7. The maintenance server 7 manages the state of printers 9 in the store system 3. The maintenance server 7 also provides information that is useful for printer 9 maintenance to the person (referred to below as maintenance technician) responsible for printer 9 maintenance in the store system 3.

The operation of devices in the network system 1 when managing the status of the printers 9 is described below.

The agent terminal 6 and maintenance server 7 communicate according to HTTP (Hypertext Transfer Protocol). More specifically, the agent terminal 6 is an example of a client in a client-server system and the maintenance server 7 is a server in a client-server system. The agent terminal 6 sends an HTTP request (response request; request) to the maintenance server 7. As described below, the agent terminal 6 sends an HTTP request at a specific (optionally regular) interval to the maintenance server 7. When an HTTP request is received, the maintenance server 7 sends a HTTP response (response) to the agent terminal 6.

As a result, data can be sent and received between the agent terminal 6 and maintenance server 7 by the agent terminal 6 sending a response request and the maintenance server 7 returning a response to the response request. Data can therefore not be transmitted asynchronously from the maintenance server 7 to a specific agent terminal 6, and data is sent from the maintenance server 7 to a specific agent terminal 6 in the form of data transmitted as a response to a response request from the specific agent terminal 6.

As described below, this also applies to communication between the printer 9 and maintenance server 7 when the printer 9 sends to the maintenance server 7 information related to a state of the printer 9.

Processes of the printer 9, agent terminal 6, and maintenance server 7 for the maintenance server 7 to manage the state of the printer 9 is described below.

For the maintenance server 7 to manage the state of a printer 9, the agent terminal 6 has a function (referred to below as the agent terminal Send function) for sending to the maintenance server 7 information related to a state of the printer 9 being monitored. The printer 9 also has a function (referred to below as the printer Send function) for sending information related to the state of the printer 9 to the maintenance server 7, and in specific circumstances described below, sending information related to the state of the printer 9 to the agent terminal 6.

The processes of the devices when the maintenance server 7 manages the state of a printer 9 based on the Send function of the agent terminal 6, and when the maintenance server 7 manages the state of a printer 9 based on the printer Send function of the printer 9, are described below.

Figure 5:
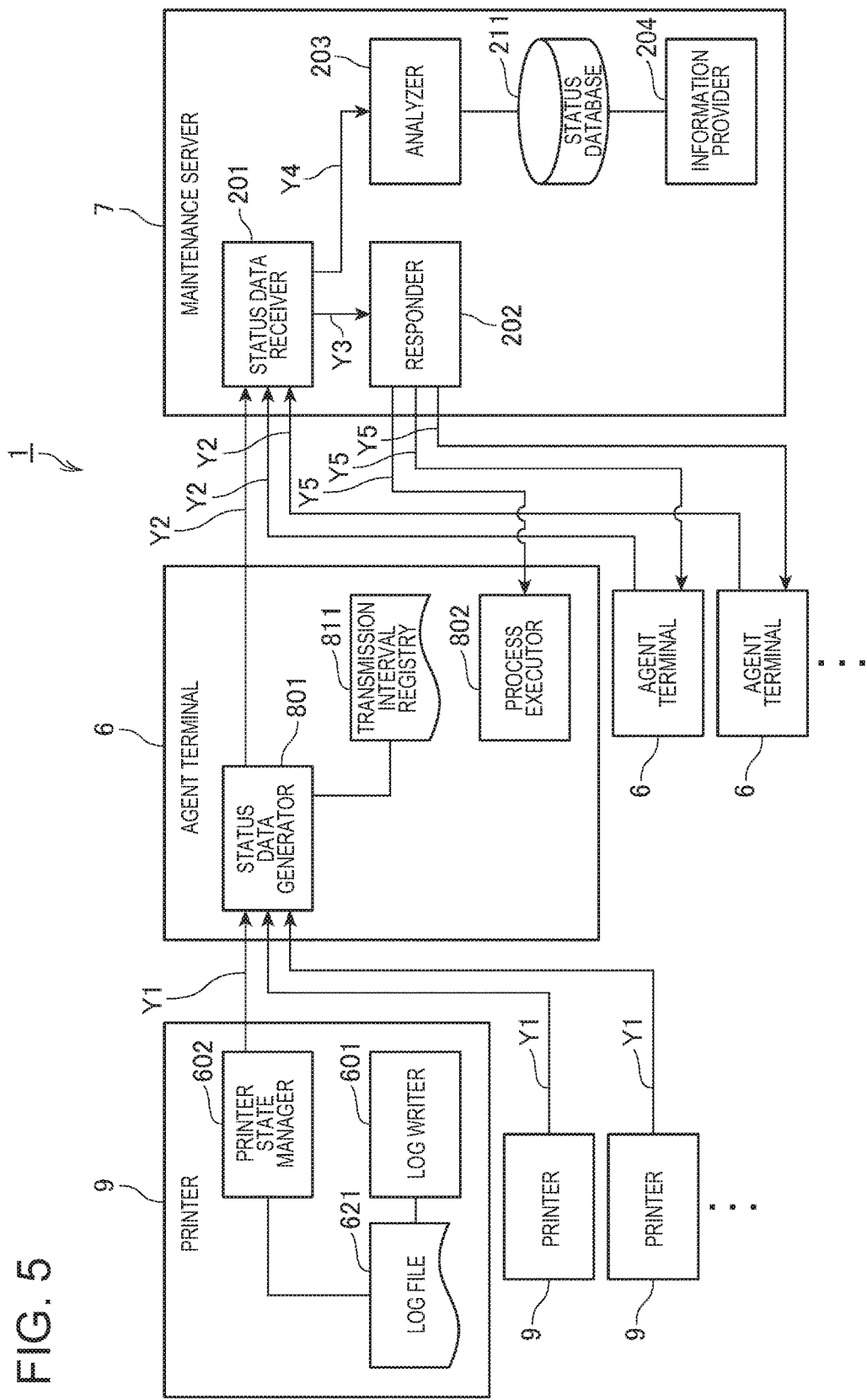
FIG. 5 illustrates the flow of data between devices in the network system.

FIG. 5 illustrates a situation where the maintenance server 7 manages the state of a printer 9 based on the agent terminal Send function of the agent terminal 6.

FIG. 5 shows function blocks of a printer controller 60 (see FIG. 4) of a printer 9, function blocks of an agent terminal controller 80 of an agent terminal 6, and function blocks of the maintenance server controller 20 (see FIG. 3) of maintenance server 7, together with the associated data.

The basic flow of data exchanged between the function blocks of the printer 9, agent terminal 6, and maintenance server 7 when the maintenance server 7 manages the state of the printer 9 is described below using FIG. 5.

Details of the processes of the function blocks, and the content of data exchanged between the function blocks, is described further below and omitted here in the description using FIG. 5.

As shown in FIG. 5, the log writer 601 of the printer 9 writes log information (e.g. status log information) to the log file 621 at specific times.

The log file 621 is a file to which log information is written.

The log information is a record of multiple log items.

A log item is a state (e.g. status) of the print unit 61 that is monitored for changes, and is previously defined as a log item to be monitored and recorded (logged). Examples of log items in this embodiment of the invention include printer errors, the total number of lines formed (or printed) by the printhead, and the total number of times the cutter was used.

Note that these are examples of log items used in this embodiment of the invention, and other items may be logged in addition to the foregoing items or instead of one or more of the foregoing items. In other words, a log item may be an item related to any state of the print unit 61.

Information indicating if a printer error occurred, information indicating if a printer error was resolved, and information indicating the (current) date and time (of such occurrences and resolutions) are recorded chronologically as log entries in the log file 621. A printer error occurs when normal printing is not possible, such as when the roll paper runs out, the roll paper jams, or the printhead overheats.

The log writer 601 monitors if a printer error occurred and if the printer error was resolved (log item: monitor printer error status), and records a log of printer error log items and printer error resolution log items in the log file 621.

Information denoting the total number of lines printed by the printhead, and information denoting the time and date, are recorded chronologically in the log file 621 as a log of total printed line count log items.

The total printed line count is the total number of lines printed by the printhead. As described above, the print unit 61 of the printer 9 in this embodiment of the invention prints images by repeatedly alternating between forming one line of dots with the printhead, and conveying the roll paper one line by the conveyance mechanism.

The log writer 601 acquires the total number of lines printed by the printhead during a specific time (log item: monitor total printed line count), and records a log of total printed line count log items in the log file 621.

Information denoting the cumulative total number of times the cutter is used, and information denoting the time and date, are recorded chronologically in the log file 621 as a log of total cutter operation count log items.

The total cutter operation count is the total number of times the cutter cuts the roll paper.

The log writer 601 acquires the total cutter operation count at a specific interval (log item: monitor the total cutter operation count) and records a log of total cutter operation count log items in the log file 621.

As shown in FIG. 5, the printer state manager 602 of the printer 9 generates and sends to the agent terminal 6 printer state information data JD (arrow Y1) based on the log information written in the log file 621 in response to receiving a response request from the agent terminal 6.

The status data generator 801 of the agent terminal 6 communicates with each (of preferably multiple) monitored printer 9, and receives printer state information data JD from each monitored printer 9. As described above, the agent terminal 6 may communicate with a printer 9 through the store-side local area network TLN, or communicate with a printer 9 directly.

The status data generator 801 references the transmission interval registry 811 and generates status data ST based on the received printer state information data JD at the interval specified in the transmission interval registry 811.

The status data generator 801 sends the generated status data ST to the maintenance server 7 (arrow Y2). In other words, the status data generator 801 generates and sends status data ST to the maintenance server 7 at the interval indicated in the transmission interval registry 811.

The status data generator 801 preferably sends status data ST to the maintenance server 7 by HTTP as a HTTP request.

The status data receiver 201 of the maintenance server 7 receives the status data ST. The status data receiver 201 outputs the status data ST to the responder 202 (arrow Y3). The status data receiver 201 also outputs the received status data ST to the analyzer 203 (arrow Y4).

The responder 202 generates response data TD, and sends the generated response data TD to the agent terminal 6 (arrow Y5). The responder 202 sends the response data TD by HTTP as an HTTP response.

The analyzer 203 then updates the status data database 211 based on the status data ST input from the status data receiver 201.

The information provider 204, based on the status database 211 updated by the analyzer 203, provides to the maintenance technician information related to printer 9 maintenance in response to a request based on a maintenance technician command from the headquarter terminal 5.

The process executor 802 of the agent terminal 6 receives the response data TD. The process executor 802 then executes a process based on the received response data TD.

The status data generator 801 then references the transmission interval registry 811, and generates and sends status data ST at the interval defined in the registry to the maintenance server 7.

As described above, data is sent and received between the agent terminal 6 and the maintenance server 7 through a process of the agent terminal 6 intermittently sending status data ST to the maintenance server 7, and the maintenance server 7 sending response data TD to the agent terminal 6.

Operation of the printer 9, agent terminal 6, and maintenance server 7 to manage the state of the printer 9 is described next.

Figure 6:
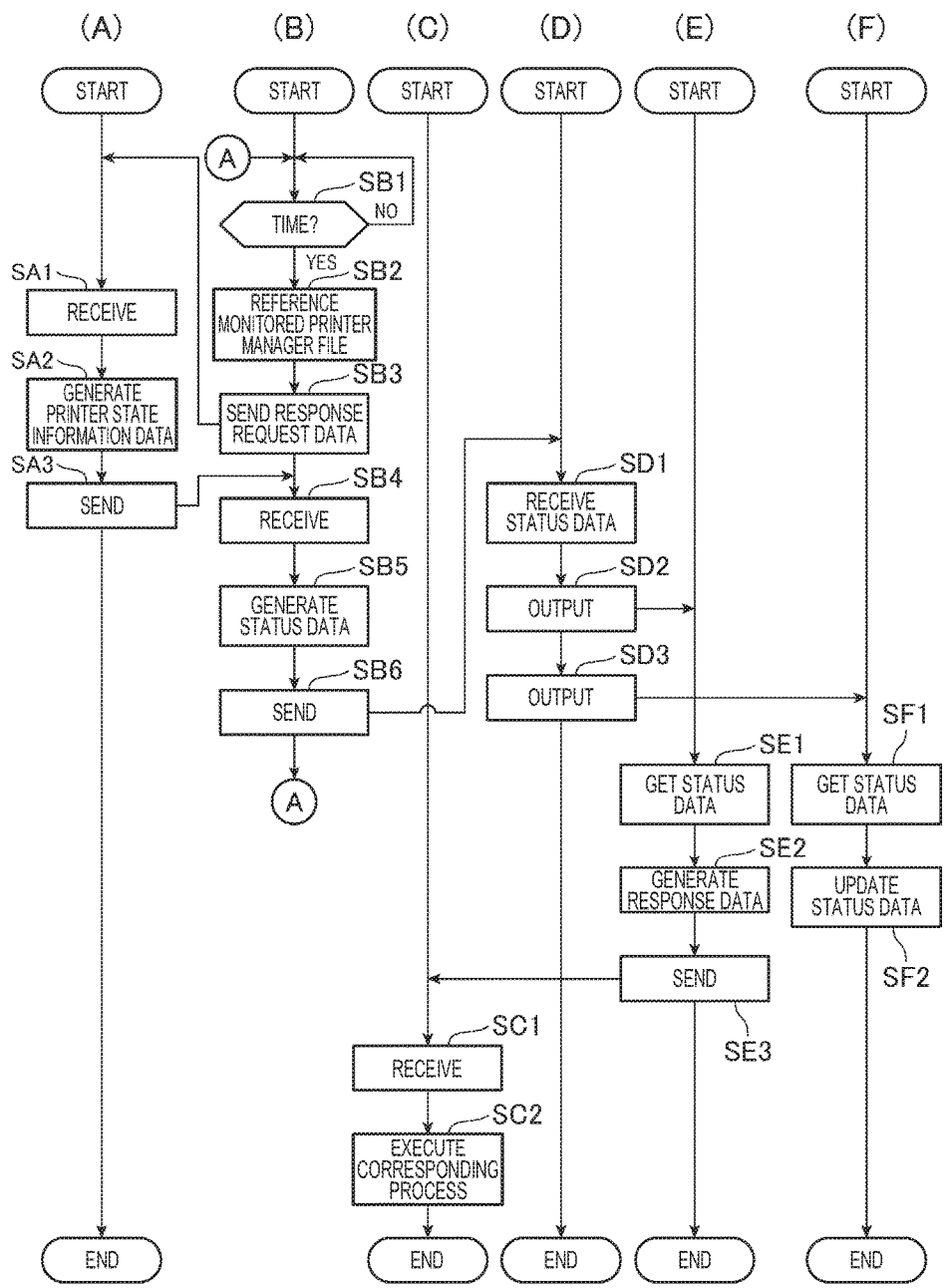
FIG. 6 is a flow chart of the operation of devices in the network system.

FIG. 6 is a flow chart of the operation of the printer 9, agent terminal 6, and maintenance server 7.

In FIG. 6, column (A) shows the operation of the printer state manager 602 of printer 9. In FIG. 6, column (B) shows the operation of the status data generator 801 of the agent terminal 6, and column (C) shows the operation of the process executor 802 of the agent terminal 6. Column (D) shows the operation of the status data receiver 201 of the maintenance server 7, column (E) shows the operation of the responder 202 of the maintenance server 7, and column (F) shows the operation of the analyzer 203 of the maintenance server 7.

As shown in FIG. 6, column (B), the status data generator 801 of the agent terminal 6 references the transmission interval registry 811 (see FIG. 4, FIG. 5), and determines if the time to generate status data ST has come (step SB1).

The transmission interval registry 811 is a file storing information indicating the interval for generating and sending status data ST. In step SB1, the status data generator 801 references the transmission interval registry 811, and determines it is time to generate status data ST if the interval (time) set in the transmission interval registry 811 has elapsed since the last time the status data ST was generated and sent.

If the time for generating status data ST has come (step SB1: YES), the status data generator 801 references the monitored printer manager file 812 (FIG. 4) (step SB2).

The monitored printer manager file 812 is a file for managing information related to printers 9 the agent terminal 6 monitors. Information related to each monitored printer 9 is relationally stored in the monitored printer manager file 812 according to the printer identifier of each monitored printer 9. The information related to the printer 9 includes the information required to send response request data DD described below, such as the address of the printer 9 on the store-side local area network TLN, to the monitored printer 9.

Each printer identifier is information uniquely identifying a corresponding printer 9, such as the serial number (a number uniquely assigned to each printer 9 when the printer 9 is manufactured) of the printer 9.

After referencing the monitored printer manager file 812, the status data generator 801, based on the content of the file, controls the agent terminal network communicator 82 to send, to each monitored printer 9, a response request (data DD) for printer state information (step SB3).

The response request data DD for printer state information is data requesting the printer 9 to respond with (return) its printer state information data JD.

Note that column (A) in FIG. 6 shows an exemplary process of a single printer 9 monitored by the agent terminal 6, and addressed by step SB4 in the process of column (B). It is to be understood that each of the multiple printers monitored by agent terminal 6, and addressed by step SB4, would execute a similar process as shown in column (A).

As shown in FIG. 6, column (A), the printer state manager 602 of printer 9 controls the printer-side network communicator 63 to receive the response request data DD for printer state information sent by the agent terminal 6 (step SA1).

Next, the printer state manager 602 references the log file 621 and generates the printer state information data JD (step SA2).

Figure 7:
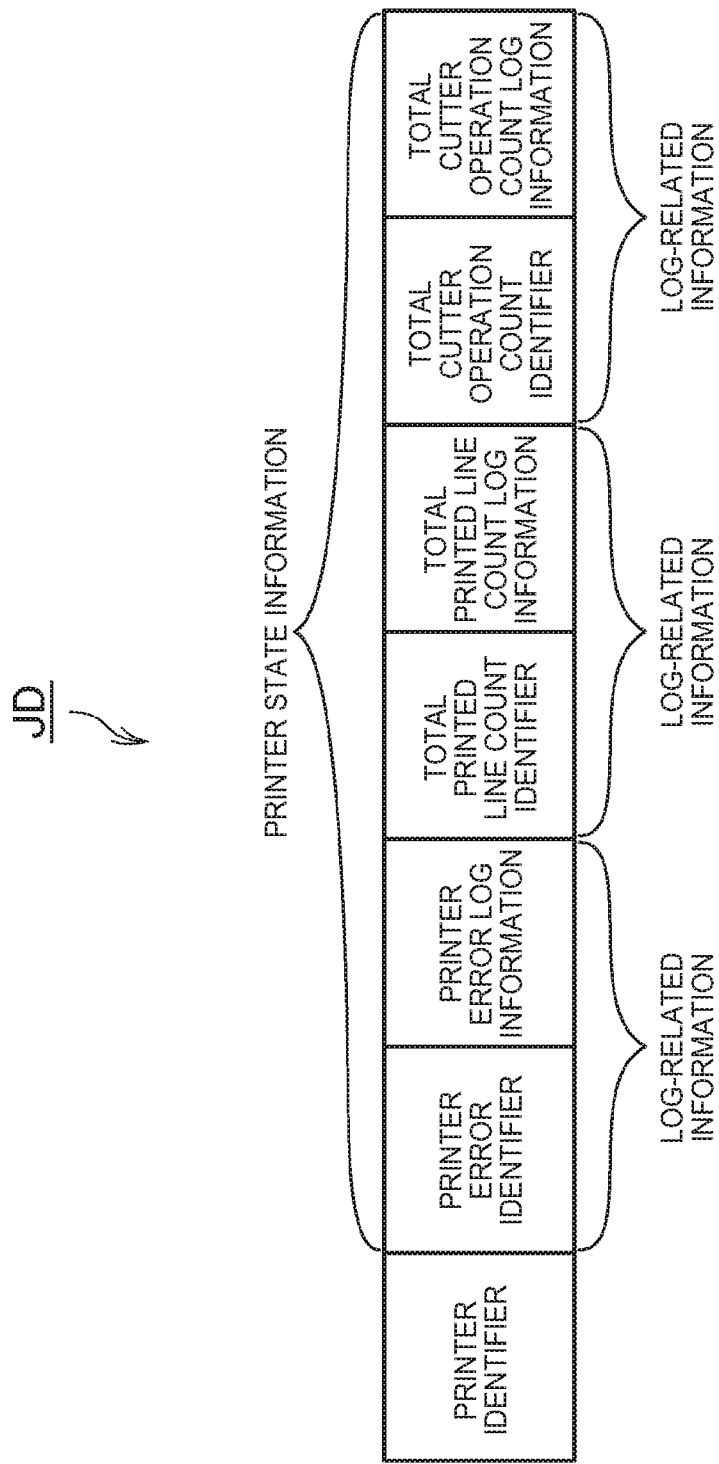
FIG. 7 illustrates information contained in printer state information data.

FIG. 7 shows an example of information contained in the printer state information data JD.

As shown in FIG. 7, the printer state information data JD includes a printer identifier.

The printer state information data JD also contains printer state information.

The printer state information data JD contains log-related information for each log item. More specifically, the printer state information data JD contains log-related information for the printer error log item, log-related information for the total printed line count log item, and log-related information for the total cutter operation count log item.

The log-related information contains a log item identifier identifying a particular log item, and log information, which is the information logged for the corresponding log item.

More specifically, the log-related information of the printer error log item contains a log item identifier identifying the printer error log item (referred to below as the printer error identifier), and log information for the printer error log item (referred to below as the printer error log information).

The log-related information for the total printed line count log item contains a log item identifier identifying the total printed line count log item (referred to below as the total printed line count identifier), and log information for the total printed line count log item (referred to below as the total printed line count log information).

The log-related information of the total cutter operation count log item includes log item identifier identifying the total cutter operation count log item (referred to below as the total cutter operation count identifier), and the log information for the total cutter operation count log item (referred to below as the total cutter operation count log information).

In this way, the printer state information data JD contains printer state information (information related to a state of the printer 9, information related to the status of the print unit 61).

After generating the printer state information data JD, the printer state manager 602 controls the printer-side network communicator 63 to send the generated printer state information data JD to the agent terminal 6 (step SA3).

Details of the process whereby the printer 9 receives response request data DD for printer state information is received from the agent terminal 6, and sends printer state information data JD as the response to the request, is described further below.

As shown in FIG. 6, column (B), the status data generator 801 of the agent terminal 6 controls the agent terminal network communicator 82 to receive the printer state information data JD (step SB4). In step SB4, the status data generator 801 receives printer state information data JD from each monitored printer 9.

Next, the status data generator 801 generates status data ST based on the printer state information data JD received from the monitored printer 9 (step SB5).

The status data ST is text data (such as XML (eXtensible Markup Language) data) recording information in a hierarchical structure of key and value pairs (in XML (Extensible Markup Language) or JSON format, for example) that can be sent to the maintenance server 7 as a request.

Figure 8:
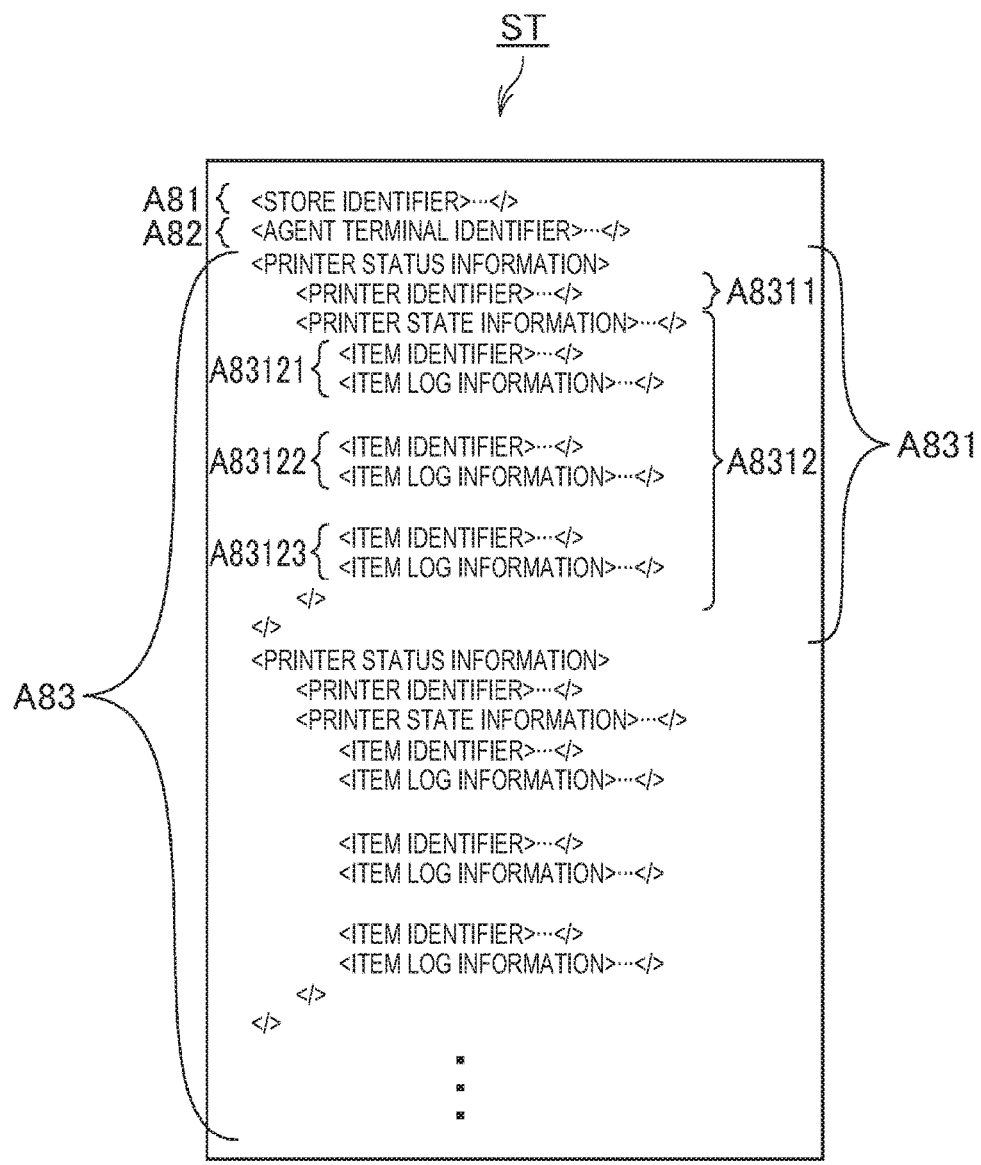
FIG. 8 shows an example of status data.

FIG. 8 shows an example of status data ST content.

The status data ST contains a store identifier identifying the store where the agent terminal 6 that generated the status data ST is located. The store identifier indicating the store where the agent terminal 6 is located is previously registered in the agent terminal 6. In the status data ST shown for example in FIG. 8, the store identifier is written to line A81.

The status data ST also contains a, agent terminal identifier identifying the agent terminal 6 that generated the status data ST. The agent terminal identifier is a value uniquely identifying a agent terminal 6. The agent terminal identifier identifying a particular agent terminal 6 is previously registered in each agent terminal 6. In the status data ST shown for example in FIG. 8, the agent terminal identifier is written to line A82.

The status data ST contains printer status information for each monitored printer 9 (each printer 9 that sent printer state information data JD). In the status data ST in the example in FIG. 8, the printer status information for each printer 9 is included on lines A83.

The printer status information includes the printer identifier of the corresponding printer 9, and printer state information for that printer 9.

The printer state information includes the log-related information for each log item (a combination of log item identifier and log information).

Printer status information for one printer 9 is recorded on lines A831 in the status data ST shown in FIG. 8. Recorded in the printer state information on lines A831 is the printer identifier of one printer 9 on line A8311. Recorded in the printer state information on lines A831 is the printer state information (log-related information (log item identifier and log information) for each monitored item) of the one printer 9 on lines A8312. In lines A8312, on line A83121 is recorded printer error log-related information, on line A83122 is recorded total printed line count log-related information, and on line A83123 is recorded total cutter operation count log-related information.

As described above, status data ST for the agent terminal 6 includes a store identifier and agent terminal identifier. Also included in the status data ST for the agent terminal 6 is printer status information (a combination of printer identifier and printer state information) for each monitored printer 9.

As shown in FIG. 6, column (B), after generating status data ST in step SB5, the status data generator 801 controls the agent terminal network communicator 82 to send the generated status data ST to the maintenance server 7 (step SB6).

In step SB6, the status data generator 801 sends by HTTP an HTTP request with the status data ST in the request body to the maintenance server 7. Note that the URL of the maintenance server 7 to which the status data ST is sent, the protocol to use, and other information required to send the status data ST as a response request to the maintenance server 7 is registered in the agent terminal 6. After step SB6, the status data generator 801 returns to step SB1.

As shown in FIG. 6, column (D), the status data receiver 201 of the maintenance server 7 controls the maintenance server communicator 22 to receive the status data ST (step SD1).

Next, the status data receiver 201 outputs the received status data ST to the responder 202 (step SD2), and to the analyzer 203 (step SD3).

As shown in FIG. 6, column (E), responder 202 acquires the status data ST the status data receiver 201 outputs (step SE1).

Next, the responder 202 generates response data TD based on the status data ST acquired in step SE1 (step SE2).

The response data TD is data including at least information indicating the status data ST was normally received. The information contained in the response data TD is not limited to information indicating the status data ST was normally received. For example, information related to a process the printer 9 is to execute based on the response data TD, and information instructing changing the interval for sending status data ST, may be included in the response data TD.

Next, the responder 202 controls the maintenance server communicator 22 to send the generated response data TD as a response to the agent terminal 6 (step SE3).

For example, the responder 202 sends by HTTP an HTTP response with the response data TD in the request body to the agent terminal 6.

As shown in FIG. 6, column (C), the process executor 802 of the agent terminal 6 controls the agent terminal network communicator 82 to receive the response data TD (step SC1).

Next, the process executor 802, based on the response data TD, executes a process (step SC2).

As shown in FIG. 6, column (F), the analyzer 203 acquires the status data ST the status data receiver 201 output (step SF1).

Next, the analyzer 203, based on the acquired status data ST, updates the status database 211 (step SF2). The process of step SF2 is described below.

FIG. printer 9 shows the data structure of the status database 211.

The status database 211 has a record for each printer 9. As shown in FIG. 9, each record in the status database 211 includes at least a printer identifier, printer error detection information, printhead error detection information, and cutter error detection information.

The printer error detection information is information indicating if a printer error occurred, and is either a value indicating an error occurred (YES in FIG. 9), or a value indicating an error did not occur (NO in FIG. 9).

The printhead error detection information is information indicating if a printhead error occurred, and is either a value indicating an error occurred (YES in FIG. 9), or a value indicating an error did not occur (NO in FIG. 9). A printhead error in this example indicates that the total printed line count of the printhead exceeds a specific threshold used as the reference for determining the life of the printhead.

The cutter error detection information is information indicating if a printhead error occurred, and is either a value indicating an error occurred (YES in FIG. 9), or a value indicating an error did not occur (NO in FIG. 9). A cutter error in this example indicates that the total cutter operation count of the cutter 412 exceeds a specific threshold used as the reference for determining the life of the cutter 412.

In step SF2, the analyzer 203 acquires the printer status information contained in the status data ST. As described above, the printer status information contains printer identifier and printer state information.

Next, the analyzer 203 selects, from the unprocessed printer status information, one entry of printer status information for processing. Next, in the records of the status database 211, the analyzer 203 finds the record with a printer identifier of the same value as the printer identifier of the printer status information selected for processing.

Next, the analyzer 203 updates the printer error detection information, printhead error detection information, and cutter error detection information in the record based on the printer state information in the printer status information being processed.

In step SF2, the analyzer 203, updates, based on the printer status information in the status data ST, the corresponding printer status information in the matching records of the status database 211.

When the Maintenance Server 7 Manages the State of a Printer 9 Based on the Printer Send Function of the Printer 9

Processes of the devices when the maintenance server 7 manages the state of the printer 9 based on the Send function of the printer 9 is described next.

As described further below, the printer 9 executes the following process at specific times based on the printer Send function of the printer 9 to send information related to the state of printer 9 to the maintenance server 7.

Figure 10:
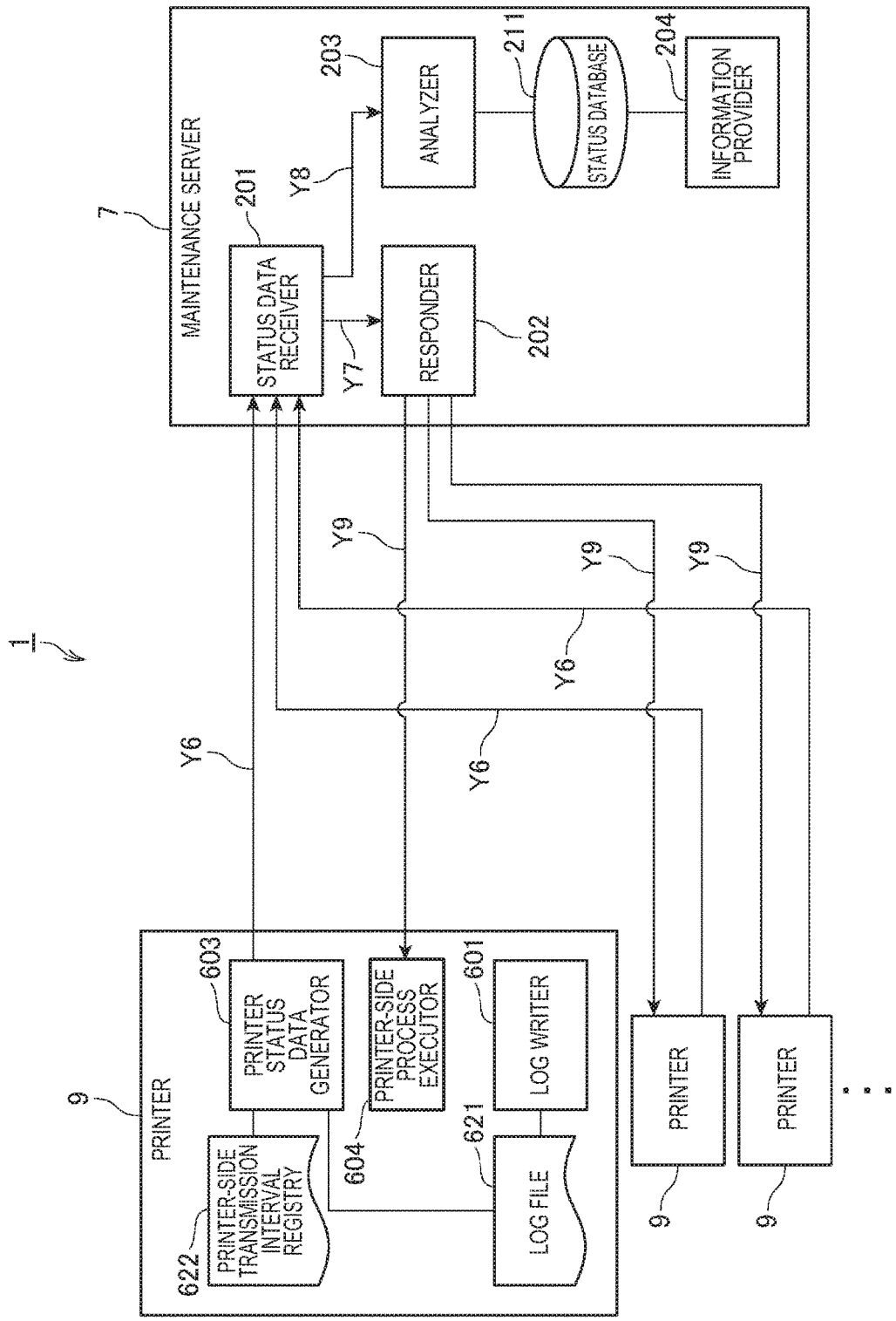
FIG. 10 illustrates the flow of data between devices in a network system.

FIG. 10 shows the function blocks of the printer controller 60 of printer 9, and the function blocks of the maintenance server controller 20 of maintenance server 7, together with the associated data.

The basic flow of data exchanged between the function blocks of the printer 9 and maintenance server 7 when the maintenance server 7 manages the state of the printer 9 is described below using FIG. 10.

Details of the processes of the function blocks, and the content of data exchanged between the function blocks, is described further below and omitted here in the description using FIG. 10.

As shown in FIG. 10, the log writer 601 of the printer 9 writes log information to the log file 621 at specific times.

As shown in FIG. 10, the printer status data generator 603 of the printer 9 references the printer transmission interval registry 622 and generates status data ST based on the log file 621 at the interval specified in the printer transmission interval registry 622. The printer status data generator 603 sends the generated status data ST to the maintenance server 7 (arrow Y6). In other words, the printer status data generator 603 generates and sends the status data ST to the maintenance server 7 at the interval indicated in the printer transmission interval registry 622.

The status data receiver 201 of the maintenance server 7 receives the status data ST.

The status data receiver 201 outputs the status data ST to the responder 202 (arrow Y7). The status data receiver 201 also outputs the received status data ST to the analyzer 203 (arrow Y8).

The responder 202 generates response data TD and sends the generated response data TD to the printer 9 (arrow Y9). The responder 202 sends the response data TD to the printer 9 by HTTP as an HTTP response.

The analyzer 203 then updates the status database 211 based on the status data ST input from the status data receiver 201.

The information provider 204, based on the status database 211 updated by the analyzer 203, provides information useful for printer 9 maintenance to the maintenance technician in response to a request from the maintenance technician.

The printer-side process executor 604 of the printer 9 then receives the response data TD. The printer-side process executor 604 executes a process based on the received response data TD.

The printer status data generator 603 then references the printer transmission interval registry 622, and at the interval indicated in the file generates and sends status data ST to the maintenance server 7.

In this way, data is sent and received between the printer 9 and the maintenance server 7 through a process of the printer 9 intermittently sending status data ST to the maintenance server 7, and the maintenance server 7 sending response data TD to the printer 9.

The operation of the printer 9 and maintenance server 7 when managing the status of the printer 9 is described next.

Figure 11:
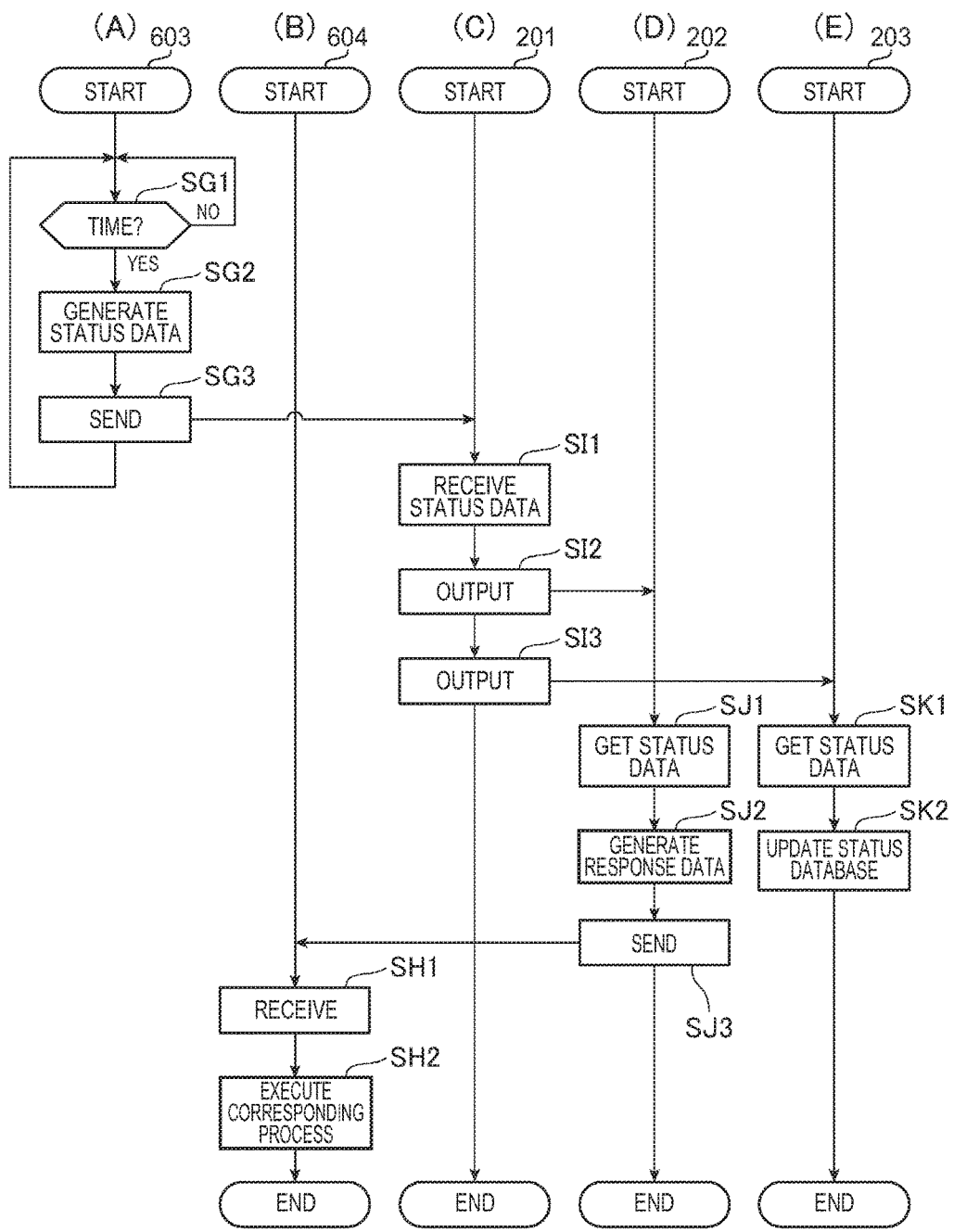
FIG. 11 is a flow chart of the operation of devices in the network system.

FIG. 11 is a flow chart of the operation of the printer 9 and maintenance server 7.

FIG. 11, column (A) shows the operation of the printer status data generator 603 of the printer 9, column (B) shows the operation of the printer-side process executor 604 of the printer 9, column (C) shows the operation of the status data receiver 201 of the maintenance server 7, column (D) shows the operation of the responder 202 of the maintenance server 7, and column (E) shows the operation of the analyzer 203 of the maintenance server 7.

As shown in FIG. 11, column (A), the printer status data generator 603 of the printer 9 references the printer transmission interval registry 622 and monitors if the timing for generating the status data ST has come (step SG1).

The printer transmission interval registry 622 is a file storing information indicating the interval for generating and transmitting status data ST. In step SG1, the printer status data generator 603 references the printer transmission interval registry 622, and determines it is time to generate status data ST if the interval (time) set in the printer transmission interval registry 622 has past since the last time the status data ST was generated and sent.

If the time for generating status data ST has come (step SG1: YES), the printer status data generator 603 references the log file 621 and generates printer state information data JD based on the log file 621, and generates status data ST based on the printer state information data JD that was generated (step SG2).

Figure 12:
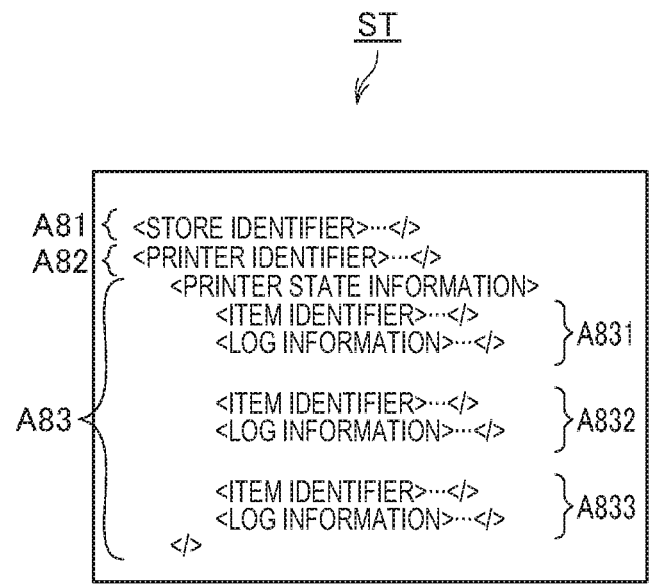
FIG. 12 shows an example of status data.

FIG. 12 illustrates the content of the status data ST.

The status data ST includes the store identifier identifying the store where the printer 9 is located. The store identifier is a value uniquely assigned to each store. The store identifier identifying the store where the printer 9 is located is previously registered in each printer 9. In the status data ST shown for example in FIG. 12, the store identifier is on line A81.

The status data ST also includes the printer identifier of the printer 9 that generated the status data ST. The printer identifier is written to line A82 in the sample status data ST shown in FIG. 12.

The status data ST also includes printer state information. The printer state information is recorded on line A83 in the status data ST shown in FIG. 12. In this example, log-related information for printer errors is on line A831, log-related information for the total printed line count is on line A832, and log-related information for the total cutter operation count is on line A833.

The status data ST thus includes a store identifier and printer identifier. Printer state information for the printer 9 (log-related information for each monitored item) is also recorded in the status data ST generated by the printer 9.

After generating the status data ST in step SG2, the printer status data generator 603 controls the printer-side network communicator 63 to send the generated status data ST to the maintenance server 7 (step SG3).

In step SG3, the printer status data generator 603 sends an HTTP request with the status data ST in the request body to the maintenance server 7 by HTTP. Note that the URL of the maintenance server 7 to which the status data ST is sent, the protocol to use, and other information required to send the status data ST as a response request to the maintenance server 7 is previously registered in the printer 9. After step SG3, the printer status data generator 603 returns to step SG1.

As shown in FIG. 11, column (C), the status data receiver 201 of the maintenance server 7 controls the maintenance server communicator 22 to receive the status data ST (step SI1).

Next, the status data receiver 201 outputs the received status data ST to the responder 202 (step SI2) and to the analyzer 203 (step SI3).

As shown in FIG. 11, column (D), the responder 202 acquires, by the status data receiver 201, the output status data ST (step SJ1).

Next, the responder 202 generates response data TD (step SJ2).

Next, the responder 202 controls the maintenance server communicator 22 to send the generated response data TD as a response to the printer 9 (step SJ3). For example, the responder 202 sends by HTTP an HTTP response with the response data TD in the request body to the printer 9.

As shown in FIG. 11, column (B), printer-side process executor 604 of the printer 9 controls the printer-side network communicator 63 to receive the response data TD (step SH1).

Next, the printer-side process executor 604 executes a process based on the response data TD (step SH2). For example, if the printer 9 sends status data ST and then receives response data TD as a response to the status data ST, the printer 9 is enabled to send the another status data ST report. In step SH2, the printer-side process executor 604 is able to send the next status data ST based on receiving response data TD.

As shown in FIG. 11, column (E), the analyzer 203 acquires the status data ST the status data receiver 201 received (step SK1).

Next, the analyzer 203, based on the acquired status data ST, updates the status database 211 (step SK2).

Operation of the maintenance server 7 when providing information useful for printer 9 maintenance to the maintenance technician (as described above, the person responsible for maintaining printers 9 in the store system 3) is described next.

Note that below the maintenance technician is located in the headquarter office and uses the headquarter terminal 5.

The maintenance technician needing to acquire information related a specific printer 9 starts a browser on the headquarter terminal 5 and accesses a specific URL on a predetermined maintenance server 7.

When this specific URL is accessed, the information provider 204 of the maintenance server 7 generates and sends an HTML file for displaying a printer identifier input screen G131 (FIG. 13) to the headquarter terminal 5.

The headquarter terminal controller 30 of the headquarter terminal 5 receives the HTML file by a function of the browser, and controls the headquarter terminal display 33 based on the received HTML file to display the printer identifier input screen G131 on the display panel.

Figure 13:
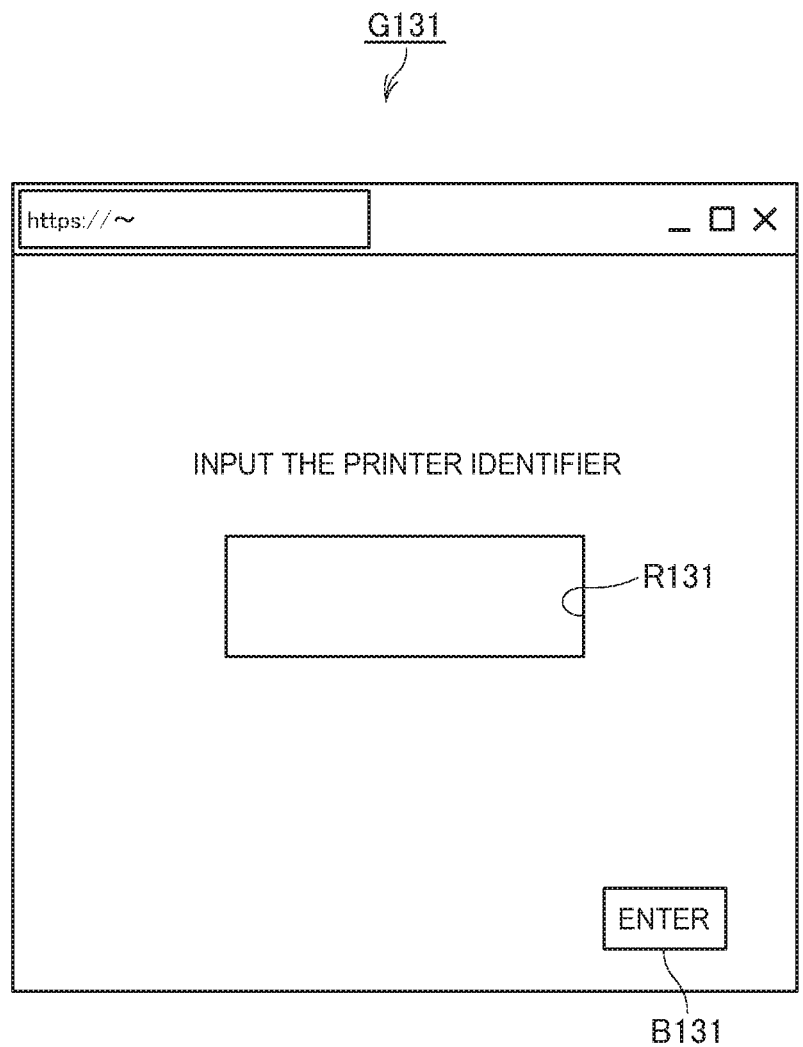
FIG. 13 shows an example of a printer identifier input screen.

FIG. 13 shows an example of a printer identifier input screen G131.

As shown in FIG. 13, the printer identifier input screen G131 has an input field R131 for inputting a printer identifier. The maintenance technician inputs the printer identifier of the printer 9 for which information is to be acquired, and operates the Enter button B131 to confirm the input. When input is confirmed, the input printer identifier is sent to the maintenance server 7 by a function of a script embedded in the HTML file.

The information provider 204 of the maintenance server 7 then receives the printer identifier. Next, the information provider 204 finds the corresponding record in the status database 211 based on the received printer identifier. The corresponding record is the record storing a printer identifier of the same value as the received printer identifier. Next, the information provider 204 generates and sends to the headquarter terminal 5 an HTML file for displaying an information screen G141 (FIG. 14) based on the located record.

The headquarter terminal controller 30 of the headquarter terminal 5 receives the HTML file by a function of the browser, and controls the headquarter terminal display 33 based on the received HTML file to display the information screen G141 on the display panel.

Figure 14:
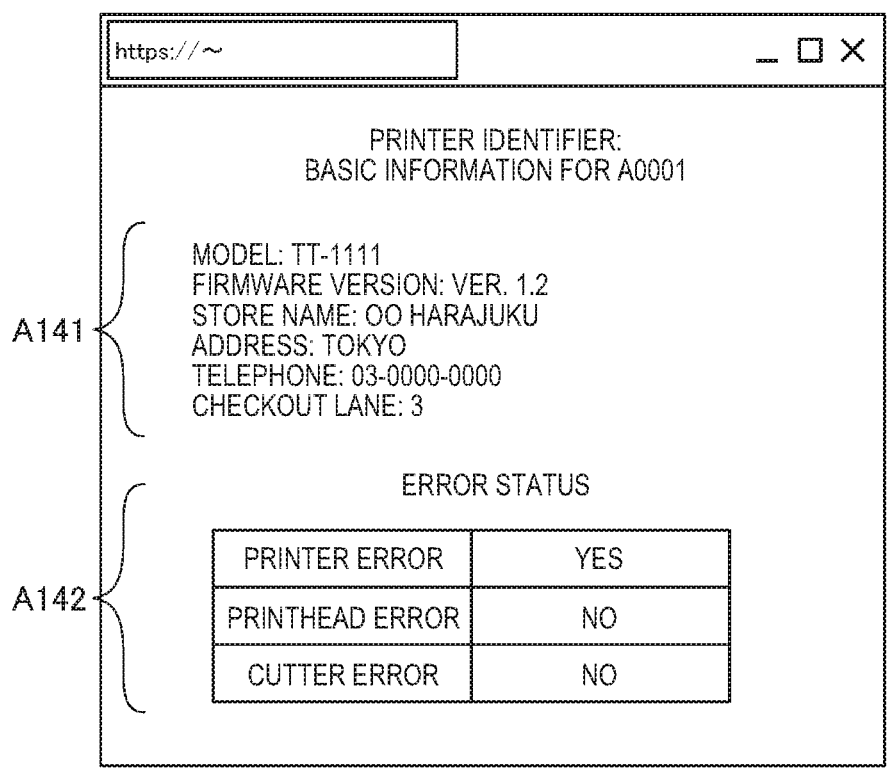
FIG. 14 shows an example of an information provider screen.

FIG. 14 shows an example of an information screen G141.

As shown in FIG. 14, the information screen G141 has lines A141 and lines A142.

Basic information related to the printer 9 of the printer identifier input by the maintenance technician is displayed in lines A141. In the example in FIG. 14, the basic information related to the printer 9 includes information indicating the model of the printer 9, information indicating the version of firmware installed in the printer 9, information indicating the name of the store where the printer 9 is used, information indicating the address of the store, information indicating the telephone number of the store, and information indicating the lane number of the checkout counter where the printer 9 is installed. The basic information related to the printer 9 is not limited to the foregoing.

A database relationally storing for each printer a printer identifier and basic information about the corresponding printer 9 is stored in the maintenance server storage 21 of the maintenance server 7. The information provider 204 acquires the basic information about the printer from the database.

The maintenance technician can get the basic information about the printer 9 by referencing the information displayed on lines A141 of the information screen G141, and can call the store, for example, as needed.

As shown in FIG. 14, information indicating if a printer error occurred, information indicating if a printhead error occurred, and information indicating if a cutter error occurred are displayed on lines A142.

By reading the information displayed on lines A142, the maintenance technician can know whether or not a printer error, printhead error, or cutter error occurred, and based thereon can take appropriate action. If an error occurred, such appropriate action includes, for example, reporting the error, and what action to take to resolve the error, to the responsible person in the store.

The operation of the POS terminal 8 and printer 9 when processing a transaction at a checkout counter in a store is described next.

Figure 15:
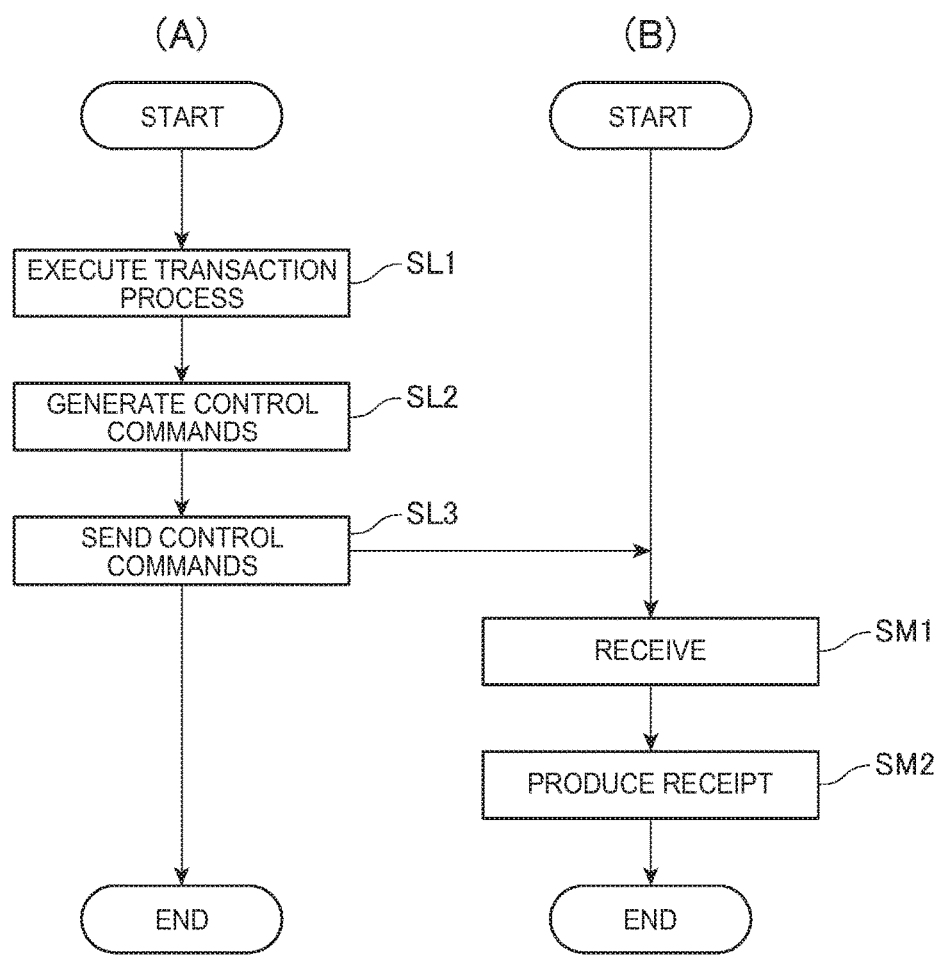
FIG. 15 is a flow chart of the operation of a printer and POS terminal.

FIG. 15 is a flow chart showing the operation of the POS terminal 8 and printer 9 during a transaction process, column (A) showing the operation of the POS terminal 8 and column (B) showing the operation of the printer 9.

As shown in FIG. 15, column (A), the POS terminal controller 40 of the POS terminal 8 executes a transaction process according to the customer transaction (step SL1).

In the transaction process, the checkout clerk reads the barcode of a product purchased by the customer with the barcode scanner BS. Based on the read result from the barcode scanner BS, the POS terminal controller 40 acquires the product code of the product, references the product master of a POS server not shown, and acquires the product price and other product-related information required by the transaction process. Based on the acquired product-related information, the POS terminal controller 40 displays product-related information on the customer display CD and display DP. Based on the acquired product-related information, the POS terminal controller 40 also calculates the transaction amount and change due, confirms the transaction, displays information indicating the calculated amounts on the customer display CD and display DP, and controls the cash drawer KS.

After executing the transaction process in step SL1, the POS terminal controller 40 generates control commands causing the printer 9 to produce a receipt printed with transaction-related information (such as product-related information, information about the transaction total, and information about the change due) based on the transaction process. A POS application and printer driver are installed on the POS terminal 8, and the POS terminal controller 40 uses functions of these programs to generate the control commands.

Next, the POS terminal controller 40 controls the POS terminal-side device communicator 42 to send the generated control commands to the printer 9 (step SL3).

As shown in FIG. 15, column (B), the print controller 605 of the printer controller 60 of the printer 9 controls the printer-side device communicator 64 to receive the control commands (step SM1).

Next, the print controller 605 controls the print unit 61 to produce a receipt based on the received control commands (step SM2). The receipt is then given by the checkout clerk to the customer.

As described above, the agent terminal 6 has a function for monitoring multiple printers 9, preferably concurrently, (a function for monitoring the states of multiple printers 9).

The following problems can result from the agent terminal 6 monitoring the states of multiple printers 9.

As described above, in the monitored printer manager file 812 are stored, for each monitored printer 9, the printer identifier of the monitored printer 9, and information related to the monitored printer 9 (including information required to send response request data DD for printer state information to the monitored printer 9). The combination of printer identifier and information related to the printer 9 for each printer 9 recorded in the monitored printer manager file 812 is referred to below as monitored printer information.

In other words, the agent terminal 6 monitors the printers 9 that are listed as printers to monitor in the monitored printer manager file 812. The monitored printer information is recorded in the monitored printer manager file 812 by a specific means for each listed printer to monitor.

Monitored printer information for the same printer 9 may also be recorded in a different monitored printer manager file 812 managed by a different agent terminal 6. For example, if the monitored printer information is recorded manually, monitored printer information for the same printer 9 may be accidentally recorded in multiple, different monitored printer manager files 812 of multiple, different agent terminals 6.

If monitored printer information for the same printer 9 is recorded (as a printer to be monitored) in the different monitored printer manager files 812 of respective different agent terminals 6, printer state information for that printer 9 may be redundantly sent to the maintenance server 7 by the different agent terminals 6. In this case, the processor load on the maintenance server 7 may be increased by the maintenance server 7 executing a process based on the same printer state information for the same printer 9 (updating records in the status database 211) multiple times. The amount of data exchanged between the agent terminal 6 and maintenance server 7 may also increase, and the communication load may increase due to the unnecessarily increased amount of (redundant) data transmissions.

The printer 9 therefore executes the following process.

Figure 16:
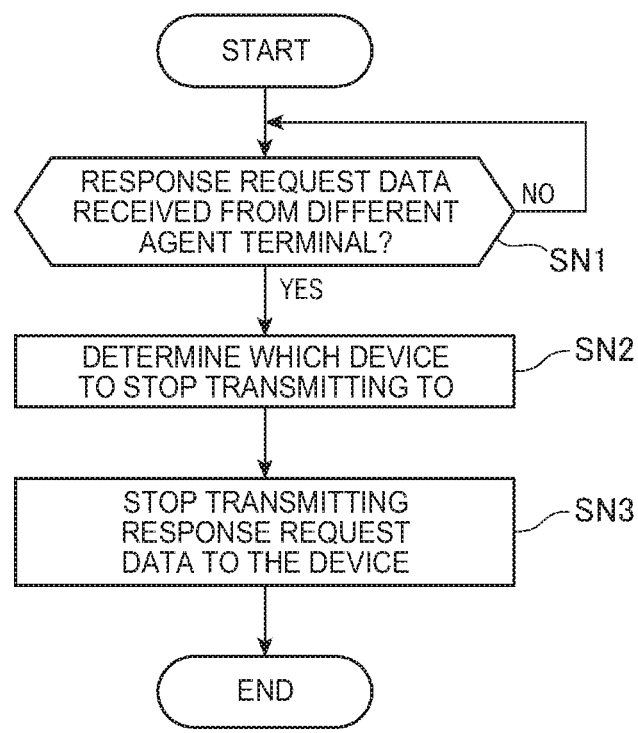
FIG. 16 is a flow chart of an operation of a printer.

FIG. 16 is a flow chart of printer 9 operation.

As shown in FIG. 16, the printer state manager 602 of printer 9 monitors if response request data DD for printer state information was received during a specific period from a different agent terminal 6 (step SN1).

This specific period is a period corresponding to the interval at which the agent terminal 6 sends status data ST to the maintenance server 7 (the interval at which the agent terminal 6 sends response request data DD for printer state information to the printer 9). For example, if each agent terminal 6 sends status data ST to the maintenance server 7 at the same interval, the specific period is a period equal to the interval plus a specific margin. If the interval at which status data ST is sent to the maintenance server 7 differs according to the agent terminal 6, the specific period is set appropriately, by tests or simulations, so that whether or not different agent terminals 6 are monitoring the same printer 9 can be determined.

When a printer 9 receives response request data DD for printer state information from different agent terminals 6 during the specific period, each agent terminal 6 that sent the response request data DD for printer state information is referred to below as a target agent terminal.

If in step SN1 response request data DD for printer state information was received from a different agent terminal 6 (step SN1: YES), the printer state manager 602 executes a process of determining which agent terminal 6 to stop responding (transmitting) to (step SN2). This process for determining the device (agent terminal) to which to stop sending information (cease transmissions/stop responding) in step SN2 is described below.

The process for determining the device to which to stop responding in step SN2 determines which of the target agent terminals should be stopped from sending a response request data DD for printer state information to the specific printer 9, and thereby reduce to one the number of agent terminals 6 that send response request data DD for printer state information to the same specific printer 9.

Below, the target agent terminal that is stopped from sending response request data DD for printer state information is referred to as a transmission-stopped device.

In the process for determining the target device(s) (agent terminal (s) 6) that should stop sending requests for printer state information to the same printer, the printer state manager 602 determines which of the target devices (agent terminals 6) to set as transmission-stopped devices in the following order of priority.

If a first response request data DD for printer state information is received from an agent terminal 6 that communicates through the store-side local area network TLN, and another is received from an agent terminal 6 that communicates directly with the printer 9 and not through the store-side local area network TLN, the printer state manager 602 determines which device to designate as the transmission-stopped device in the following order of priority. That is, the printer state manager 602 prioritizes as the transmission-stopped device an agent terminal 6 that communicates and sends response request data DD for printer state information directly and not through the store-side local area network TLN, over an agent terminal 6 that communicates and sends response request data DD for printer state information through the store-side local area network TLN.

The reason is described next.

As described above, an agent terminal 6 can monitor the states of multiple printers 9 through a network (the store-side local area network TLN in this example), or can communicate with and monitor the states of multiple printers 9 directly instead of through a network. Due to the differences in the communication characteristics of communication through a network and direct communication not through a network, an agent terminal 6 can communicate with and monitor the states of multiple printers 9 more efficiently when communicating over a network than when communicating directly (without going through a network). Therefore, by prioritizing the selection of the transmission-stopped device as described above, an agent terminal 6 that monitors the states of multiple printers 9 by communicating directly instead of through a network is prioritized as the transmission-stopped device, and a greater number of agent terminals 6 can monitor printers 9 efficiently through a network.

When response request data DD for printer state information is received from multiple agent terminals 6 communicating through the store-side local area network TLN, the printer state manager 602 determines the transmission-stopped device in an order of priority in which priority is determined based on the communication protocol used for communication.

This priority is determined to reflect the reliably of communication through the communication protocol, the compatibility of agent terminal 6 communication with the communication protocol, and the efficiency of communication using the communication protocol of the agent terminal 6.

When response request data DD for printer state information is received from multiple agent terminals 6 communicating directly instead of through the store-side local area network TLN, the printer state manager 602 determines the transmission-stopped device in an order of priority in which priority is based on the type of communication interface used for communication.

The order of priority determined by the communication interface used for communication prioritizes for selecting the transmission-stopped device communication interfaces for communicating wirelessly over communication interfaces for communicating by wire.

In this example, the order of priority in this case is: (1) Bluetooth® interface, (2) USB interface, (3) parallel interface, (4) serial interface, with a lower priority number being designated a transmission-stopped device before a higher priority number. For example, if a printer 9 is connected to two agent terminals 6 (one via Bluetooth communication [priority number 1] and the other via a USB interface [priority number 2]), then the agent terminal 6 connected via the Bluetooth communication link would be designated a stopped device, and the printer would proceed to respond to the USB-connected agent terminal.

The reason for this is described next.

Wireless communication is less stable than wired communication because signal strength may drop due to signal interference resulting from signals emitted by other electronic devices, interference from electromagnetic waves, signal interference by physical obstructions, and the locations and directivity of the sending and receiving antennae. By determining the transmission-stopped device in this order of priority, agent terminals 6 communicating by less-stable means are prioritized for stopping transmission (as the transmission-stopped device).

The printer state manager 602 also prioritizes agent terminals 6 that monitor a greater number of printers 9 as the transmission-stopped device. For example, if a set of two target agent terminals includes a first agent terminal 6 and a second agent terminal 6, and the first agent terminal 6 monitors ten printers 9 while the second agent terminal 6 monitors only five printers 9, then the printer state manager 602 will designate the first agent terminal 6 as the transmission-stopped device. The printer state manager 602 can, by a specific means, determine how many printers 9 are monitored by each agent terminal 6 that sends a response request data DD for printer state information. For example, the printer state manager 602 may acquire the number of printers 9 that monitored by a specific agent terminal simply by requesting that the agent terminal 6 provide information indicting the number of printers 9 it monitors.

The reason agent terminals 6 that monitor more printers 9 are prioritized as transmission-stopped devices (i.e. prioritized for stopping transmission) are described below.

By prioritizing as transmission-stopped device the agent terminals 6 in descending order of their number of monitored printers 9, the number of printers 9 monitored by each agent terminal 6 can be more evenly distributed between the agent terminals 6. This can prevent the processor load from being concentrated on any particular agent terminal 6. By prioritizing the agent terminals 6 in descending order of the number of monitored printers 9 as a transmission-stopped device, the amount of status data ST sent by the different agent terminals 6 can also be more evenly distributed.

In the process of determining which device (agent terminal 6) to stop transmitting to in step SN2, the printer state manager 602 determines (assigns) the transmission-stopped device (designation) in descending order of priority based on the conditions described above, and selects the target agent terminal lowest in the order of priority as a device to not stop sending response request data DD for printer state information.

After the process determining the device to stop transmitting in step SN2, the printer state manager 602 causes the agent terminal 6 selected as the transmission-stopped device to stop sending response request data DD for printer state information (step SN3). As shown in step SN3, this may be done by not transmitting a response request to the designated transmission-stopped device(s).

In step SN3, the printer state manager 602 may also generate a control command to instruct the designated transmission-stop device(s) to stop sending response request data DD for printer state information to the specific printer 9, and sends the control command to the agent terminals 6 selected (designated) as transmission-stopped devices. An agent terminal 6 that receives the control command then updates its monitored printer manager file 812 to delete the monitored printer information for the corresponding printer 9.

As a result of this process, the number of agent terminals 6 sending response request data DD for printer state information to the printer 9 is reduced to one. As a result, printer state information for that one printer 9 being redundantly sent from different agent terminals 6 to the maintenance server 7 can be prevented. As a result, increasing the processor load on the maintenance server 7 can be suppressed, increasing the amount of data exchanged between the agent terminal 6 and maintenance server 7 can be suppressed, and increasing the communication load due to a greater amount of data can be suppressed.

Another process of the printer 9 is described next.

Figure 17:
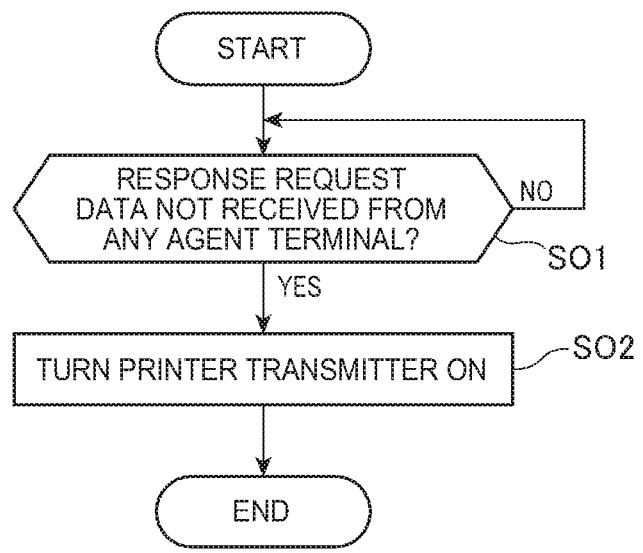
FIG. 17 is a flow chart of an operation of a printer.

FIG. 17 is a flow chart of printer 9 operation.

As shown in FIG. 17, the printer state manager 602 of the printer 9 monitors whether or not response request data DD for printer state information was received from any agent terminal 6 after the specific period past (step S01).

This specific period is a period corresponding to the interval at which the agent terminal 6 sends status data ST to the maintenance server 7 (the interval at which the agent terminal 6 sends response request data DD for printer state information to the printer 9). For example, if each agent terminal 6 sends status data ST to the maintenance server 7 at the same interval, the specific period is a period equal to the interval plus a specific margin. If the interval at which status data ST is sent to the maintenance server 7 differs according to the agent terminal 6, the specific period is set appropriately, by tests or simulations, so that whether or not different agent terminals 6 are monitoring the same printer 9 can be determined.

If, for any one printer 9, monitored printer information for that one printer 9 is not recorded in the monitored printer manager file 812 of any agent terminal 6, that one printer 9 will not receive response request data DD for printer state information from any agent terminal 6 after the specific period has past.

Furthermore, if, after the specific period has past response request data DD for printer state information is not sent from a agent terminal 6 to the monitored printer 9 due, for example, to a communication problem or a problem with the agent terminal 6, the printer 9 may not receive response request data DD for printer state information from the agent terminal 6 after the specific period has past.

If step SO1 determines that response request data DD for printer state information was not received from any agent terminal 6 after the specific period past, (step SO1: YES), the printer state manager 602 turns on the printer Send function described above (step SO2).

When the printer Send function is on, the process described in FIG. 10 to FIG. 12 is executed, and the printer 9 sends status data ST including its printer state information to the maintenance server 7.

As a result of this process, the printer 9 sends status data ST including printer state information to the maintenance server 7, and the maintenance server 7 can continue managing the state of the printer 9, even if the printer 9 does not receive response request data DD for printer state information from any agent terminal 6.

As described above, a network system 1 according to this embodiment includes printers 9, agent terminals 6 (monitoring device) that can monitor the state of printers 9, and a maintenance server 7 (information processing device) that can communicate with the agent terminals 6.

An agent terminal 6 has a function for communicating with and monitoring the states of multiple printers 9; periodically requests one or more of the monitored printers 9 to return printer state information related to the state of the printer 9; receives printer state information in response to the request; and sends the received printer state information to the maintenance server 7.

The maintenance server 7 manages the state of the printer 9 based on the printer state information received from the agent terminal 6. If a response request for printer state information is received from multiple different agent terminals 6, the printer 9 causes agent terminals 6 other than a specific agent terminal 6 from requesting printer state information.

When the printer 9 is requested to return printer state information by different multiple agent terminals 6, a function of the printer 9 automatically stops agent terminals 6 other than a specific agent terminal 6 from requesting printer state information.

Manually configuring the agent terminals 6 to prevent redundant monitoring of the same printer 9 is therefore not necessary; redundant transmission of printer state information for the same printer 9 to the maintenance server 7 can be prevented; increasing the processor load of the maintenance server 7 can be suppressed; increasing the amount of data sent and received between an agent terminal 6 and maintenance server 7 can be suppressed; and an increase in the communication load resulting from a greater amount of data can be suppressed. More specifically, this configuration enables a network system 1, in which an agent terminal 6 monitors the state of printers 9 and sends information related to said states to the maintenance server 7, to execute a process for handling agent terminals 6 capable of monitoring the states of multiple printers 9.

Of the multiple different agent terminals 6, the printer 9 in this embodiment determines, in a specific order of priority, the agent terminals 6 to instruct stop requesting printer state information.

Using this order of priority, the printer 9 appropriately determines the one or more agent terminals 6 to instruct to stop requesting printer state information.

An agent terminal 6 in this embodiment may have a function for communicating through a store-side local area network TLN (network) with a printer 9 and monitoring the state of the printer 9; and a function for communicating directly with a printer 9 and not through the store-side local area network TLN to monitor the state of the printer 9. Of multiple different agent terminals 6, the printer 9 stops from requesting printer state information, in descending order of priority over agent terminals 6 that communicate and request printer state information through the store-side local area network TLN, agent terminals 6 that communicate and request printer state information directly instead of through the store-side local area network TLN.

This enables efficiently monitoring printers through a store-side local area network TLN.

In this embodiment of the invention, the printer 9 determines, of multiple different agent terminals 6, in an order of priority in which priority is determined based on the communication protocol used for communication, which agent terminal 6 to stop from requesting printer state information.

Thus comprised, the printer 9, using an order of priority in which priority is determined based on the communication protocol used for communication, can appropriately determine which agent terminal 6 to stop from requesting printer state information.

In this embodiment of the invention, the printer 9 determines, of multiple different agent terminals 6, in an order of priority in which priority is determined based on the type of communication interface used for communication, which agent terminal 6 to stop from requesting printer state information.

Thus comprised, the printer 9, using an order of priority in which priority is determined based on the type of communication interface used for communication, can appropriately determine which agent terminal 6 to stop from requesting printer state information.

In this embodiment of the invention, the printer 9 prioritizes communication interfaces for communicating wirelessly over communication interfaces for communicating by wire to determine which agent terminal 6 to stop from requesting printer state information.

The printer 9 in this configuration prioritizes agent terminals 6 that communicate using methods of less stability when determining the transmission-stopped device.

In this embodiment of the invention, the printer 9 prioritizes, in descending numerical order, agent terminals 6 that monitor a greater number of printers 9 as agent terminals 6 to stop from requesting printer state information.

This can more evenly distribute the number of printers 9 monitored by each agent terminal 6. This can also prevent concentrating the processor load on any agent terminal 6. The amount of status data ST transmitted by each agent terminal 6 can also be more evenly distributed.

In this embodiment of the invention, the printer 9, when a request for printer state information is not received from any agent terminal 6, sends printer state information to the maintenance server 7.

This configuration enables the printer 9 to send printer state information to the maintenance server 7, and the maintenance server 7 to continue managing the state of the printer 9, even when the printer 9 does not receive from the agent terminal 6 a request for printer state information.

Embodiment 2

A second embodiment of the invention is described next with reference to the figures.

Note that like parts (elements) in this and the first embodiment are identified by like reference numerals (reference characters), and further description thereof is omitted or simplified.

Figure 18:
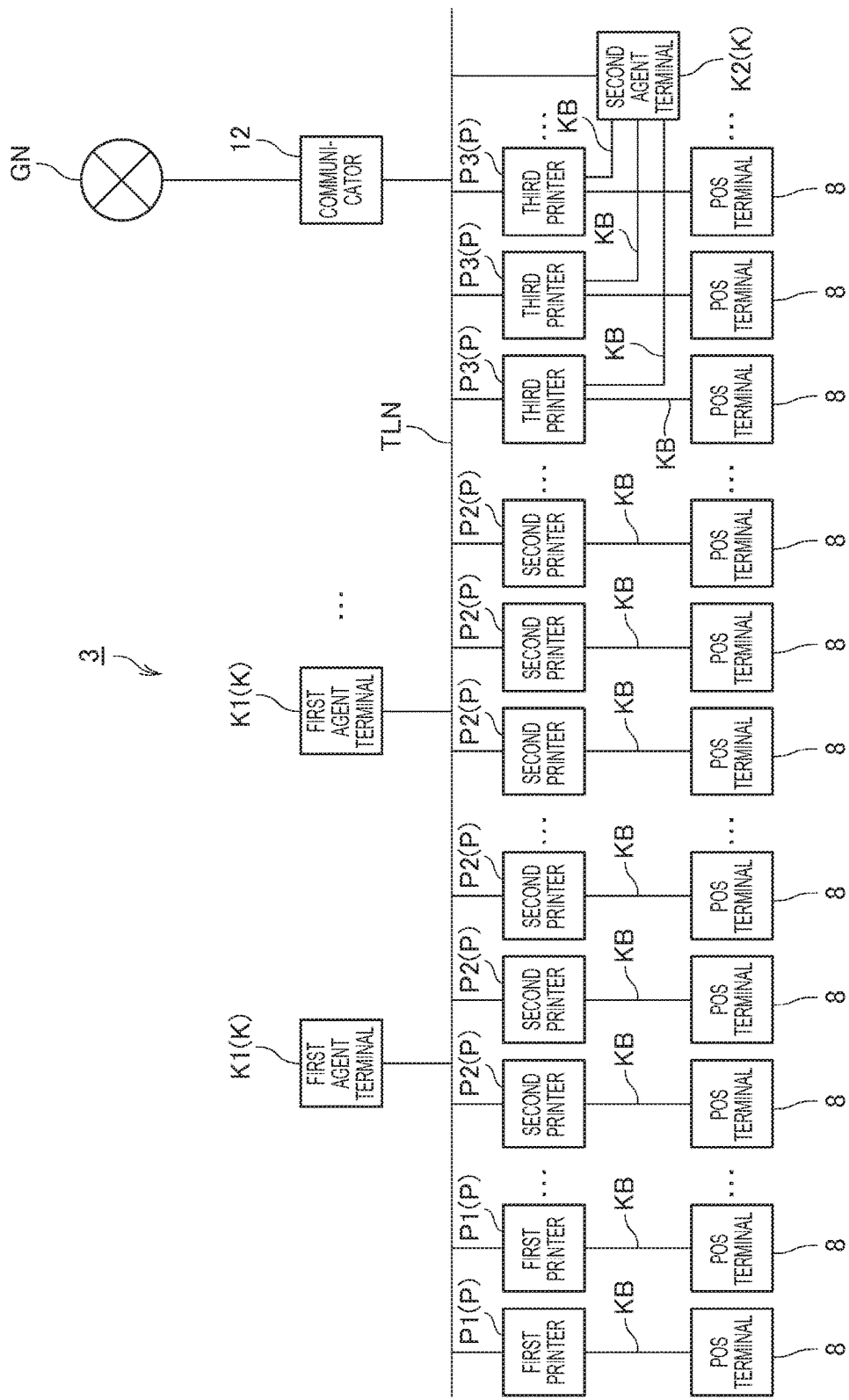
FIG. 18 illustrates the configuration of a store system according to a second embodiment of the invention.

FIG. 18 shows the configuration of a store system 3 in the second embodiment of the invention.

As shown in FIG. 18, the store system 3 has a store-side local area network TLN. The communication protocol used on the store-side local area network TLN may be any desirable protocol, and communication through the local area network may be by wired communication or wireless communication.

Connected to the store-side local area network TLN are one or more one or more first printers P1, one or more second printers P2, and one or more third printers P3. The first printer P1, second printer P2, and third printer P3 have functions for producing receipts for sales transactions.

As described further below, first printer P1 differs from the second printer P2 and third printer P3 in that the first printer P1 communicates through the global network GN with a maintenance server 7, and sends printer state information (described below) to the maintenance server 7.

As described further below, second printer P2 differs from first printer P1 and third printer P3 in that the second printer P2 sends printer state information (described below) not to the maintenance server 7, but through the store-side local area network TLN to first agent terminal K1.

As described further below, third printer P3 differs from first printer P1 and second printer P2 in that third printer P3 sends printer state information (described further below) not to the maintenance server 7, but communicates by USB with second agent terminal K2 and sends the printer state information to second agent terminal K2.

When not differentiating between first printer P1, second printer P2, and third printer P3, they are referred to as printer P (which is equivalent to printer 9 in the first embodiment).

As will be understood below, first printer P1 functions as a monitoring device that monitors its own state (first printer P1), and sends printer state information related to its state to the maintenance server 7 (information processing device).

Connected to the store-side local area network TLN are one or more first agent terminals K1 and one or more second agent terminals K2.

First agent terminal K1 is connected to one or more second printers P2 to be monitored through the store-side local area network TLN, monitors the state of the second printer P2, and sends state-related information to the maintenance server 7.

Second agent terminal K2 is connected to one or more third printers P3 to be monitored through USB cable KB, monitors the state of third printer P3, and sends state-related information to the maintenance server 7.

Below, when not differentiating between first agent terminal K1 and second agent terminal K2, they are referred to as agent terminal K (equivalent to agent terminal 6 in the first embodiment).

First printer P1, first agent terminal K1, and second agent terminal K2, using functions of communicator 12, communicate through store-side local area network TLN, global network GN, and headquarter-side local area network HLN with the maintenance server 7.

While detailed description is omitted, communication between the maintenance server 7, first printer P1, first agent terminal K1, and second agent terminal K2 is made secure by using a virtual private network (VPN) or other type of encryption technology or virtual dedicated line (or physical dedicated line) technology.

Figure 19:
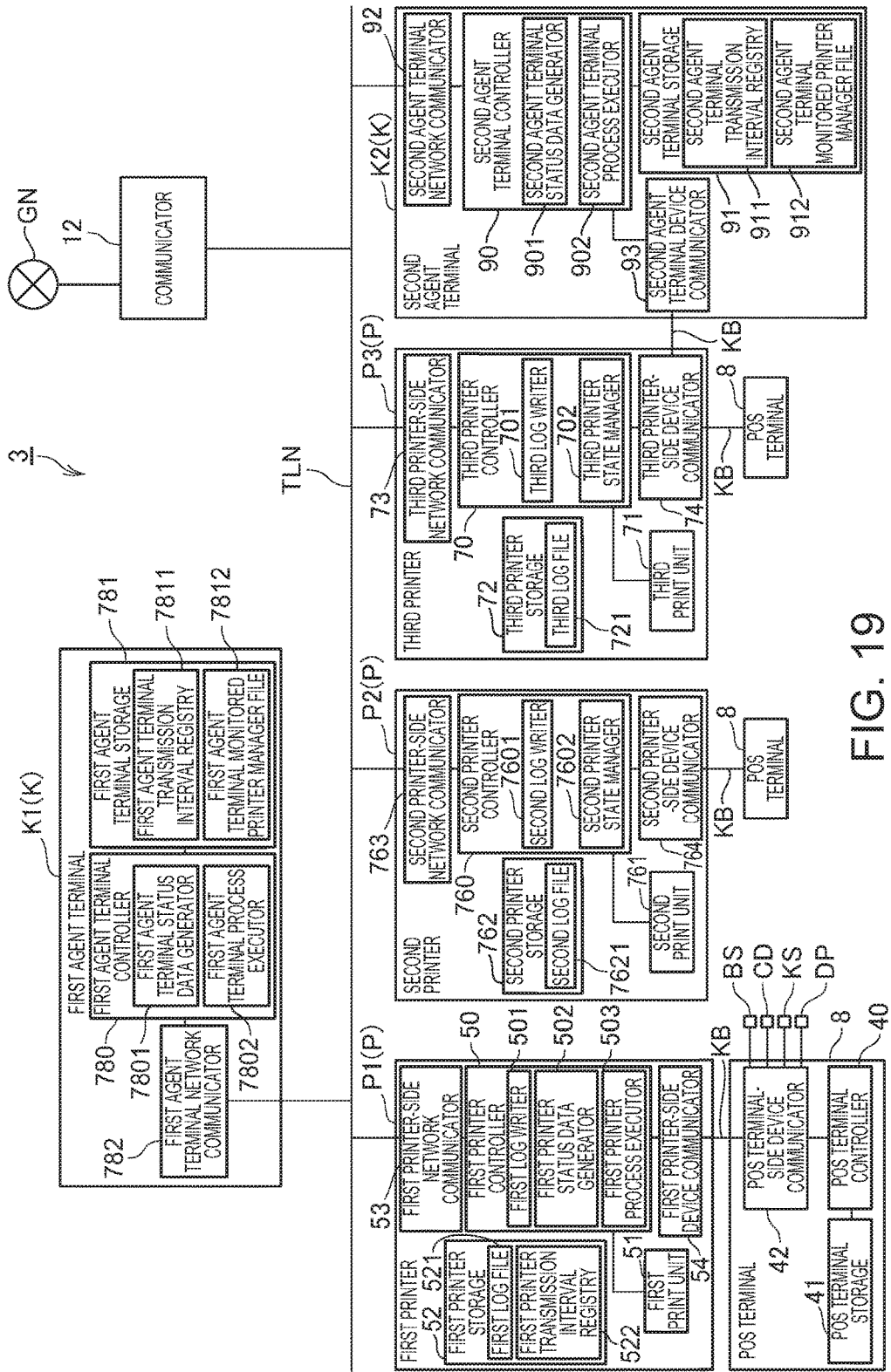
FIG. 19 is a block diagram of the functional configuration of devices on the store system.

FIG. 19 is a block diagram of POS terminal 8, first printer P1, second printer P2, third printer P3, first agent terminal K1, and second agent terminal K2 in store system 3.

First printer P1 (monitoring device), second printer P2, and third printer P3 are thermal line printers that store roll paper and prints images by forming dots on the roll paper with a thermal line head.

As shown in FIG. 19, first printer P1 includes a first printer controller 50, first print unit 51, first printer storage 52, first printer-side network communicator 53, and first printer-side device communicator 54.

First printer controller 50 includes a first log writer 501, first printer status data generator 502, and first printer-side process executor 503, and controls the first printer P1.

First printer storage 52 has nonvolatile memory, and stores at least a first log file 521 and first printer transmission interval registry 522.

First printer-side network communicator 53, as controlled by the first printer controller 50, communicates through global network GN with the maintenance server 7 according to a specific communication protocol. The first printer-side network communicator 53 communicates with devices connected to the store-side local area network TLN, and devices connected to the global network GN.

First printer-side device communicator 54, communicates as controlled by the first printer controller 50 with POS terminal 8 by USB.

Second printer P2 includes a second printer controller 760, second print unit 761, second printer storage 762, second printer-side network communicator 763, and second printer-side device communicator 764.

Second printer controller 760 includes a second log writer 7601 and second printer state manager 7602, and controls the second printer P2.

Second printer storage 762 has nonvolatile memory, and stores at least a second log file 7621.

Second printer-side network communicator 763, as controlled by the second printer controller 760, communicates through store-side local area network TLN with first agent terminal K1 by a specific communication protocol. The second printer-side network communicator 763 communicates with devices connected to the store-side local area network TLN.

Second printer-side device communicator 764 communicates as controlled by the second printer controller 760 with POS terminal 8 by USB.

Third printer P3 has a third printer controller 70, third print unit 71, third printer storage 72, third printer-side network communicator 73, and third printer-side device communicator 74.

Third printer controller 70 has a third log writer 701 and third printer state manager 702, and controls the third printer P3.

Third printer storage 72 has nonvolatile memory, and stores at least a third log file 721.

Third printer-side network communicator 73 communicates as controlled by the third printer controller 70 through the store-side local area network TLN with devices connected to the store-side local area network TLN.

Third printer-side device communicator 74 communicates as controlled by the third printer controller 70 with POS terminal 8 by USB. A second agent terminal K2 is also connected to third printer P3 through USB cable KB. Third printer-side device communicator 74 communicates as controlled by the third printer controller 70 by USB with second agent terminal K2. Note that in this embodiment third printer P3 and second agent terminal K2 connect through USB cable KB and communicate by USB, but may be configured to communicate by a different communication protocol.

However, third printer P3 and second agent terminal K2 communicate directly, and not through the store-side local area network TLN.

The printers P in this embodiment have configurations and functions equivalent to the printer 9 in the first embodiment as described below.

First printer controller 50, second printer controller 760, and third printer controller 70 are equivalent to printer controller 60 in the first embodiment.

First print unit 51, second print unit 761, and third print unit 71 are equivalent to the print unit 61 in the first embodiment. Note that functionality equivalent to the print controller 605 in the first embodiment is embodied in the first printer controller 50, second printer controller 760, and third printer controller 70.

First agent terminal K1 (monitoring device) is a device that communicates with one or more second printers P2 to be monitored through store-side local area network TLN, monitors the state of the one or more second printers P2, and sends state-related information to the maintenance server 7.

As shown in FIG. 19, first agent terminal K1 has a first agent terminal controller 780, first agent terminal storage 781, and first agent terminal network communicator 782.

First agent terminal controller 780 has a first agent terminal status data generator 7801 and first agent terminal process executor 7802, and controls the first agent terminal K1.

First agent terminal storage 781 has nonvolatile memory, and stores at least a first agent terminal transmission interval registry 7811 and first agent terminal monitored printer manager file 7812.

First agent terminal network communicator 782 communicates as controlled by the first agent terminal controller 780 through the store-side local area network TLN with second printer P2.

The first agent terminal network communicator 782 communicates as controlled by the first agent terminal controller 780 through the global network GN with the maintenance server 7.

The first agent terminal network communicator 782 communicates with devices connected to the store-side local area network TLN, and devices connected to the global network GN.

Second agent terminal K2 (monitoring device) communicates with one or more third printers P3 to be monitored through USB cable KB, monitors the state of the one or more third printers P3, and sends state-related information to the maintenance server 7.

As shown in FIG. 19, second agent terminal K2 has a second agent terminal controller 90, second agent terminal storage 91, second agent terminal network communicator 92, and second agent terminal-side device communicator 93.

Second agent terminal controller 90 has a second agent terminal status data generator 901 and second agent terminal process executor 902, and controls the second agent terminal K2.

Second agent terminal storage 91 has nonvolatile memory, and stores at least a second agent terminal transmission interval registry 911 and second agent terminal monitored printer manager file 912.

Second agent terminal network communicator 92, as controlled by the second agent terminal controller 90, communicates through the global network GN with the maintenance server 7.

The second agent terminal network communicator 92 communicates with devices connected to the store-side local area network TLN and devices connected to the global network GN.

Second agent terminal-side device communicator 93, communicates as controlled by the second agent terminal controller 90 by USB to one or more third printers P3 connected through a USB cable KB.

Note that in this embodiment first agent terminal controller 780 and second agent terminal controller 90, which are components of an agent terminal K, have configurations and functions equivalent to the agent terminal controller 80 of agent terminal 6 in the first embodiment described above.

The network system 1 also includes a maintenance server 7.

The operation of devices in the network system 1 when managing the status of the printers P is described below.

First printer P1, first agent terminal K1, second agent terminal K2, and maintenance server 7 communicate by HTTP (Hypertext Transfer Protocol) in basically the same way as described in the first embodiment. More specifically, first printer P1, first agent terminal K1, and second agent terminal K2 are client devices in a client-server system, and maintenance server 7 is a server in the client-server system.

Processes when the Maintenance Server 7 Manages the State of First Printer P1

The processes of the first printer P1 and maintenance server 7 when the maintenance server 7 manages the state of printer P1 are described first with reference to FIG. 10 and FIG. 11.

The first printer P1, first log writer 501, first printer status data generator 502, first printer-side process executor 503, first log file 521, and first printer transmission interval registry 522 are respectively equivalent to printer 9, log writer 601, printer status data generator 603, printer-side process executor 604, log file 621, and printer transmission interval registry 622 in FIG. 10.

The name of first printer P1 is therefore substituted below in the names of the function blocks shown in FIG. 10.

The basic flow of data exchanged between the function blocks of printer P1 and maintenance server 7 when the maintenance server 7 manages the state of the printer P1 is described below using FIG. 10.

Because the processes of the function blocks and data exchanged between the function blocks are described above in the first embodiment using FIG. 10, redundant description is avoided as much as possible below.

As described in FIG. 10, the first log writer 501 write log information to the first log file 521 at specific times.

First log file 521 is a file in which log information is recorded.

The log information is a record of multiple log items. As in the first embodiment, the log information includes at least printer error, total printed line count, and total cutter operation count log items. Note that these are examples of log items used in this embodiment of the invention, and other items may be logged in addition to the foregoing items or instead of one or more of the foregoing items. For example, log items related to devices connected to the first printer P1, items related to communication (such as the data transfer rate), and items related to processes to run on the first printer P1, may also be included.

The information recorded in second log file 7621 and third log file 721 is the same as the information recorded in the first log file 521.

The content and destination of the printer error, total printed line count, and total cutter operation count items are the same as in the first embodiment, and further description thereof is therefore omitted.

As shown in FIG. 10, first printer status data generator 502, at the interval set in the first printer transmission interval registry 522, generates and sends status data ST (FIG. 12) to the maintenance server 7 (arrow Y6). The operation of the function blocks of the maintenance server 7 that received the status data ST is the same as described in the first embodiment using FIG. 10 (arrows Y7 to Y9).

First printer-side process executor 503 receives the response data TD generated by the responder 202 of the maintenance server 7 (arrow Y9). First printer-side process executor 503 then executes a process based on the received response data TD.

Next, the first printer status data generator 502 references first printer transmission interval registry 522, and at the interval set in the file generates and sends status data ST to the maintenance server 7.

As described above, data is sent and received between the first printer P1 and the maintenance server 7 through a process of the first printer P1 intermittently sending status data ST to the maintenance server 7, and the maintenance server 7 sending response data TD to the first printer P1.

Operation of the first printer P1 and maintenance server 7 when managing the state of the first printer P1 is described next. Operation of the first printer P1 and maintenance server 7 follows the flow chart shown in FIG. 11. In other words, FIG. 11, column (A) shows the operation of the first printer status data generator 502 of the first printer P1, column (B) shows the operation of the first printer process executor 503 of first printer P1, column (C) shows the operation of the status data receiver 201 of the maintenance server 7, column (D) shows the operation of the responder 202 of the maintenance server 7, and column (E) shows the operation of the analyzer 203.

In step SG2, the first printer status data generator 502 first references first log file 521 and finds in the log information in first log file 521 the information required to generate printer state information data JD. The information required to generate printer state information data JD in this embodiment includes at least the printer error, total printed line count, and total cutter operation count log information.

Next, the first printer status data generator 502, based on the acquired log information, generates printer state information data JD (FIG. 7).

In step SG2, the analyzer 203 finds, in the records of the status database 211 (FIG. 9), the record containing the same printer identifier as the printer identifier in the status data ST. Next, the analyzer 203 updates, in the identified record, the values of the printer error detection information, printhead error detection information, and cutter error detection information based on the printer state information contained in the status data ST.

Processes when the Maintenance Server 7 Manages the State of Second Printer P2

Next, processes of the second printer P2, first agent terminal K1, and maintenance server 7 when the maintenance server 7 manages the state of the second printer P2 are described next with reference to FIG. 5 and FIG. 6.

Below, second printer P2, second log writer 7601, printer state manager 7602, and log file 7621 are respectively equivalent to printer 9, log writer 601, printer state manager 602, and log file 621 in FIG. 5.

In addition, first agent terminal K1, first agent terminal status data generator 7801, first agent terminal process executor 7802, and first agent terminal transmission interval registry 7811 are respectively equivalent to agent terminal 6, status data generator 801, process executor 802, and transmission interval registry 811 in FIG. 5.

Second printer P2 and first agent terminal K1 are therefore substituted below in the names of the function blocks shown in FIG. 5.

The basic flow of data sent and received between the function blocks of the second printer P2, first agent terminal K1, and maintenance server 7 when the maintenance server 7 manages the state of the second printer P2 is described below using FIG. 5.

Because the processes of the function blocks and data exchanged between the function blocks are described above in the first embodiment using FIG. 5, redundant description is avoided as much as possible below.

As described in FIG. 5, the second log writer 7601 of the second printer P2 writes log information to the second log file 7621 at specific times.

Second printer state manager 7602, in response to a response request from the first agent terminal K1, generates and sends printer state information data JD (FIG. 7) based on the log information in the second log file 7621 to the first agent terminal K1 (arrow Y1).

First agent terminal status data generator 7801 receives printer state information data JD from each of the printers P that is monitored in the group of printers P connected to the store-side local area network TLN to which the first agent terminal K1 is connected. The first agent terminal status data generator 7801 then, at the interval set in the first agent terminal transmission interval registry 7811, generates and sends status data ST to the maintenance server 7 (arrow Y2). The operation of the function blocks of the maintenance server 7 that received the status data ST is the same as described in the first embodiment using FIG. 5 (arrow Y3 to Y5).

First agent terminal process executor 7802 then receives the response data TD (arrow Y9). The first agent terminal process executor 7802 executes a process based on the received response data TD.

Next, the first agent terminal status data generator 7801 references the first agent terminal transmission interval registry 7811, and at the interval in the file generates and sends status data ST to the maintenance server 7.

As described above, data is sent and received between the first agent terminal K1 and the maintenance server 7 in a cycle of the first agent terminal K1 sending status data ST at a specific interval to the maintenance server 7, and the maintenance server 7 returning response data TD to the first agent terminal K1.

Operation of the second printer P2, first agent terminal K1, and maintenance server 7 when managing the state of the second printer P2 follows the flow chart in FIG. 6. more specifically, FIG. 6, column (A) shows the operation of the second printer state manager 7602 of the second printer P2. FIG. 6, column (B) shows the operation of the first agent terminal status data generator 7801 of the first agent terminal K1, column (C) shows the operation of the first agent terminal process executor 7802 of the first agent terminal K1. FIG. 6 column (D) shows the operation of the status data receiver 201 of the maintenance server 7, column (E) shows the operation of the responder 202 of the maintenance server 7, and column (F) shows the operation of the analyzer 203 of the maintenance server 7. The operation in each step is as described above in the first embodiment.

Processes when the Maintenance Server 7 Manages Third Printer P3

Processes of the third printer P3, second agent terminal K2, and maintenance server 7 when the maintenance server 7 manages third printer P3 are described next.

For the maintenance server 7 to manage the state of third printer P3, third printer P3, second agent terminal K2, and maintenance server 7 executes the same processes as the second printer P2, first agent terminal K1, and maintenance server 7 except for the operations described below.

Specifically, third printer P3 and second agent terminal K2 do not communicate through the store-side local area network TLN, and instead communicate by USB through a USB cable KB connecting the devices. The processes of the third printer P3 and second agent terminal K2 differ from the processes of the second printer P2 and first agent terminal K1 in this way.

Note that the third log writer 701 executes a process corresponding to the process of the second log writer 7601. The third printer state manager 702 executes a process corresponding to the process of the second printer state manager 7602. The same information is recorded in the third log file 721 as in the second log file 7621. The second agent terminal status data generator 901 executes a process corresponding to the process of the first agent terminal status data generator 7801. The second agent terminal process executor 902 executes a process corresponding to the process of the first agent terminal process executor 7802. The information recorded in the second agent terminal transmission interval registry 911 is the same as the information in the first agent terminal transmission interval registry 7811.

In the second agent terminal monitored printer manager file 912 stored by the second agent terminal K2, for each printer P monitored by the second agent terminal K2, printer information and information required to send printer state information response request data DD to the printer P (such as the number of the USB port the printer P is connected to) are recorded.

Note also that a first printer P1 can monitor the states of other printers P connected to the store-side local area network TLN. In this case, the first printer P1 communicates with the other printer P, receives printer state information data JD from that printer P, and sends status data ST including printer state information for that printer P to the maintenance server 7.

Operation of the maintenance server 7 to provide information useful for maintaining printers P to the maintenance technician (meaning, as described above, a person responsible for maintaining the printers P in the store system 3) is the same as described in the first embodiment with reference to FIG. 13 to FIG. 15.

As described above, first agent terminal K1 has a function for monitoring multiple printers P (a function for monitoring the states of multiple printers P). Likewise, second agent terminal K2 has a function for monitoring multiple printers P.

The following problems can result from an agent terminal K being able to monitor the states of multiple printers P.

In the first agent terminal monitored printer manager file 7812 and the second agent terminal monitored printer manager file 912 are stored, for each monitored printer P, the printer identifier of the printer P, and information related to the printer P (including information required to send response request data DD for printer state information to the printer P).

Below, first agent terminal monitored printer manager file 7812 and second agent terminal monitored printer manager file 912 are referred to as monitored printer manager file KF unless differentiating therebetween.

In other words, the first agent terminal K1 monitors the printers P that are managed as printers P to monitor in the first agent terminal monitored printer manager file 7812. Likewise, the second agent terminal K2 monitors the printers P that are managed as printers P to monitor in the second agent terminal monitored printer manager file 912.

The monitored printer information is recorded in the first agent terminal monitored printer manager file 7812 by a specific means for each printer P to monitor. Likewise, monitored printer information is recorded in the second agent terminal monitored printer manager file 912 by a specific means for each printer P to monitor.

Monitored printer information for the same printer P may also be recorded in a different monitored printer manager file KF managed by a different agent terminal K. For example, if the monitored printer information is recorded manually, monitored printer information for the same printer P may be accidentally recorded in the different monitored printer manager file KF of a different agent terminal K.

If monitored printer information for the same printer P is recorded in the different monitored printer manager file KF of a different agent terminal K, printer state information for that printer P may be redundantly sent to the maintenance server 7 by a different agent terminal K. In this case, the processor load on the maintenance server 7 may be increased by the maintenance server 7 executing a process based on the same printer state information for the same printer P (updating records in the status database 211) multiple times. The amount of data exchanged between the agent terminal K and maintenance server 7 may also increase, and the communication load may increase due to the increased amount of data.

In addition, monitored printer information for first printer P1 may be recorded in the monitored printer manager file KF. In this case, the first printer P1 sends printer state information for the first printer P1 to the maintenance server 7, and the agent terminal K sends the printer state information for the first printer P1 to the maintenance server 7. In this case, printer state information for one printer P may be redundantly sent from different devices (agent terminal K and first printer P1) to the maintenance server 7.

Note that the first printer P1, second printer P2, and third printer P3 each have a function for sending printer state information data JD to the agent terminal K when printer state information response request data DD is received from an agent terminal K.

The maintenance server 7 therefore executes the following process.

Figure 20:
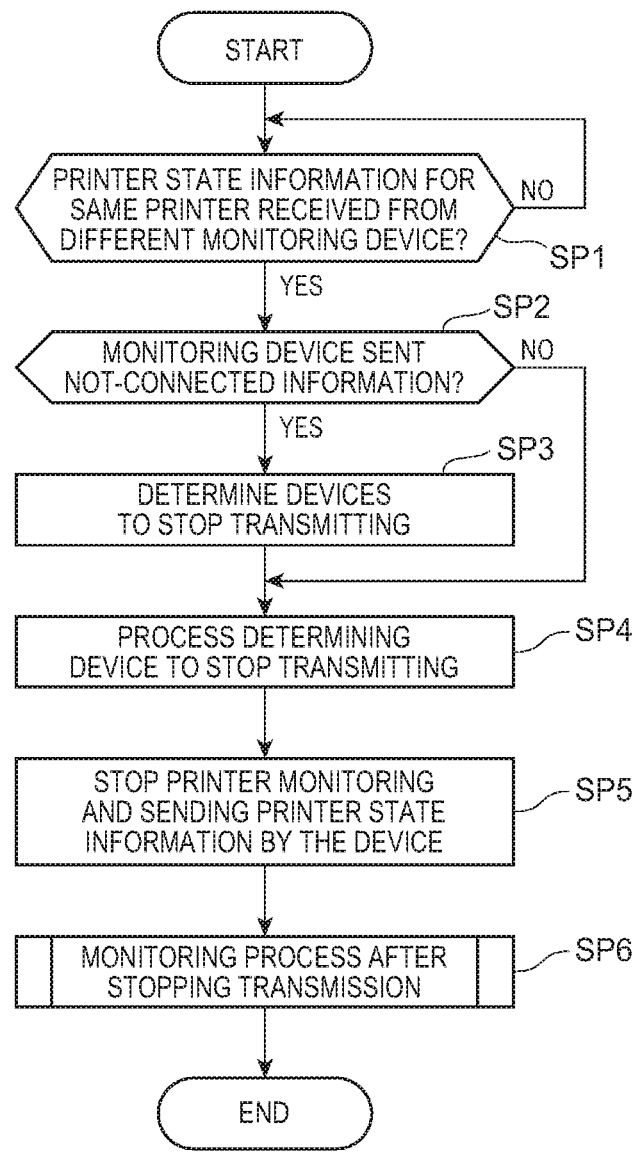
FIG. 20 is a flow chart of an operation of a maintenance server.

FIG. 20 is a flow chart of the operation of the maintenance server 7 (control method of an information processing device).

Unless differentiating therebetween, first printer P1, first agent terminal K1, and second agent terminal K2 are referred to below as monitoring devices. Furthermore, unless differentiating therebetween, the printer identifier and agent terminal identifier are referred to below as the device identifier.

As shown in FIG. 20, the responder 202 of the maintenance server controller 20 of maintenance server 7 monitors if status data ST including printer state information for the same printer was received from a different monitoring device during a specific period (step SP1).

This specific period is a period corresponding to the interval at which the monitoring device sends status data ST to the maintenance server 7 (the interval at which the monitoring device sends response request data DD for printer state information to the printer P). For example, if each monitoring device sends status data ST to the maintenance server 7 at the same interval, the specific period is a period equal to the interval plus a specific margin. The interval may correspond to a pre-specified time of day (at pre-specified a date), or to regular cyclic period of less then, or more than, one day. If the interval at which status data ST is sent to the maintenance server 7 differs according to the monitoring device, the specific period is set appropriately, by tests or simulations, so that whether or not different agent terminals 6 are monitoring the same printer P can be determined.

In step SP1, if status data ST including printer state information related to the same printer identifier was received from a monitoring device having a different device identifier, the responder 202 determines that status data ST including printer state information for the same printer P was received from a different (i.e. more than one) monitoring device. As described above, the device identifier of the monitoring device that sent the status data ST is recorded in the status data ST.

A printer identifier is relationally stored with the printer state information in the status data ST. The responder 202 determines, based on the content of the status data ST, whether or not status data ST including printer state information for the same printer identifier was received from a monitoring device of a different (i.e. more than one) device identifier.

Below, when status data ST including printer state information for the same printer P was received from a different monitoring device, each of the different monitoring devices is referred to as the target monitoring device, and that same printer P is referred to as the target printer.

In addition, the printer state information recorded in the status data ST is referred to as simply printer state information. Sending status data ST including printer state information, for example, is therefore referred to as simply sending printer state information.

In step SP1, if it was determined that status data ST including printer state information for the same printer P was received from a different monitoring device (step SP1: YES), the responder 202 determines if a target monitoring device sent printer state information including not-connected information (step SP2).

The not-connected information is information indicating that a monitored printer P is not connected to the monitoring device (in this example, first agent terminal K1 or second agent terminal K2). That a monitored printer P is not connected to the monitoring device means that the monitoring device cannot communicate with that monitored printer P.

Figure 21:
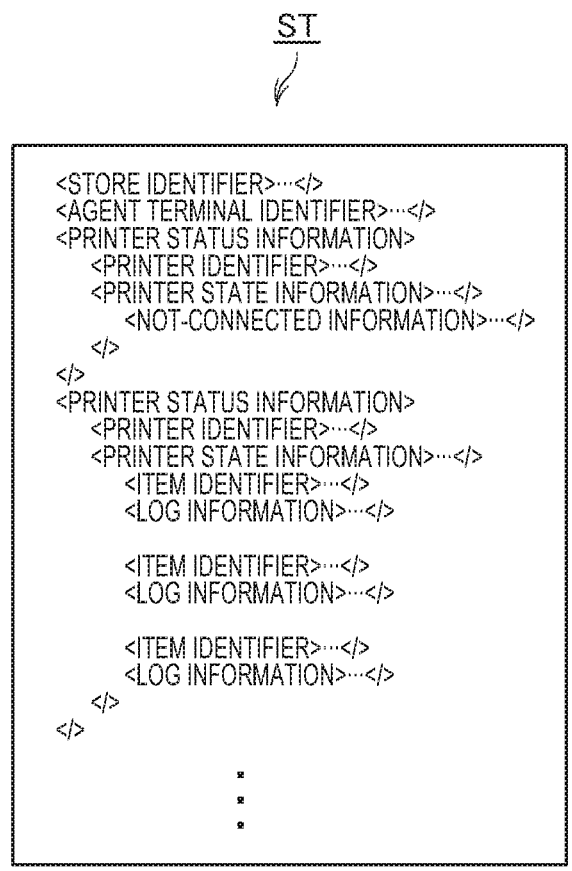
FIG. 21 shows an example of status data.

FIG. 21 shows an example of status data ST including printer state information with not-connected information.

As shown in FIG. 21, if one monitored printer P is not connected to one agent terminal K, not-connected information is written as the printer state information for the one printer P to the status data ST that one agent terminal K generates, instead of writing log-related information for each log item.

If a target monitoring device did not send printer state information including not-connected information (step SP2: NO), responder 202 goes to step SP4.

If a target monitoring device sent printer state information including not-connected information (step SP2: YES), responder 202 identifies the target monitoring device that sent the printer state information including not-connected information as a monitoring device to stop from sending printer state information for that printer (step SP3). As a result of step SP3, the monitoring device that sent printer state information for a printer P that is not connected (that sent printer state information including not-connected information) is stopped (or prevented) from sending printer state information. After step SP3, the responder 202 goes to step SP4.

In step SP4, the responder 202 executes a process of determining the device to stop sending. The process determining the device to stop sending in step SP4 is described next.

The process determining the device to stop sending in step SP4 is a process of identifying a monitoring device to stop from monitoring the state of the printer P, and to stop from sending printer state information, and reducing the number of monitoring devices that send printer state information to one.

For brevity below, stopping monitoring the state of a printer P and stopping sending printer state information is referred to as stopping sending printer state information; and the target monitoring device that is stopped from sending printer state information is referred to as the transmission-stopped device.

Note that if, as a result of the process of step SP3, in step SP4 the number of target monitoring devices stopped from sending printer state information is one, the responder 202 skips step SP4 and goes to step SP5.

In the process determining the device to stop sending, the responder 202 determines which devices to set as the transmission-stopped device in the following order of priority.

When multiple agent terminals K are target monitoring devices, the responder 202 prioritizes (designates) agent terminals K (optionally within a specific category such as those that monitor a printer via a network link or those that monitor a printer via a direct connection) that monitor a greater number of printers P as transmission-stopped device. For example, if a group of target monitoring devices include a first agent terminal K and a second agent terminal K, and the first agent terminal K monitors ten printers P while the second agent terminal K monitors five printers P, then the responder 202 will designated the first agent terminal K as a transmission-stopped device (for at least one, and optionally more, particular printer(s) 9, or the number of printers that each agent terminal is instructed to stop monitoring is selected so as to balance the load of monitored printers among the agent terminals). Because the number of printer state information entries in the status data ST corresponds to the number of printers P, the responder 202 acquires, based on the content of the corresponding status data ST, how many printers P each of the first and second agent terminal monitors.

The maintenance server 7 also manages, in a specific database, for each agent terminal K, whether the agent terminal K is a first-type agent terminal K1 (a type of device that communicates with printers P through the store-side local area network TLN to monitor the printer P states) (hereinafter first agent terminal K1), or a second-type agent terminal K2 (a type of device that communicates directly with printers P by USB or Bluetooth, for example, to monitor the printer P states) (hereinafter second agent terminal K2).

The reason first agent terminals K1 that monitor more printers P are prioritized (are assigned a higher priority for being designated) as a transmission-stopped device is described below.

By prioritizing the first agent terminals K1 in descending order of the number of monitored printers P as a transmission-stopped device, the number of printers P monitored by each first agent terminal K1 can be more evenly distributed among the first agent terminals K1. This can prevent the processor load from being concentrated on any particular first agent terminal K1. By prioritizing the first agent terminals K1 in descending order of the number of monitored printers P as the transmission-stopped device, the amount of status data ST sent by the different first agent terminals K1 can also be more evenly distributed.

When a set of target monitoring devices includes both first agent terminal(s) K1 and second agent terminal(s) K2, the responder 202 prioritizes as transmission-stopped devices the first agent terminals K1 over the second agent terminals K2. (Note that this may be the opposite of the prioritizing technique used by the individual printers 9). For example, if the target monitoring devices include one first agent terminal K1 and one second agent terminal K2, the responder 202 selects (designates) the one first agent terminal K1 as the transmission-stopped device.

The reason for prioritizing a first agent terminal K1 over second agent terminals K2 as the transmission-stopped device is described next.

A first agent terminal K1 is a device that communicates through the store-side local area network TLN (network) with the printers P to monitor printer P states. As described above, when a printer P is monitored by a first agent terminal K1, printer state information response request data DD and printer state information data JD is sent between the devices over the store-side local area network TLN. Therefore, by prioritizing first agent terminals K1 over second agent terminals K2 as the transmission-stopped device, the communication load on the store-side local area network TLN can be greatly reduced. Because the store-side local area network TLN is a network used for communication between many devices, congestion on the store-side local area network TLN, and communication delays through the store-side local area network TLN, can be suppressed by reducing the communication load on the store-side local area network TLN.

In other words, when stopping one or more of multiple different agent terminals K from monitoring the state of, and sending printer state information for, a printer P, the responder 202 selects the agent terminals K that, by stopping printer P state monitoring and sending printer state information, will have the greatest effect reducing the communication load on the network.

When a first printer P1 and an agent terminal K are target monitoring devices, the responder 202 prioritizes the first printer P1 as a transmission-stopped device. For example, if the target monitoring devices include one first printer P1 and one first agent terminal K1, and one second agent terminal K2, the responder 202 selects the one first printer P1 as the transmission-stopped device.

The reason for prioritizing a first printer P1 over an agent terminal K as the transmission-stopped device is described below.

As described above, a first printer P1 is used at a checkout counter to execute a specific process in a transaction and produce a receipt. More specifically, in addition to monitoring its own state, a first printer P1 must execute a process essential to store business. A first printer P1 may execute a state monitoring process and a process essential to store business at the same time, and the processor load may therefore increase suddenly. As a result, by prioritizing first printers P1 over agent terminals K as the transmission-stopped device, the processor load can be effectively reduced greatly.

A delay in the process essential to store business (a delay in the receipt production process) may also adversely affect customer satisfaction, and the process essential to store business is therefore prioritized over the state monitoring process. Therefore, by prioritizing a first printer P1 over an agent terminal K as the transmission-stopped device, adverse effects on essential business processes in the store resulting from the first printer P1 executing a state monitoring process can be prevented.

As described above, a first printer P1 is another example of a monitoring device that monitors its own state and sends printer state information.

In the process of determining the device to stop sending in step SP4, the responder 202 determines the transmission-stopped monitoring device in descending order of priority based on the conditions described above, and selects the target monitoring device lowest in the order of priority as a device to not stop sending printer state information.

After the process determining the device to stop sending in step SP4, the responder 202 stops the monitoring device selected as the transmission-stopped device from monitoring a target printer and sending printer state information by the method described below (step SP5).

When status data ST is received from the monitoring device selected as the transmission-stopped device, the responder 202 generates response data TD including the printer identifier of the target printer, and a stop instruction instructing stopping monitoring the state of a target printer and stop sending printer state information for the target printer. Next, the responder 202 sends the generated response data TD as a response to the monitoring device selected as a transmission-stopped device.

A monitoring device receiving response data TD including a stop instruction then, based on the response data TD, stops monitoring the state of the printer P of the printer identifier included in the stop instruction (that is, the target printer), and stops sending printer state information for the printer P.

More specifically, when the monitoring device is a first printer P1 (in this case, the target printer is a first printer P1) the first printer-side process executor 503, based on the stop instruction, stops monitoring the state of the first printer P1 and stops sending printer state information for the first printer P1.

When the monitoring device is a first agent terminal K1, the first agent terminal process executor 7802 of the first agent terminal K1, based on the stop instruction, updates the first agent terminal monitored printer manager file 7812, and deletes from the file the monitored printer information related to the printer identifier in the stop instruction. As a result, the first agent terminal K1 stops monitoring the state of the printer P (the target printer) of the printer identifier included in the stop instruction and stops sending printer state information for that printer P.

When the monitoring device is a second agent terminal K2, the second agent terminal process executor 902 of the second agent terminal K2, based on the stop instruction, updates the second agent terminal monitored printer manager file 912, and deletes from the file the monitored printer information related to the printer identifier in the stop instruction. As a result, the second agent terminal K2 stops monitoring the state of the printer P (the target printer) of the printer identifier included in the stop instruction and stops sending printer state information for that printer P.

After step SP5, the responder 202 executes a post-stopping monitoring process (step SP6).

Figure 22:
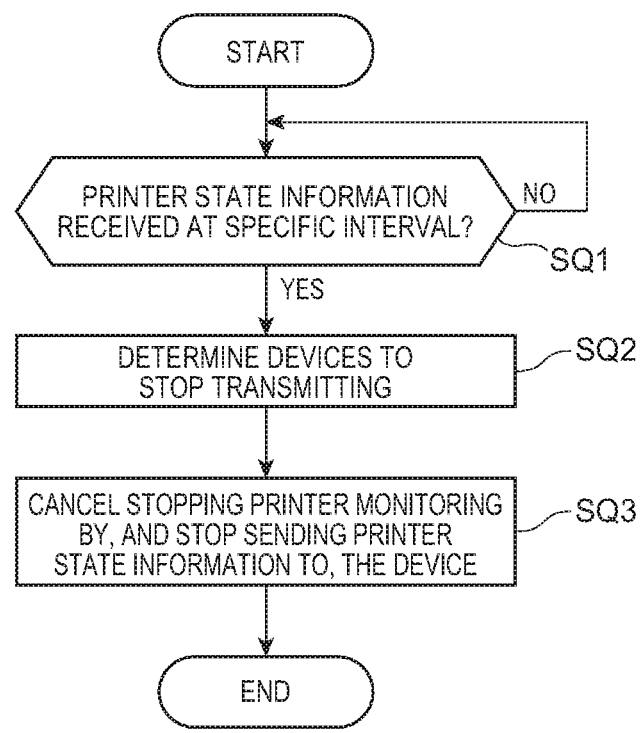
FIG. 22 is a flow chart of an operation of a maintenance server.

FIG. 22 is a flow chart of the post-stopping monitoring process.

As shown in FIG. 22, the responder 202 monitors if status data ST containing monitored printer information for the target printer is received at a specific interval from the monitoring device that was selected as a device to not stop sending printer state information in the process of step SP4 determining the device to stop sending (step SQ1).

If status data ST is not received at the specific interval (step SQ1: NO), the responder 202 again applies the process determining the device to stop sending to the monitoring devices identified as a transmission-stopped device in the process determining the devices to stop sending, and selects a monitoring device as a monitoring device to cancel stopping sending printer state information for the target printer (step SQ2).

Next, the responder 202 instructs the selected monitoring device to cancel stopping sending printer state information for the target printer by the following method. Specifically, the responder 202, when status data ST is received from the monitoring device selected to cancel stopping sending printer state information for the target printer, generates response data TD containing a cancel instruction instructing cancelling stopping sending printer state information. Next, the responder 202 sends the response data TD to the monitoring device selected to cancel stopping sending printer state information for the target printer (step SQ3).

The effect of executing this post-stopping monitoring process is described below. Specifically, even if the monitoring device selected as the device to continue sending printer state information in the process determining the device to stop sending in step SP4 is unable to send printer state information for the target printer because of a malfunction, the device was replaced, or other reason, a different monitoring device can be enabled to send printer state information for the target printer.

In this way, in this embodiment, the maintenance server 7, when printer state information for the same printer P is received from different monitoring devices, stops transmission of printer state information by monitoring devices other than a specific monitoring device. As a result, redundant transmission of printer state information for the same printer P to the maintenance server 7 can be prevented; increasing the processor load of the maintenance server 7 can be suppressed; increasing the amount of data sent and received between a monitoring device and maintenance server 7 can be suppressed; and an increase in the communication load resulting from an increase in the amount of data can be suppressed.

As described above, a network system 1 according to this embodiment has a printer P; a monitoring devices (first printer P1, first agent terminal K1, second agent terminal K2) that can monitor the state of the printer P; and a maintenance server 7 (information processing device) that can communicate with the monitoring devices. The monitoring device can monitor the states of multiple printers P and send to the maintenance server 7, for one or more printers P targeted for monitoring, printer state information related to the state of each printer P. The maintenance server 7 manages the received printer state information, and when printer state information for the same printer P is received from multiple different monitoring devices, stops monitoring the state of and sending printer state information for the printer P by monitoring devices other than a specific monitoring device.

As a result, redundant transmission of printer state information for the same printer P to the maintenance server 7 can be prevented; increasing the processor load of the maintenance server 7 can be suppressed; increasing the amount of data sent and received between a monitoring device and maintenance server 7 can be suppressed; and an increase in the communication load resulting from an increase in the amount of data can be suppressed. More specifically, this configuration enables a network system 1, in which monitoring devices monitor the state of printers P and send state-related information to the maintenance server 7, to execute a process for handling monitoring devices that can monitor the states of multiple printers P.

Of the multiple different monitoring devices, the maintenance server 7 in this embodiment determines, in a specific order of priority, which of the multiple different monitoring devices to select as the monitoring device to stop from monitoring the printer P states and sending printer state information.

Using this order of priority, this configuration can appropriately determine which monitoring devices to select as a monitoring device to stop from monitoring the printer P states and sending printer state information.

In this embodiment of the invention, of the multiple different monitoring devices, the maintenance server 7 prioritizes, in descending numerical order, monitoring devices that monitor a greater number of printers P as monitoring devices to stop printer P state monitoring and sending printer state information.

This can more evenly distribute the number of printers P monitored by each monitoring device. This can also prevent concentrating the processor load on any monitoring device. The amount of status data ST transmitted by each monitoring device can also be more evenly distributed.

A monitoring device in this embodiment may communicate with printers P and monitor the state of printers P through a store-side local area network TLN (network). Of the multiple different monitoring devices to stop printer P state monitoring and sending printer state information, the maintenance server 7 prioritizes, in descending order, monitoring devices that will have the greatest impact on reducing the communication load on the store-side local area network TLN.

This configuration can effectively reduce the communication load on the store-side local area network TLN, and suppress congestion on the store-side local area network TLN and delays in communication through the store-side local area network TLN.

Of the multiple different monitoring devices to stop printer P state monitoring and sending printer state information, the maintenance server 7 prioritizes, in descending order, monitoring devices for which the decrease in the processor load on the monitoring device will be greatest by stopping printer P state monitoring and sending printer state information.

This configuration can effectively reduce the processor load on monitoring devices.

In this embodiment, the maintenance server 7, by sending to a monitoring device a stop instruction instructing the monitoring device to stop printer P state monitoring and sending printer state information, the monitoring device is made to stop printer P state monitoring and sending printer state information.

This configuration enables the maintenance server 7 to send a stop instruction, and appropriately stop printer P state monitoring and sending printer state information by a particular monitoring device.

A monitoring device in this embodiment sends, at a specific interval, printer state information to the maintenance server 7. When printer state information is received for the same printer P from multiple different monitoring devices during a period corresponding to a specific interval, the maintenance server 7 stops printer P state monitoring and sending printer state information by monitoring devices other than a specific monitoring device.

Because monitoring devices send printer state information at a specific interval to the maintenance server 7, whether or not multiple different monitoring devices send printer state information for the same printer P can be determined.

When a printer P that is a target printer for monitoring by a monitoring device is not connected, the monitoring device in this embodiment sends to the maintenance server 7 not-connected information, which reports that the target printer P to be monitored is not connected. When printer state information for one printer P from one monitoring device is received, and not-connected information for that one printer P is received from another monitoring device, the maintenance server 7 stops that other monitoring device from monitoring the state of that one printer P and sending printer state information.

When a monitoring device is monitoring the state of a printer P that is not connected, this configuration stops that monitoring device from monitoring the state of the printer P.

If the maintenance server 7 does not receive printer state information from a specific monitoring device after stopping printer P state monitoring and sending printer state information by monitoring devices other than the specific monitoring device, the maintenance server 7 cancels stopping printer P state monitoring and sending printer state information by a monitoring device other than the specific monitoring device.

If the monitoring device selected as the device to continue sending printer state information is unable to send printer state information for the target printer P because of a malfunction, the device was replaced, or other reason, a different monitoring device can be enabled to send printer state information for the target printer P.

Embodiment 3

A third embodiment of the invention is described next with reference to the figures.

Note that like parts in this and the first embodiment are identified by like reference numerals, and further description thereof is omitted or simplified.

Figure 23:
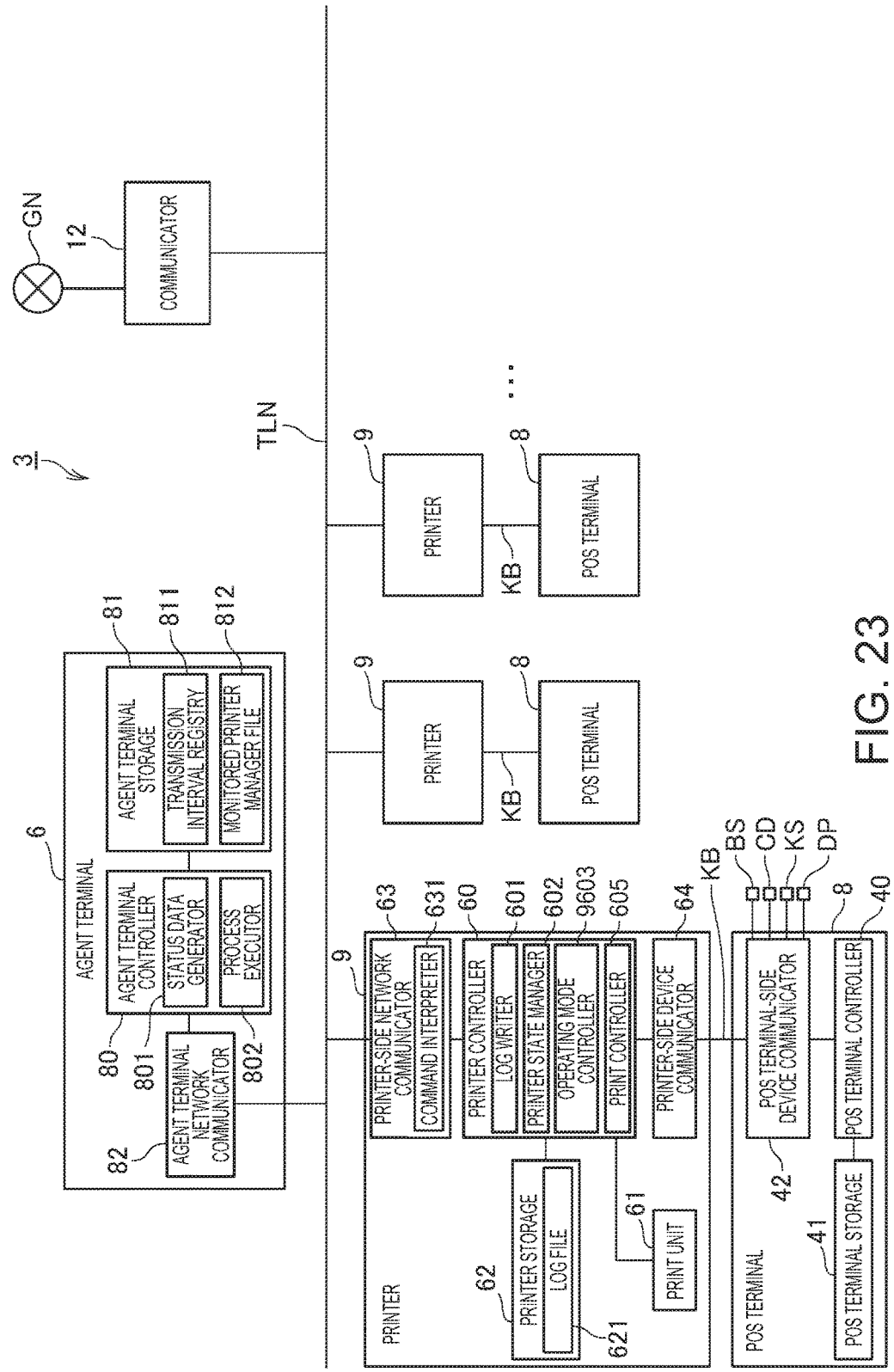
FIG. 23 is a block diagram of the configuration of a store system according to a third embodiment of the invention, and the functional configuration of devices in the store system.

FIG. 23 is a block diagram showing the functional configuration of a store system 3 according to the third embodiment of the invention, and POS terminal 8, printer 9, and agent terminal 6 in the store system 3.

As in the first embodiment, the printer 9 is a thermal line printer that stores roll paper and prints images by forming dots on the roll paper with a thermal line head.

As shown in FIG. 23, printer 9 includes a printer controller 60, print unit 61, printer storage 62, printer-side network communicator 63, and printer-side device communicator 64.

The printer controller 60 includes an operating mode controller 9603, and the printer-side network communicator 63 includes a command interpreter 631. The command interpreter 631 is described further below.

The printer storage 62 has nonvolatile memory, and stores at least a log file 621.

The status data generator 801 of the agent terminal 6 receives printer state information data JD from a monitored target printer 9 in the group of printers 9 connected to the store-side local area network TLN to which agent terminal 6 is connected.

The status data generator 801 references the transmission interval registry 811 and generates status data ST based on the received printer state information data JD at the interval in the transmission interval registry 811.

The functions and processes based on the functions of the POS terminal 8, printer 9, agent terminal 6, and communicator 12 of the store system 3 according to the third embodiment of the invention are basically the same as in the first embodiment described with reference to FIG. 5 to FIG. 9, and FIG. 13 to FIG. 15.

The POS terminal 8, and barcode scanner BS, customer display CD, cash drawer KS, and display DP devices are also as described in the first embodiment.

The operating modes of the printer 9 in this embodiment, however, include a normal mode (normal state) and a sleep mode (sleep state).

The operating mode of the printer 9 in the operation described in FIG. 6 is the normal mode (normal state), not the sleep mode (sleep state).

In the normal mode, from a power source not shown, power is supplied for normal operation to the power consumer parts in the printer 9, and the printer 9 can execute normal operating processes, including printing-related processes.

In the sleep mode, from a power source not shown, the power supply to the power consumer parts in the printer 9 is restricted in a specific manner, and the processes the printer 9 can execute are limited. In the sleep mode, the printer 9 can execute printing-related processes with the print unit 61. In the sleep mode, therefore, power consumption is suppressed in comparison to the normal mode.

In this embodiment, because the printer 9 sends printer state information data JD as a response to the received request when the printer 9 receives response request data DD for printer state information from an agent terminal 6, the time that the sleep mode continues being shortened unnecessarily is suppressed, and power consumption by the printer 9 is efficiently reduced.

The processes of the printer 9 and agent terminal 6 related to efficiently reducing power consumption by the printer 9 are described below.

Figure 24:
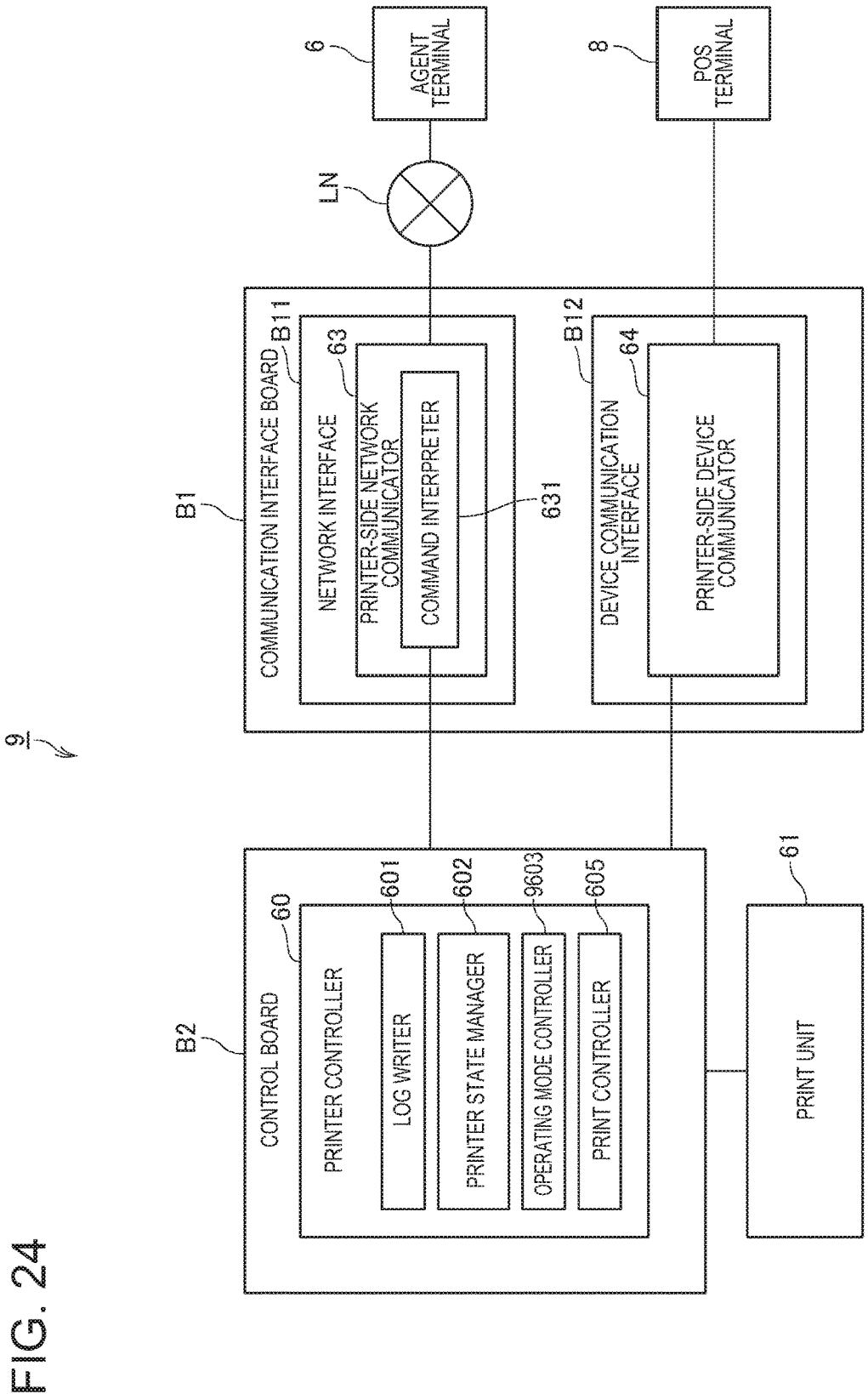
FIG. 24 illustrates main parts of the printer.

FIG. 24 illustrates essential parts of the printer 9.

For convenience in FIG. 24, physical components and function blocks are both represented by blocks.

As shown in FIG. 24, the printer 9 has internal circuit boards including a communication interface board B1 and a control board B2.

Communication interface board B1 is a circuit board comprising communication interfaces for the communication protocols the printer 9 can use.

Communication interface board B1 includes a network interface B11 and a device communication interface B12.

Network interface B11 includes an interface board compatible with wired LAN communication protocols such as Ethernet®, a wireless communication module compatible with Wi-Fi® or other wireless LAN communication protocols, or communication interfaces compatible with other LAN communication protocols. Network interface B11 further includes a CPU, ASIC, or other control circuits as needed, and functions as a printer-side network communicator 63. Function blocks of the printer-side network communicator 63 include a command interpreter 631.

Device communication interface B12 has at least an USB communication interface. The device communication interface B12 functions as a printer-side device communicator 64.

In the normal mode, power is supplied in the normal state to the communication interface board B1 and control board B2.

In the sleep mode, the power supply to the control board B2 is limited to a specific state. As a result, in the sleep mode, the operating frequency of the CPU of the control board B2 drops, and the processes of the function blocks of the printer controller 60 are limited. Therefore, when the operating mode is in the sleep mode, printing with the print unit 61, and writing information to the log file 621 by the log writer 601, as controlled by the print controller 605 are limited.

The control board B2 is also a circuit board populated with circuits related to printer 9 control. Control board B2 also has a CPU, ASIC, or other control circuits, and functions as the printer controller 60. As described above, the printer controller 60 includes a log writer 601, printer state manager 602, operating mode controller 9603, and print controller 605.

The operating mode controller 9603 is described next.

The operating mode controller 9603 controls changing the operating mode of the printer 9 between the normal mode and sleep mode.

Figure 25:
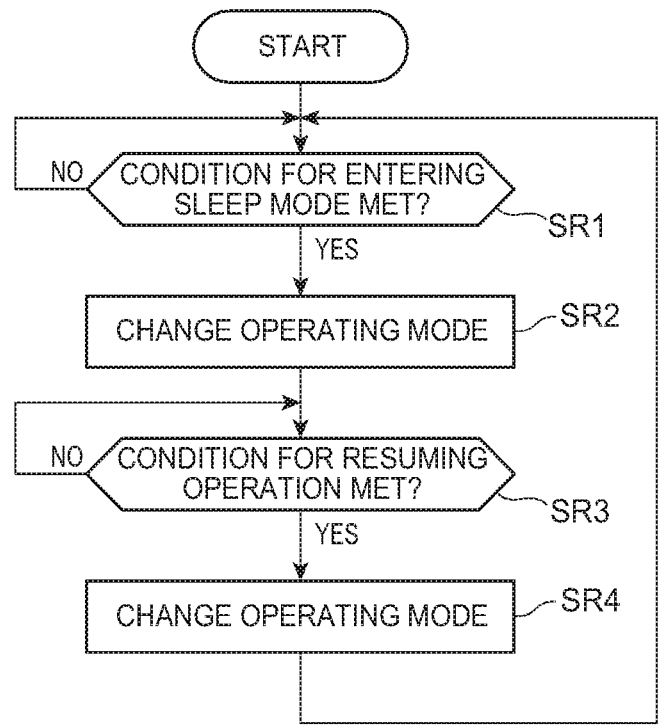
FIG. 25 is a flow chart of an operation of the printer.

FIG. 25 is flow chart of operating mode controller 9603 operation.

Note that the operating mode is in the normal mode at the start of the operation in the flow chart in FIG. 25.

As shown in FIG. 25, operating mode controller 9603 monitors, while in the normal mode, if a condition for changing the operating mode to the sleep mode was met (step SR1).

The condition for changing the operating mode from the normal mode to the sleep mode is that control data is not received from an external device (including agent terminal 6 and POS terminal 8), and a process based on control data was not executed, for a specific time.

If the condition for changing to the sleep mode was met (step SR1: YES), the operating mode controller 9603 changes the operating mode from the normal mode to the sleep mode (step SR2).

After entering the sleep mode, the operating mode controller 9603 monitors if the condition for changing from the sleep mode to the normal mode was met (step SR3).

Note that while the operating mode is set to the sleep mode, operating mode controller 9603 operation is limited. In step SR3, the operating mode controller 9603 determines the condition for changing from the sleep mode to the normal mode was met if input of an interrupt signal to the CPU from the printer-side network communicator 63 or printer-side device communicator 64 is detected.

If the condition for changing to the normal mode was met (step SR3: YES), the operating mode controller 9603 changes the operating mode from the sleep mode to the normal mode (step SR4). Upon entering the normal mode, processing by function blocks of the printer controller 60 is enabled.

After step SR4, the operating mode controller 9603 goes to step SR1.

The printer-side device communicator 64 is described next.

Operation of the printer-side device communicator 64 when the operating mode is the normal mode is described first.

When the operating mode is the normal mode, the printer-side device communicator 64 monitors if a control command was received from the POS terminal 8 connected through a USB cable KB.

If a control command was received, the printer-side device communicator 64 sequentially stores the received control commands in a receive buffer not shown, and outputs a specific signal to the printer controller 60 to report a control command was received.

Printer controller 60 then processes the control commands stored in the receive buffer based on this report. For example, if the received control command is a control command instructing producing a receipt, the print controller 605 sequentially reads and executes the control commands from the receive buffer, and controls the print unit 61 to produce a receipt.

Operation of the printer-side device communicator 64 when the operating mode is the sleep mode is described next.

When the operating mode is the sleep mode, the printer-side device communicator 64 monitors if a control command was received from the POS terminal 8 connected through a USB cable KB.

If a control command was received, the printer-side device communicator 64 sequentially stores the received control commands in a receive buffer not shown, and outputs an interrupt signal to the operating mode controller 9603 to report a control command was received.

As described above, the operating mode controller 9603, in response to input of an interrupt signal from the printer-side device communicator 64, changes the operating mode from the sleep mode to the normal mode. After entering the normal mode, the printer controller 60 processes the control commands stored in the receive buffer. For example, if the received control command is a control command instructing producing a receipt, the print controller 605 sequentially reads and executes the control commands from the receive buffer, and controls the print unit 61 to produce a receipt.

The command interpreter 631 of the printer-side network communicator 63 is described next.

Operation of the command interpreter 631 when the operating mode is the normal mode is described next.

When the operating mode is the normal mode, the command interpreter 631 monitors, through the store-side local area network TLN, if data was received from an external device (including agent terminal 6).

If data was received, the command interpreter 631 sequentially stores the received data in a receive buffer not shown, and outputs a specific signal to the printer controller 60 to report data was received.

Printer controller 60 then processes the data stored in the receive buffer based on this report. For example, if the data was response request data DD for printer state information the agent terminal 6 sent, the printer state manager 602 reads the response request data DD for printer state information from the receive buffer, and in response to the data sends printer state information data JD to the agent terminal 6.

Operation of the command interpreter 631 when the operating mode is the sleep mode is described next.

Figure 26:
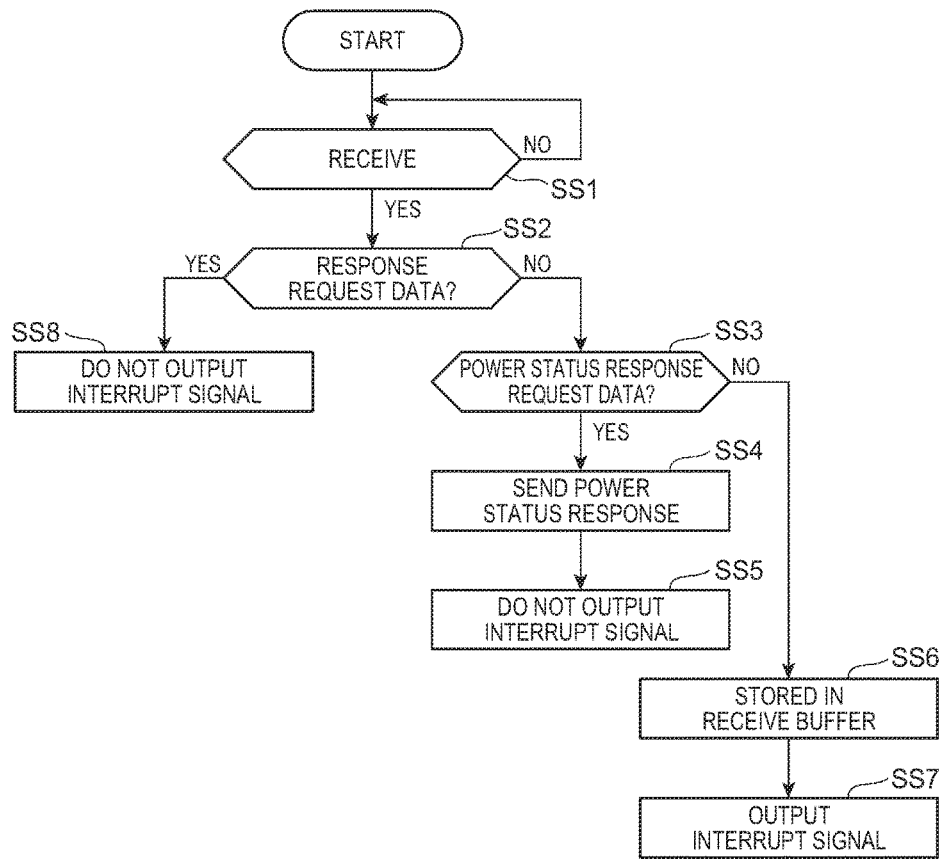
FIG. 26 is a flow chart of an operation of the printer.

FIG. 26 is a flow chart of command interpreter 631 when the operating mode is the sleep mode.

As shown in FIG. 26, when the operating mode is the sleep mode, the command interpreter 631 monitors if data was received through the store-side local area network TLN from an external device (including agent terminal 6) (step SS1).

If data was received (step SS1: YES), the command interpreter 631 analyzes the received data, and determines if the received data was response request data DD for printer state information (step SS2).

If the received data is not response request data DD for printer state information (step SS2: NO), the command interpreter 631 determines if the received data is power state response request data (step SS3). If the received data is power state response request data (step SS3: YES), the command interpreter 631 sends power state response data as the response to the request (step SS4). If the received data is not power state response request data (step SS3: NO), the command interpreter 631 goes to step SS6.

Power state response request data is data the status data generator 801 of the agent terminal 6 sends to a monitored printer 9 to check if the printer 9 power is on or off.

The status data generator 801 of the agent terminal 6 sends power state response request data to the monitored printer 9 at a regular interval. If power state response data was received during the specific period as a response to the power state response request data, the status data generator 801 determines the printer 9 power is on. If power state response data was not received during the specific period after power state response request data was sent, the status data generator 801 determines the printer 9 power is off.

Note that the command interpreter 631 returns power state response data regardless of the operating mode.

When power state response data is sent in step SS4, the command interpreter 631 does not output an interrupt signal to the operating mode controller 9603 (step SS5).

As a result, the operating mode does not go to the normal mode, and the operating mode remains in the sleep mode.

In step SS6, the command interpreter 631 sequentially stores the received data in the receive buffer (step SS6), and outputs an interrupt signal to the operating mode controller 9603, reporting that a control command was received (step SS7).

As described above, the operating mode controller 9603, when an interrupt signal is input from the command interpreter 631, changes the operating mode from the sleep mode to the normal mode. After entering the normal mode, the printer controller 60 processes data stored in the receive buffer.

If the received data is response request data DD for printer state information (step SS2: YES), the command interpreter 631 does not store response request data DD for printer state information in the receive buffer, and does not output an interrupt signal to the operating mode controller 9603 (step SS8).

As a result, the operating mode does not go to the normal mode, and the operating mode remains in the sleep mode. As a result, response request data DD for printer state information is also not processed, and printer state information data JD is not sent as a response to the data.

The reason the command interpreter 631 executes this process is described below.

When the operating mode is the sleep mode, processing by the print unit 61 is restricted, and the state of the print unit 61 therefore does not change. More specifically, monitored items that are logged in this embodiment include printer errors, total printed line count, and total cutter operation count, but when the operating mode is the sleep mode, these items basically do not change. As described above, the agent terminal 6 periodically sends response request data DD for printer state information to the printer 9. When the printer 9 is in the sleep mode, the interval at which the agent terminal 6 sends response request data DD for printer state information is sufficiently shorter than the average time the printer 9 remains in the sleep mode.

Therefore, if the printer 9 goes to the sleep mode after response request data DD for printer state information is received once and before response request data DD for printer state information is received again, the possibility is extremely high that the state of the print unit 61 when response request data DD for printer state information was first received, and the state of the print unit 61 when response request data DD for printer state information is next received, are the same (the state of the print unit 61 has not changed).

Based thereon, when the operating mode is the sleep mode and response request data DD for printer state information is received, the printer 9 does not change the operating mode to the normal mode, and does not send printer state information data JD as a response to the received data. Unnecessarily shortening the duration of the sleep mode is therefore suppressed, and power consumption by the printer 9 can be efficiently reduced.

As described below, if printer state information data JD is not received in response to response request data DD for printer state information that was sent, the agent terminal 6 executes an appropriate process so that problems resulting from the printer 9 not responding do not occur.

Next, the process of the agent terminal 6 (control method of a monitoring device) is described below.

Figure 27:
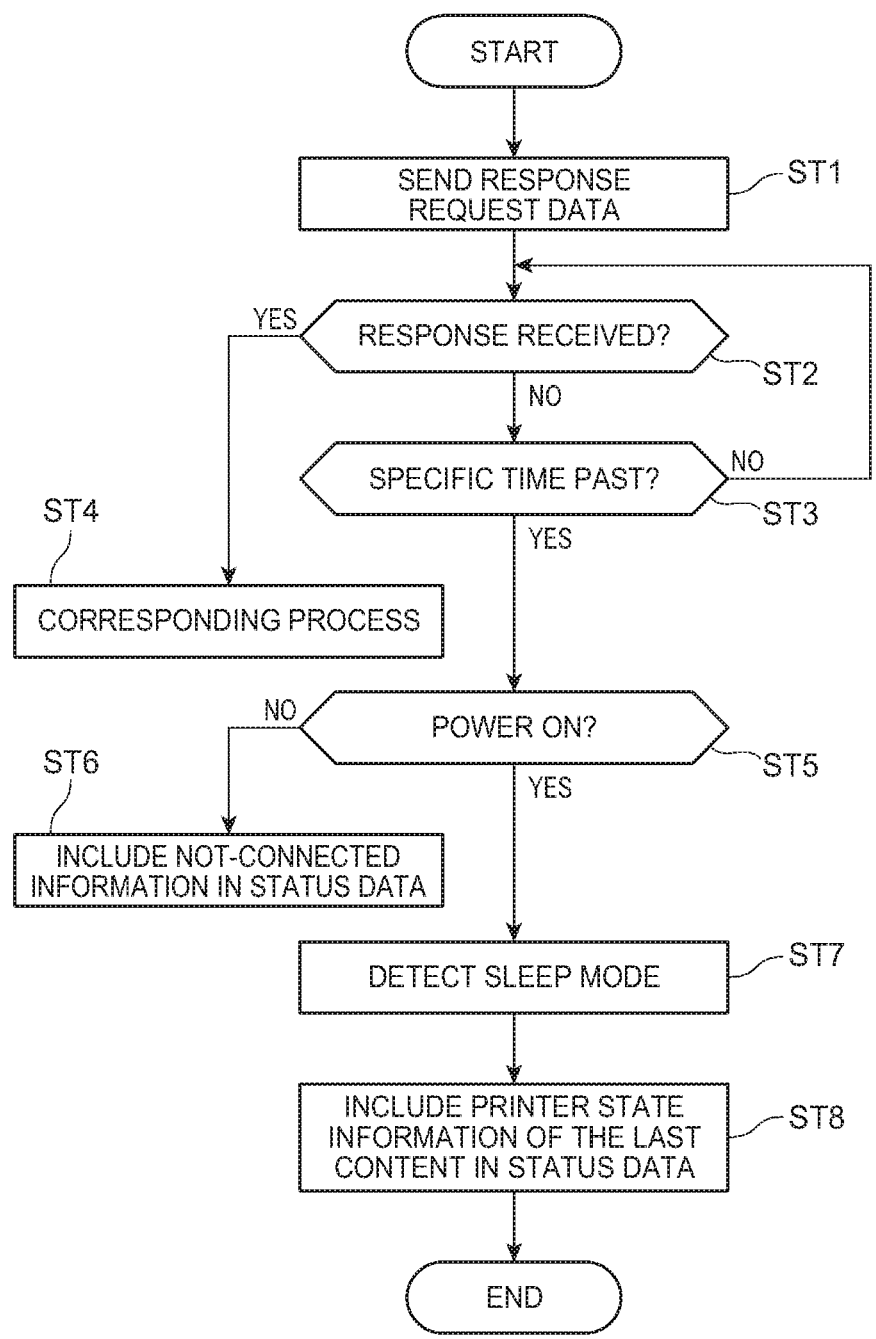
FIG. 27 is a flow chart of an operation of an agent terminal.

FIG. 27 is a flow chart of the process of the agent terminal 6 when the agent terminal 6 sends response request data DD for printer state information.

As shown in FIG. 27, the status data generator 801 of the agent terminal 6 sends response request data DD for printer state information to a monitored printer 9 (step ST1). The process of step ST1 is the same as step SB3 in FIG. 6, column (B).

For simplicity below in the description referring to FIG. 27, in step ST1 the status data generator 801 sends response request data DD for printer state information to one printer 9.

After sending response request data DD for printer state information, the status data generator 801 monitors whether or not the specific period past (step ST3), and whether or not printer state information data JD was received before the specific period past (step ST2).

The specific period is previously set to the maximum time required until the printer 9 sends printer state information data JD when response request data DD for printer state information is received while the operating mode of the printer 9 is the normal mode.

If printer state information data JD is received before the specific period passes (step ST2: YES), the status data generator 801 executes the process from step SB5 in FIG. 6, column (B) (step ST4).

If the specific period past without receiving printer state information data JD (step ST3: YES), the status data generator 801 determines if the power of the printer 9 to which the response request data DD for printer state information was sent is on (step ST5).

The status data generator 801 thus regularly periodically sends power state response request data to the monitored printer 9, and monitors the power state of the printer 9 based on the state in the response to the request.

If the power is not on (step ST5: NO), the status data generator 801, when generating status data ST, sets the power state information of the printer 9 to the not-connected information state (step ST6).

As described above, the not-connected information is information indicating that the monitored printer 9 is not connected to the agent terminal 6. That the monitored printer 9 is not connected to the agent terminal 6 means that the agent terminal 6 cannot communicate with that monitored printer 9.

Status data ST including printer state information with not-connected information is as shown in FIG. 21.

As shown in FIG. 21, if one monitored printer 9 is not connected to one agent terminal 6, not-connected information is written as the printer state information for the one printer 9 to the status data ST that one agent terminal 6 generates, instead of writing log-related information for each log item.

If the power is in the on state (step ST5: YES), the status data generator 801 determines the operating mode of the printer 9 is the sleep mode (step ST7). This is because, as described above, even if the printer 9 power is on, the printer 9 does not send printer state information data JD as a response to response request data DD for printer state information when the operating mode is the sleep mode.

Next, the status data generator 801, when generating status data ST, sets the printer state information of the printer 9 to the same content as the printer state information recorded in the corresponding status data ST that was most recently sent (step ST8). As described above, this is because the operating mode of the printer 9 is the sleep mode, and the possibility that the state of the print unit 61 has not changed is extremely high.

A network system 1 according to this embodiment includes a printer 9 that has a print unit 61 and prints by the print unit 61 on roll paper (recording media); and an agent terminal 6 (monitoring device) that can communicate with the printer 9.

When in the normal mode (normal state), which is not a sleep mode (sleep state) in which operation of the print unit 61 is restricted, and response request data DD for printer state information requesting a response for information related to the state of the print unit 61 is received, the printer 9 sends, to the agent terminal 6, printer state information data JD including information related to the state of the print unit 61.

When in the sleep mode and response request data DD for printer state information is received, the printer 9 does not send printer state information data JD.

The agent terminal 6 monitors the power state of the printer 9, and determines the printer 9 is in the sleep mode if the agent terminal 6 sent response request data DD for printer state information to the printer 9 while the printer 9 power is on, and does not receive printer state information data JD in response to the request.

Because the printer 9 is configured to not send printer state information data JD as a response to request data when response request data DD for printer state information is received from the agent terminal 6, unnecessarily shortening the duration of the sleep mode can be suppressed, and power consumption by the printer 9 can be efficiently reduced.

In this embodiment of the invention, when in the sleep state and power state response request data, which is used to check the power state, is received from an agent terminal 6, the printer 9, without going from the sleep mode to the normal mode, sends to the agent terminal 6 power state response request data reporting that the power is in the on state. By sending power state response request data to the printer 9, the agent terminal 6 monitors the power state of the printer 9 based on the state in the response to the request data.

The agent terminal 6 can therefore desirably monitor the power state of the printer 9 regardless of the operating mode of the printer 9.

In this embodiment, the agent terminal 6, based on printer state information data JD received from a printer 9, sends to a maintenance server 7 (information processing device) printer state information related to the state of the print unit 61. If the agent terminal 6 determines the printer 9 is in the sleep state, the agent terminal 6 sends to the maintenance server 7 printer state information of the same content as the corresponding printer state information that was most recently sent. The maintenance server 7 manages the printer state information received from the agent terminal 6.

Thus comprised, when the operating mode of the printer 9 is the sleep mode, the agent terminal 6 can send to the maintenance server 7 printer state information of appropriate content without causing the operating mode of the printer 9 to return to the normal mode, thereby conserving power.

The invention is described above with reference to a preferred embodiment thereof, but the invention is not limited thereto and can be modified and adapted in many ways without departing from the scope of the accompanying claims.

For example, above-described the control method of a printer 9 (control method of a printer), control method of a maintenance server 7 (control method of an information processing device), or control method of an agent terminal 6 (control method of a monitoring device), may be executed by a computer of the printer 9, maintenance server 7 (information processing device), or agent terminal 6 (monitoring device), or by an external device connected to the printer 9, maintenance server 7, or agent terminal 6. In this case, the invention may be embodied as a program the computer executes to implement the control method of the printer 9, the control method of the maintenance server 7, or the control method of the agent terminal 6; by a computer-readable recording medium storing the program; or by a transmission medium that transmits the program. The recording medium may be a magnetic or optical recording medium, or a semiconductor memory device. More specifically, the recording medium may be a floppy disk, HDD (Hard Disk Drive), CD-ROM (Compact Disk Read Only Memory), DVD (Digital Versatile Disk), Blu-ray® Disc, magneto-optical disc, flash memory, memory card media, or other type of removable or fixed recording medium. Further alternatively, the recording medium may be RAM (random access memory), ROM (read-only memory), hard disk drive, or other nonvolatile internal storage medium of the printer 9 or external device connected to the printer 9.

The invention is described above using the store system 3 deployed in a store, but the facilities in which the store system 3 is deployed are not limited to stores.

Communication between devices in the network system 1 may also be by any desirable means.

The printer 9 in the foregoing embodiment is described using a thermal recording method, but the recording method is not so limited.

Function blocks in the foregoing embodiments may also be configured as desired by the cooperation of hardware and software, and do not suggest a specific hardware configuration.

What is claimed is:

1. A network system, comprising:
   a plurality of printers;
   a plurality of monitoring devices each configured to monitor a state of at least one of the printers of the plurality of printers; and an information processing device in communication with the monitoring devices over a network, wherein:

a first monitoring device of the plurality of monitoring devices is configured to communicate with a first monitored printer of the plurality of printers, and to send to the information processing device printer state information related to a state of the first monitored printer;

the first monitoring device is configured to request, at a time interval, from the first monitored printer, the printer state information related to the state of the first monitored printer, to receive the printer state information in response to the request, and to send the received printer state information to the information processing device;

the information processing device is configured to manage the first monitored printer state based on the printer state information received from the first monitoring device; and the first monitored printer is configured such that, when the first monitored printer receives multiple requests for the printer state information from multiple different monitoring devices of the plurality of monitoring devices, the first monitored printer stops all but one specific monitoring device from requesting the printer state information.

2. The network system described in claim 1, wherein:

the first monitored printer is configured to determine, from among the multiple different monitoring devices, based on a specific order of priority, which monitoring devices of the plurality of monitoring devices to designate as stopped devices that are stopped from requesting the printer state information from the first monitored printer.

3. The network system described in claim 2, wherein:

the monitoring devices are configured to monitor at least one of the printers of the plurality of printers by communicating with the at least one of the printers through the network or by direct communication that does not make use of the network; and in the specific order of priority, monitoring devices that use direct communication that does not make use of the network to monitor the first monitored printer have a higher priority for being designated stopped devices than do monitoring devices that use the network.

4. The network system described in claim 2, wherein:

the specific order of priority is based on respective communication protocols used by the respective monitoring devices to communicate with the first monitored printer.

5. The network system described in claim 2, wherein:

the specific order of priority is determined based on respective types of communication interface used for communication between the first monitored printer and the respective monitoring devices of the plurality of monitoring devices.

6. The network system described in claim 5, wherein:

in the specific order of priority, monitoring devices that communicate with the first monitored printer through a wireless communication interface have a higher priority for being designated stopped devices than do monitoring devices that communicate with the first monitored printer through a wired communication interface.

7. The network system described in claim 2, wherein:

in the specific order of priority, the monitoring devices are prioritized for designation as the stopped devices in descending order based on their respective number of monitored printers, and the monitoring devices that have a higher number of monitored printers have a higher priority than do monitoring devices that have a lower number of monitored printers.

8. The network system described in claim 1, wherein:

the first monitored printer is configured to send the printer state information to the information processing device without having received a request for the printer state information from any monitoring device.

9. A network system, comprising:

a plurality of printers;

a plurality of monitoring devices each configured to monitor a state of at least one of the printers of the plurality of printers; and an information processing device in communication with the monitoring devices over a network, wherein:

a first monitoring device of the plurality of monitoring devices is configured to communicate with a first monitored printer of the plurality of printers, and to send to the information processing device printer state information related to a state of the first monitored printer;

the information processing device is configured to manage the received printer state information; and the information processing device is configured such that when the information processing device receives the printer state information for a same printer from multiple different monitoring devices of the plurality of monitoring devices, the information processing device designates a specific monitoring device of the multiple different monitoring devices as a chosen device for monitoring the same printer and issues a stop command to another monitoring device of the multiple different monitoring devices to stop monitoring the state of the same printer.

10. The network system described in claim 9, wherein:

the information processing device is configured to determine a specific order of priority for the multiple different monitoring devices that provide the printer state information for the same printer, the priority being for designation as stopped monitoring devices that are stopped from monitoring the state of the same printer and stopped from sending the printer state information of the same printer to the information processing device.

11. The network system described in claim 10, wherein:

in the specific order of priority, the multiple different monitoring devices are prioritized in descending order based on their respective number of monitored printers.

12. The network system described in claim 10, wherein:

the monitoring devices are configured to monitor their monitored printers through the network; and the information processing device is configured to determine the specific order of priority for the multiple different monitoring devices so as to balance a communication load on the network by stopping some monitoring devices from monitoring the same monitored printer.

13. The network system described in claim 10, wherein:

in the specific order of priority, monitoring devices that have a higher number of monitored printers are given a higher priority for designation as a stopped monitoring device in order to reduce their processing load.

14. The network system described in claim 9, wherein:
the information processing device is configured to stop a monitoring device from monitoring a specific one of its monitored printers by sending to the monitoring device a stop instruction instructing a stopping of printer state monitoring of the specific monitored printer.

15. The network system described in claim 9, wherein:
the monitoring devices are configured to send the printer state information at a specific time interval to the information processing device; and
the information processing device is configured such that, when the printer state information for the same printer is received by the information processing device from the multiple different monitoring devices during a specific period corresponding to the specific time interval, the information processing device designates a specific monitoring device for monitoring the same printer and stops another monitoring device from monitoring the state of the same printer.

16. The network system described in claim 9, wherein:
the monitoring devices are configured such that, when one of their monitored printers is not connected, the one monitoring device sends not-connected information identifying the monitored printer that is not connected, to the information processing device; and
the information processing device is configured such that, when the information processing device receives not-connected information for the same printer from two monitoring devices, the information processing device instructs one of the two monitoring device to stop monitoring the state of, and sending printer state information for, the same one printer.

17. The network system described in claim 9, wherein:
the information processing device is configured such that, in response to not receiving the printer state information from the specific monitoring device, the information processing device removes the chosen device designation from the specific monitoring device, cancels the stop command issued to the another monitoring device, and designates the another monitoring device as the chosen device for monitoring the same printer.

18. A control method of a printer able to communicate with multiple printer-monitoring devices, comprising:
providing printer state information in response to receiving a request for the printer state information from a single one of the multiple printer-monitoring devices; and
in response to receiving multiple requests for the printer state information from the multiple printer-monitoring devices, providing the printer state information to a selected one printer-monitoring device and stopping another of the multiple printer-monitoring devices from requesting the printer state information.

19. A printer supporting communication with multiple printer-monitoring devices, comprising:
a print unit that prints configured to print on recording media; and
an electronic controller configured to execute the control method of claim 18.

20. A control method of an information processing device able to communicate with multiple monitoring devices, each having a function of monitoring a state of multiple printers and sending printer state information of one or more of its monitored printers to the information processing device, the control method including:
managing a printer state referenced by the printer state information received from the multiple monitoring devices; and
in response to receiving the printer state information for a same printer from plural different monitoring devices, designating a specific monitoring device for monitoring the same printer and stopping another monitoring device from monitoring the same printer.

21. An information processing device comprising:
a network interface controller configured to communicate with the multiple monitoring devices, and to receive printer state information from the multiple monitoring devices; and
an electronic controller configured to execute the control method of claim 20.

* * * * *